(12) United States Patent
Fassbender et al.

(10) Patent No.: US 11,451,613 B2
(45) Date of Patent: Sep. 20, 2022

(54) SERVER FOR PROVIDING MEDIA FILES FOR DOWNLOAD BY A USER AND THE CORRESPONDING SYSTEM AND METHOD

(71) Applicant: tonies GmbH, Dusseldorf (DE)

(72) Inventors: Patric Fassbender, Dusseldorf (DE); Marcus Stahl, Dusseldorf (DE); Christian Wilmanns, Dusseldorf (DE); Sven Vaders, Dusseldorf (DE)

(73) Assignee: tonies GmbH, Düsseldorf (DE)

( * ) Notice: Subject to any disclaimer, the term of this patent is extended or adjusted under 35 U.S.C. 154(b) by 0 days.

(21) Appl. No.: 16/987,350

(22) Filed: Aug. 6, 2020

(65) Prior Publication Data

US 2021/0051193 A1 Feb. 18, 2021

Related U.S. Application Data

(63) Continuation of application No. PCT/EP2020/061321, filed on Apr. 23, 2020.

(30) Foreign Application Priority Data

Aug. 6, 2019 (DE) .................... 10 2019 005 502.0

(51) Int. Cl.
*H04L 67/06* (2022.01)
*H04L 9/40* (2022.01)
(Continued)

(52) U.S. Cl.
CPC .......... *H04L 67/06* (2013.01); *G06F 16/4387* (2019.01); *H04L 63/0892* (2013.01); *H04L 67/306* (2013.01)

(58) Field of Classification Search
CPC ... H04L 67/06; H04L 67/306; G06F 16/4387; A63H 3/28
See application file for complete search history.

(56) References Cited

U.S. PATENT DOCUMENTS 1,535,035 A 4/1925 Richard
3,706,158 A 12/1972 Jensen
(Continued)

FOREIGN PATENT DOCUMENTS

CN 1323643 A 11/2001
CN 101290718 A 10/2008
(Continued)

OTHER PUBLICATIONS

"Energy Harvesting Technologies for Autonomous WSNs/RFID with a focus on RF Energy Harvesting" Ping Zhao; Dissertation, TU Darmstadt, 2012.
(Continued)

*Primary Examiner* — John M Macilwinen
(74) *Attorney, Agent, or Firm* — Howard IP Law Group, PC

(57) ABSTRACT

A server for providing media files for download by a user with an operating system in which the user is created, a media table stored in a memory, in which at least a first media ID is assigned to a first media file and a second media ID is assigned to a second media file, an identification table stored in a memory, in which an identifier that can be assigned to an identification carrier is stored and assigned to the user, and an assignment table stored in a memory, wherein the first media ID and/or the second media ID can be assigned, in the allocation table, to the identifier and the first media ID is not assigned to the identifier, with a program routine provided on the server, with which the user changes the allocation table and assigns the first media ID to the identifier in the allocation table.

20 Claims, 26 Drawing Sheets

(51) Int. Cl.
    *H04L 67/306* (2022.01)
    *G06F 16/438* (2019.01)

(56) References Cited

U.S. PATENT DOCUMENTS

| | | | |
|---|---|---|---|
| 5,334,022 | A | 8/1994 | Kitagawa et al. |
| 5,811,896 | A | 9/1998 | Grad |
| 6,171,168 | B1 | 1/2001 | Jessop |
| 6,190,174 | B1 | 2/2001 | Lam |
| 6,330,427 | B1 | 12/2001 | Tabachnik |
| 6,887,121 | B2 | 5/2005 | Whitehead |
| 7,038,567 | B2 | 5/2006 | Vicentelli |
| 7,081,033 | B1 | 7/2006 | Mawle et al. |
| 7,261,612 | B1 | 8/2007 | Hannigan et al. |
| 7,574,184 | B2 | 8/2009 | Haentzschel et al. |
| 8,287,327 | B1 | 10/2012 | Ghaly |
| 8,324,492 | B2 | 12/2012 | Feeney et al. |
| 8,382,550 | B2 | 2/2013 | Kang |
| 8,515,092 | B2 | 8/2013 | Rucker |
| 8,700,739 | B2 | 4/2014 | Khedouri et al. |
| 8,838,976 | B2 | 7/2014 | Etchegoyen |
| 8,898,766 | B2 * | 11/2014 | Garmark ............ H04L 63/0807 726/9 |
| 9,569,977 | B2 | 2/2017 | Binyamin |
| 10,928,998 | B2 * | 2/2021 | Chase ............... G06F 3/04847 |
| 2002/0072293 | A1 | 6/2002 | Beyo et al. |
| 2002/0193047 | A1 | 12/2002 | Weston |
| 2003/0153238 | A1 | 8/2003 | Chan |
| 2004/0214642 | A1 | 10/2004 | Beck |
| 2005/0216855 | A1 * | 9/2005 | Kopra ............... G06F 16/4387 715/767 |
| 2006/0003664 | A1 | 1/2006 | Yeh |
| 2006/0068366 | A1 | 3/2006 | Chan et al. |
| 2006/0154726 | A1 | 7/2006 | Weston et al. |
| 2007/0056547 | A1 | 3/2007 | Kruse et al. |
| 2007/0093170 | A1 | 4/2007 | Zheng |
| 2007/0234883 | A1 | 10/2007 | Koizumi |
| 2007/0259594 | A1 | 11/2007 | Galbiati et al. |
| 2008/0014829 | A1 | 1/2008 | Dyer et al. |
| 2008/0014830 | A1 | 1/2008 | Sosnovskiy et al. |
| 2008/0153594 | A1 | 6/2008 | Zheng |
| 2008/0316031 | A1 | 12/2008 | Kalama |
| 2010/0160054 | A1 | 6/2010 | Henry |
| 2011/0011382 | A1 | 1/2011 | Lippa et al. |
| 2011/0151746 | A1 | 6/2011 | Rucker |
| 2011/0181399 | A1 | 7/2011 | Pollack et al. |
| 2012/0056722 | A1 | 3/2012 | Kawaguchi |
| 2012/0132710 | A1 | 5/2012 | Loeffler et al. |
| 2012/0283896 | A1 | 11/2012 | Persaud et al. |
| 2012/0295510 | A1 | 11/2012 | Boeckle |
| 2013/0072083 | A1 | 3/2013 | Ghaly |
| 2013/0237152 | A1 | 9/2013 | Taggar et al. |
| 2014/0033583 | A1 | 2/2014 | Larson et al. |
| 2014/0162785 | A1 | 6/2014 | Reiche et al. |
| 2014/0172622 | A1 * | 6/2014 | Baronshin ......... G06Q 30/0631 705/26.7 |
| 2015/0290548 | A1 | 4/2015 | Myers |
| 2015/0151201 | A1 | 6/2015 | Zheng |
| 2015/0290548 | A1 | 10/2015 | Barney et al. |
| 2015/0375134 | A1 | 12/2015 | Zhang et al. |
| 2016/0101370 | A1 | 4/2016 | Madsen et al. |
| 2016/0375373 | A1 | 12/2016 | Fassbender et al. |
| 2018/0353869 | A1 | 12/2018 | Corkin |
| 2019/0030452 | A1 | 1/2019 | Fassbender et al. |

FOREIGN PATENT DOCUMENTS

| | | |
|---|---|---|
| CN | 101357269 A | 2/2009 |
| CN | 101454057 A | 6/2009 |
| CN | 101472653 A | 7/2009 |
| CN | 201299974 Y | 9/2009 |
| CN | 101983395 A | 3/2011 |
| CN | 102058980 A | 5/2011 |
| CN | 102172433 A | 9/2011 |
| CN | 102631784 A | 8/2012 |
| CN | 202569452 U | 12/2012 |
| DE | 19929404 A1 | 12/2000 |
| DE | 10 2007 045 129 A1 | 4/2009 |
| DE | 102007045129 A1 | 4/2009 |
| DE | 102010052878 A1 | 6/2012 |
| DE | 202012100364 U1 | 5/2013 |
| DE | 10 2011 056 420 A1 | 6/2013 |
| DE | 102011056420 A1 | 6/2013 |
| DE | 202013003693 U1 | 8/2013 |
| DE | 102014000076 A1 | 7/2015 |
| DE | 202017007058 U1 | 6/2019 |
| GB | 2364930 A | 2/2002 |
| JP | H05-57063 A | 3/1993 |
| JP | 2001340663 A | 12/2001 |
| JP | 2003126539 A | 5/2003 |
| JP | 2006-116122 A | 5/2006 |
| JP | 2007-143826 A | 6/2007 |
| JP | 2007-252791 A | 10/2007 |
| JP | 2007256754 B2 | 10/2007 |
| JP | 2014029712 A | 2/2013 |
| JP | 2014-29712 A | 2/2014 |
| KR | 100666487 B1 | 2/2006 |
| WO | 9960583 A1 | 11/1999 |
| WO | 2004108239 A2 | 12/2004 |
| WO | 2006048668 A1 | 5/2006 |
| WO | 2006058204 A2 | 6/2006 |
| WO | 2008013356 A1 | 1/2008 |
| WO | 2009031832 A2 | 3/2009 |
| WO | 2010125158 A1 | 11/2010 |
| WO | 2011093694 A1 | 8/2011 |
| WO | 2012110237 A1 | 8/2012 |
| WO | 20140127288 A1 | 8/2014 |
| WO | 2015104222 A | 7/2015 |
| WO | 2016055862 A1 | 4/2016 |
| WO | 2017/100821 A1 | 6/2017 |

OTHER PUBLICATIONS

Excerpt; "https://de.wikipedia.org/wiki/Sensor" Nov. 13, 2019.
Benutzerhandbuch iPod Classic (2009).
Excerpt; "https://en.wikipedia.org/wiki/ID3" Nov. 13, 2019.
Excerpt; "https://de.wikipedia.org/wiki/Vorbis_comment#Kapitelmarken" Nov. 13, 2019.
Excerpt; Ogg Vorbis Documentation "https://xiph.org/vorbis/doc/v-comment" Nov. 13, 2019.
Ravensburger tiptoi Band 11-Entdecke die Rittervom 1. Jun. 2012;DPMA Direkt; Sep. 3, 2019.
Vorstelling tiptoi Band 11-Entdecke die Ritter auf "https://ww.youtube.com/watch?v=6eChjV-jT-Y" DPMA Direkt; Sep. 5, 2019.
Bedienungsanleitung "GoGear SA1VBE02/-04-/08/-16" (2009); Direkt; Sep. 5, 2019.
Bedienungsanleitung "cubo Design CD-Radio" (2009)www/sonoro-audio.com; Sep. 2009.
Excerpt; http://xenona.com/work/spotify-box/; "Spotify Box"; Jordi Parra; Feb. 2011.
Excerpt; http://awards.ixda.org/entry/2012/spotify-box; Interaction Awards; 2012.
Excerpt; https://blog.zenona.com/; "Spotify Box Worklog"; Jodi Parra; May 5, 2012.
"(W-CDMA/GSM mobile phone of type) D905i with a high-point playback function for an event recorded on video in accordance with 1-SEG", Handy Watch (online), Nov. 1, 2007, searched on Oct. 23, 2019. URL:https://k-tai.watch.impress.co.ip/cda/article/news_toppaqe/36997.html.
"Sensor Music Player (free app): if you tap your smartphone on a pocket, a piece jumps to the next piece!", OCTOBA (online), Aug. 9, 2012, searched on Oct. 23, 2019. URL:https://web.archive.org/web/20130116072627/ https://octoba.net/archives/20120809-android-app-sensor-music-15729.html.
"Report of an event MEG + miuro Premium Showcase at the Apple Store Ginza", ASCII, jp (online), Dec. 4, 2007, searched on Oct. 23, 2019. URL:https://ascii.jp/elem/000/000/089/89974/.
Wikipedia, Radio-frequency identification (Wikipedia I), Web Page https://en.wikipedia.org/wiki/Radio-frequency_identification, 28 pages, Dec. 28, 2013.

(56) References Cited

OTHER PUBLICATIONS

Wikipedia, Transponder (Wikipedia II) Web Page https://en.wikipedia.org/wiki/Transponder, 4 Pages, Aug. 13, 2013.
http://zenona.com/work/spotify-box/; "Spotify Box"; Jordi Parra; Feb. 2011.
http://awards.ixda.org/entry/2012/spotify-box; Interaction Awards; 2012.
https://blog.zenona.com/; "Spotify Box Worklog"; Jordi Parra; May 25, 2012.
Wikipedia, Radio-frequency identificaiton (Wikipedia I), web Page https://en.wikipedia.org/wiki/Radio-frequency_identification, 28 pages, Dec. 28, 2013; retrieved via Internet Archive Wayback Machine https://web.archive.org/web/20131228134619/https://en.wikipedia.org/wiki/Radio-freqeuncy_identification on Jan. 14, 2020.
Wikipedia, Transponder (Wikipedia II), Web Page https//en.wikipedia.org/wiki/Transponder, 4 pages, Aug. 13, 2013, retried via Internet Archive Wayback Machine https://web.archive.org/web/20130813215957/https://en.wikipedia.org/wiki/Transponder on Jan. 14, 2020.
Third Party Submission and Concise Description of Relevance, dated Mar. 5, 2020, for U.S. Appl. No. 16/376,892—List of References.
Trigger-Android Apps auf Google Play. Https://web archive.org/web/20131213060042/https://play.google.com/store/apps/details?id=com.jwsoft.nfcactionlauncher&hl=de. Dated Dec. 6, 2013. 2 pages.
Kloevekorn Sven: NFC Task Launcher: Smartphone automatisieren mit NFC-Tags. Https://web.archive.org/web/20131003102200/http://www.androidnext.de/apps/nfc-task-launcher/. Dated Mar. 2013. 5 pages.
Third Party Observations, notification date to Applicant dated Sep. 22, 2017, in related EP Application No. 15701934, with English Translation.
International Search Report dated Jun. 23, 2015 for related International Application No. PCT/EP2015/000029.
"Bilderbuch-Welt mehr genieften! Sonder-dock fur den 'Miffy-MP3-Spieler' mit La-estationund Laut-sprecher", Gadget Tsushin, Jul. 30, 2010.
Shanghai Donya: "Jener Roboter wurde zu einem Lautsprecher. Verkaufsstart: Robo-terformiger Vibrationsiautsprecher mit von der Stellflache abhangigerTonqualitat und MP3-Spielfunktion", Value Press!, Nov. 19, 2012.
International Search Report dated Apr. 7, 2017 for related International Application No. PCT/EP2017/000046.
International Search Report dated Jul. 27, 2017 for related International Application No. PCT/EP2017/000045.
Klaus Finkenzeller; RFID Handbuch; 2002; Hanser; Germany.
MAC Address Definition; DPMADirekt; Aug. 15, 2019; www.linfo.org.mac_address.htm.
MAC-Adressen-Aufbau, Funkiton ud Gefahren in Metzwerk; May 19, 2019; www.datenschutzbeauftrager-info.de English machinet ranslation attached.
IP-Adresse; Wikipedia: Mar. 24, 2019; https://de.wikipedia.org/wiki/IP-Adresse.
IPv4; Wikiedia; Aug. 4, 2019; https://de.wikipedia.org/wiki/IPv4.
IPv6; Wikiedia; Aug. 5, 2019; https://de.wikipedia.org/wiki/IPv6.
Tag (Begriffsklarung); Apr. 29, 2019; https://de.wikipedia.org/wiki/Tag_(Begriffsklarung).
RFID; Wikipedia; Jun. 5, 2019; https://de.wikipedia.org/wiki/RFID.
Third Party Submission and Concise Description of Relevance, dated Jun. 21, 2019, for related U.S. Appl. No. 16/071,845.
"Wireless Power in Passive RFID Systems" Wu Shen; Bachelor-Arbeit, Mikkeli University of Applied Sciences, May 2010.

\* cited by examiner

SERVER FOR PROVIDING MEDIA FILES FOR DOWNLOAD BY A USER AND THE CORRESPONDING SYSTEM AND METHOD

CROSS-REFERENCE TO RELATED APPLICATIONS

This application is a Bypass Continuation Application of PCT International Application No. PCT/EP2020/061321, filed Apr. 23, 2020, which claims priority to German patent application DE 102019005502.0 filed on Aug. 6, 2019, the disclosures of which are incorporated herein in their entireties by reference.

FIELD

The disclosure relates to a server for providing media files for download by a user. The disclosure further relates to a user interface for interacting with a server for providing media files for downloading. The disclosure further relates to a system. The disclosure further relates to a method for providing a media file for download by a user from a server. The disclosure further relates to a method for interacting with a server for providing media files for download by means of a user interface.

BACKGROUND

WO 2015/104222A1, WO 2017/129349A1, DE 10 2011 056 420 A1, EP 3 594 833A1, WO 2015/078923 A1 and US 2018/0353869A1 each have a device for reproducing audio information with a speaker and a sensor which can detect a property or a change in a property of this environment within an area of its environment, the respective device additionally having a control unit which can control the speaker to reproduce audio information if the sensor detects a specific property or a specific change in a property of this environment within the area of its environment or if the control unit detects a specific change in the property detected by the sensor. In the known devices, the sensor is designed as a reader to communicate with a passive RFID transponder. The known devices are supplemented by an identification carrier to form a system, the identification carrier having a property whereby the sensor can determine if the identification carrier is within the area of the sensors environment, or if the identification carrier changes a property in the sensors environment that the sensor can detect in the surrounding area. In the previously known systems, the identification carrier has an RFID transponder.

WO 2015/104222 proposes that the control unit of the device is designed to transmit a specific property or the information containing the determined specific change in the property to a specific server that is connected to the Internet. The allocation of the identified specific property or the identified specific change of the property to specific audio information is made on the server. The server transmits data to the device which it has allocated to the specific property transmitted to it by the control unit, or to the specific change in the property transmitted to it by the control unit.

DE 10 2011 056 420 A1 proposes that the identification carrier, which it refers to as an identification tag, contains the network address data under which a media file can be found, such as a URL address and/or a previously-defined identification number by means of which the media file can be uniquely identified in a database. DE 10 2011 056 420 A1 proposes the use of a blank playback object. The use of the blank playback object should make it possible to use the media file contents stored on other data carriers in a manner appropriate for small children by means of the playback device. For this purpose, DE 10 2011 056 420 A1 proposes first storing a second media file in the memory of the playback device. The second media file can, for example, be transferred from a data carrier such as a CD or DVD into the memory of the playback device. After or when the second media file is saved, a blank RFID identification tag of the blank playback object is uniquely linked to the second media file. This is to be achieved by allocating the information contained on the blank identification tag, for example the ID code of the blank identification tag, to the second media file in the playback device. If the playback device can be connected to a computer, the link should be made using suitable computer software.

WO 2017/129349A1 proposes that the data packet that is transferred from an external memory to the memory of the playback device can originate from a library of databases stored in the external memory. This library could be provided by an external service provider, for example by audio book publishers or film distributors. WO 2017/129349A1 also proposes to individually record the data packet in the external memory using recording software. For designs in which the external memory is part of a computer in a home network, WO 2017/129349A1 proposes that the recording software be executed by a processor of this computer. However, it is also proposed that the recording software be executed on an external computer (external device), for example on a smartphone, a tablet computer, a laptop or a desktop computer or workstation and to place the data packet thus generated into the external storage, for example a cloud, via a network, in particular and preferably via the Internet, from where the data packet is transferred to the storage of the playback device. If the playback device requests data packets from the external memory, the external memory and the device can be designed in such a way that it can first be determined whether a copy of the data packets is already stored in the playback device. Depending on this, it can be determined whether and which data packets are transmitted from the external memory to the playback device. In this way, with the help of the same identifier, different content can be accessed over time, for example, content that changes regularly (such as podcasts) or content that changes depending on the event.

WO 2017/129349 proposes the use of the recording software for the transmission of a data packet from the computer on which the recording software is used to the external memory. It is proposed that the recording software either record the content itself or import other content and transfer this content in whole or in part via a network to the external memory (executed on another computer). The recording software assigns the content to one or more specific identifiers or groups of identifiers. For this purpose, the recording software running on the external device determines—once or repeatedly—via a connection to the playback device (either directly or via an intermediary server) one or more specific identifiers or groups of identifiers which are suitable for the allocation. The recording software running on the external device allows the user of the recording software to determine which of the identifiers the content is to be assigned to before or after recording or importing the content. WO 2017/129349 proposes the alternative that the establishment of the identifiers in question be determined by the fact that—if the user of the recording software has the identifier available—the identifier is imported into the detection area of the playback device. WO 2017/129349 also proposes the embodiment in which a relationship between the user of the recording software (or a user group) and one or more identifiers is stored by means of a user account. According to WO 2017/129349, the assignment of the relevant identifiers to a user account can be stored, for example, in an external memory or in the same device used to execute the recording software, with storage at both locations being preferred. According to WO 2017/129349, the device on which the recording software is executed can thus determine, by assigning the identifiers carriers in question to the user account, "which identifiers carriers belong to the user assigned to the user account". According to WO 2017/129349, the content that has just been generated by the recording software, whether it is the content generated by the recording itself or the content that has just been imported, can thus be assigned an identifier within the recording software. The data packet corresponding to the generated content (the recorded content or the imported content) is then transferred from the device on which the recording software is executed to the external storage in a cloud with the additional information relating to which specific identifier or group of identifiers this data packet belongs.

US 2018/0353869 A1 proposes in [0021] that a control device, which is for example a smartphone, a tablet or an external computer, but not the playback device, can indirectly change the media or the instructions to be executed via interaction with the playback device (in this case an entertainment media device) or via interaction with a server. In [0054] it is proposed that the server can store the database, which links the control information of the device with identification carrier identifiers. US 2018/03538 69 A1 proposes the possibility of using an external control unit, such as a smartphone, a tablet (therein a Controller Device). In [0218] it is proposed that such an external control unit can have access to the identification carrier via the playback device and can read, write or modify it; US 2018/0353869A1 namely works with writable identification carriers.

SUMMARY

In this context, a purpose of the disclosure is to provide a server and/or a user interface with which the number of media files to be kept available and/or the amount of data exchanged between the server and a user interface can be reduced. In addition, part of a purpose of the disclosure is to keep the technical requirements for a playback device low and/or to make optimum use of it, and/or to make the system optimally usable even in different situations with respect to the data connection.

Advantages of embodiments of the disclosure can be implemented by providing a server. At the same time, the provision of a server represents the provision of a commodity that is marketable in itself. With regard to system limits, the server may include a communication interface, via which the server can receive and send signals. Part of the server can be used to receive certain signals via this communication interface, to resolve the structure of these signals and to extract information contained in the signal. Part of the server can also be used to send certain signals via this communication interface which have a certain structure and contain information within this specific structure.

An embodiment of the disclosure further relates to a user interface.

An embodiment of the disclosure further relates to a system consisting of a server and a user interface that can be executed on an external device, in particular to a system having a server and a user interface and an external device on which the user interface can be executed, or where software providing the user interface is stored. The external device can be a smartphone, a tablet, a wearable, such as a smart watch, or a computer, for example a laptop. In one embodiment of the disclosure, the operator of the server makes a user interface available to third parties, for example in the form of software for an app or software running in a web browser, whereby the software providing the user interface can be executed on external devices owned by third parties. Advantages of the disclosure are implemented in this type of use, for example, in that the operator of the server, by providing the user interface, gives the third parties the ability to use an existing identification carrier to identify other media files using a small volume of data to be exchanged.

With regard to the system limits, the user interface can include the fact that the user interface can control the external device, possibly using other software components present on the external device, to receive signals and transmit signals via a communication interface of the external device. Part of the user interface can be used to resolve a specific signal received via this communication interface with regard to the structure of the signal and to identify information contained in the signal. Part of the user interface can also be used to send certain signals via this communication interface, which have a certain structure and contain information within this certain structure, so that the server receiving these signals can resolve the structure of these signals and extract information contained in the signal.

An embodiment of the disclosure further relates to a system with a server and an identification carrier, preferably to a system with a server, an identification carrier and a user interface that can be executed on an external device, in particular to a system with a server, an identification carrier and a user interface and an external device on which the user interface can be executed or where software providing the user interface is stored.

An embodiment of the disclosure further relates to a system with a server and an identification carrier and a playback device, preferably to a system with a server, an identification carrier, a playback device and a user interface that can be executed on an external device, especially to a system with a server, an identification carrier, a playback device and a user interface and an external device on which the user interface can be executed, or where software providing the user interface is stored. With regard to the system limits, the playback device can include a communication interface, via which the playback device can receive and transmit signals. The playback device can be used to receive certain signals via this communication interface, to resolve the structure of these signals and to identify information contained in the signal. The playback device may also be able to send, via this communication interface, certain signals which have a specific structure and contain information within this specific structure, so that the server which receives these signals can resolve the structure of these signals and can identify the information contained in the signal.

The communication interface of the server is preferably designed to send signals to a communication network and to receive signals from a communication network. The communication interface of the server is preferably a connector, preferably a cable connector for a cable, through which the server can send signals to the Internet and receive signals from the Internet.

The user interface to be executed on the external device is preferably designed to send signals to a communication network and to receive signals from a communication network via a communication interface of the external device. The communication interface of the external device can be a cable connection for a cable, via which the external device can send signals to the Internet and receive signals from the Internet. The communication interface of the external device is preferably a wireless communication interface, for example a WLAN antenna, Bluetooth antenna or a mobile radio antenna, via which the external device can transmit signals to the Internet and receive signals from the Internet.

The communication interface of the playback device is preferably designed to send signals into a communication network and to receive signals from a communication network. The communication interface of the playback device can be a cable connection for a cable, via which the playback device can transmit signals to the Internet and receive signals from the Internet. The communication interface of the playback device is preferably a wireless communication interface, for example a WLAN antenna, Bluetooth antenna or a mobile radio antenna, via which the playback device can transmit signals to the Internet and receive signals from the Internet.

According to an embodiment of the disclosure, a media table, an identifier table and an allocation table are stored in the memory of the server. In preferred embodiments, a user group table, an authorization table and a device identifier table are also provided, for example. A table is the assignment of a member of a first group of members, for example an identifier from a group of identifiers, to a member of a second group of members, for example a media file from a group of media files, regardless of how this is technically implemented, but preferably within a database. In its simplest form, a table has a first column in which the members of the first group are listed one below the other and a second column adjacent to the first column in which the members of the second group are listed one below the other, the assignment being made by the member of the first group to be assigned to the member of the second group being listed within the first column in the same row as the member of the second group to be assigned to the member of the first group listed within the second column. By reading the line, the information about the assignment of the member of the first group to the member of the second group can be obtained. However, the table can also be implemented, for example, in the form of a relational database or as part of a relational database. However, the table can also be implemented, for example, in the form of a pivot table or as part of a pivot table database. When a table is described in the following description with reference to columns and rows, embodiments of the disclosure are not restricted to this form of creating a table.

An embodiment of the disclosure therefore also relates to a device for data processing, comprising means for executing the steps for one of the methods according to the disclosure. Furthermore, an embodiment of the disclosure also relates to a computer program, in particular a computer program product, comprising commands which, when the program is executed by a computer, cause the computer to execute one of the methods according to the disclosure. Furthermore, an embodiment of the disclosure relates to a data carrier signal which transmits this computer program [product]. An embodiment of the disclosure further relates to a computer-readable storage medium, comprising commands which, when executed by a computer, cause the computer to execute one of the methods according to the disclosure.

According to an embodiment of the disclosure, a program routine is stored on the server. In preferred embodiments, for example, a library routine, an expansion routine, an inventory routine, a first standard routine, an actual state routine, a second standard routine and a stress routine are provided. In the context of the description of the server, a routine stored on the server is understood as an object according to the disclosure whereby a sequence of instructions (commands) is stored on the server, which—when read and executed by a processor of the server—cause the actions attributed to the routine in the following description. In the context of the description of a procedure to be performed with the server or the system, a routine stored on the server means that the actions attributed to the routine in the following description are performed.

According to an embodiment of the disclosure, the user interface has a UI change routine. Preferred embodiments include, for example, a UI library routine, a UI extension routine, a UI inventory routine, a UI start routine, a UI lock routine, a UI unlock routine, a UI current state routine, a UI user maintenance routine, and a UI player maintenance routine. In the context of the description of the user interface, a routine of the user interface is understood to be an object in accordance with the disclosure if a sequence of instructions (commands) is stored in the software for the user interface, which—if they are read and executed by a processor—contain the instructions attributed to the routine in the following description. In the context of the description of a procedure to be executed by means of the user interface, a user interface routine is understood to mean that the actions attributed to the routine in the following description are performed.

The server according to an embodiment of the disclosure has an operating system. This operating system can be Linux, for example.

In the operating system, the user can be created in a user administration system. If a user is created in a user management system of a database of another data management program that is based on the operating system, this is equivalent to a user created in the operating system. In the operating system, more than 50 users, preferably more than 100 users, preferably more than 100,000 users are preferably created in a user administration system. In a preferred embodiment, the user, or each user created in the operating system, is identified in each case by a user name assigned only once. The operating system can also give the user the option to log-in using a single sign-in.

In a preferred embodiment, a user table is stored in a memory of the server. The users created in the user administration system are listed in the user table. Information such as a password or credit status can be assigned to users in the user table. In a preferred embodiment, a user in the user table can be allocated to one or more user groups. Additionally or alternatively, a user group table can be stored in a memory of the server. In the user group table, the users who are part of this group are assigned to a respective user group. Information such as a password or credit status can be assigned to the user groups in the user group table.

In a preferred embodiment, an administrator is created in the operating system. In a preferred embodiment, an administrator differs from a user in that the administrator can change the allocation of an identifier to another user in an identifier table. In a preferred embodiment, a user cannot change the assignment of an identifier to a user. In addition or alternatively, an administrator differs from a user in that an administrator can assign any media ID in the media table to any ID in the ID table. In a preferred embodiment, a user can only assign a media ID to an identifier in the allocation table if the media ID is assigned to it in the authorization table or is assigned to a user group to which it belongs.

In a preferred embodiment, a device identifier is assigned to a user in the user table. The user is preferably assigned several device identifiers in the user table. In a preferred embodiment, a device identifier is assigned to a user group in the user group table. A plurality of device identifiers are preferably assigned to the user group in the user group table. In a preferred embodiment, a user group is assigned a device ID in the user group table. Preferably several device IDs are assigned to the user group in the user group table. In a preferred embodiment, a locking attribute is allocated to the assignment of a user or a user group to a device ID in the user table or the user group table.

A device identifier is preferably a sequence of letters and/or numbers and/or special characters. A device identifier can be a unique identifier (UID), a universally unique identifier (UUID) or a globally unique identifier (GUID). If, according to a preferred embodiment, a playback device is provided as part of the system according to the disclosure, which has a processor or a memory chip, the device identifier can be the identifier of the processor or the memory chip.

The server according to embodiments of the disclosure has a media table in which at least a first media ID is assigned to a first media file and a second media ID to a second media file. In a preferred embodiment, more than 50 media ID media files are assigned in the database, preferably more than 100 media ID media files are assigned, preferably more than 100,000 media ID media files are assigned. The reference to a "first media ID" and a "second media ID" is only for linguistic reference to two different media IDs; the "first media ID" is not the "second media ID". The use of the numerals "first" and "second" is not used to describe a ranking or hierarchy between the first media ID and the second media ID.

The assignment of a media ID to a media file in the media table can be achieved by assigning the storage location of the media file to a media ID. The storage location can be the specification of the storage location on a memory of the server in which the specific media file is stored. The storage location can also be a pointer, for example a uniform resource locator, which points to the actual storage location of the media file, for example on a storage of another server. The assignment of a media ID to a media file in the media table can be achieved—as long as the media ID is not itself the file name of the media file—by assigning the file name of the media file to a media ID.

A media ID is an identification of a media file. The media ID is preferably a sequence of letters and/or numbers and/or special characters. The media ID can be the file name or part of the file name of the media file or contain the file name or part of the file name. A media ID can be a unique identifier (UID), a universally unique identifier (UUID) or a globally unique identifier (GUID).

In a preferred embodiment, the server has a media memory where media files are stored. A media file stored in the media memory is in particular and preferably a file with one of the following formats AAC, AIF, AIFF, FLAC, MP3, M4A, M4B, WAV, OGA, OGG, OPUS, WMA. In a preferred embodiment, audio files, but no video files, are stored in the media memory. In a preferred embodiment, audio files are assigned to the media ID in the media table and no video files.

In one embodiment, the media files stored in the media store can have different formats. In a preferred embodiment, the media files stored in the media memory have the same format. In an alternative and preferred embodiment, the media files stored in the media storage have a format from a group of formats, whereby the group in particular and preferably contains no more than 20, in particular and preferably no more than 10, and in particular and preferably no more than 5 different formats.

In a preferred embodiment, all media files which are assigned to media IDs in the media table are stored in the media memory. In an alternative embodiment, some of the media files associated with media IDs in the media table are stored in the media storage, while in the media table, a pointer is associated with the media ID for the media file associated with a media ID that is not stored in the media store.

Further information can be assigned to a media ID in the media table. For example, metadata for the media files associated with the media ID can be stored in the media table. Metadata can be:
  Information about the content of the media file, for example the composer/author, the presenter, the piece, a summary of the content, the sequence number of this media file in a series, etc.,
  Categorizations, such as the assignment to styles (pop, classic, RnB) or topics (poetry, prose) or languages (German, English, local dialects) or sub-genres (e.g. detective stories, fairy tales), releases for specific age groups,
  Information about the length of the music file (play time) or the size of the media file (in KB or MB) or for example about the file format,
  Information about chapters within the media file, the length of chapters or the points within the media file that you have to jump to in order to get to the beginning of a chapter,
  Information about the origin of the media file assigned to the media ID, for example, whether the media file was uploaded by a user and by which user, information about the recording medium with which the media file was created (as far as known), a path via which the media file stored in the server was loaded (app, web browser, immediate upload),
  Information about a media ID belonging to a series,
  Information about belonging to an identifier type,
  Version information, in particular and preferably a time stamp that identifies the point in time at which the media file was uploaded to the server,
  A release date that identifies when the media ID is available to users,
  Information about image files (file name, storage location) that can be used to display the media ID in a UI,
  Information about popularity (how often this media ID was purchased), user feedback, user ratings, promotions, rankings.

For example, there can be a series called "Benjamin Blümchen"® and a specific media ID for the series "Benjamin Blümchen"® can be assigned in the media table. A series can be a group of media files, the respective media file storing a sequence of a story consisting of several sequences, for example the sequences of the "Benjamin Blümchen"® series.

The fact that the server in the operating state described has a media table in which at least a first media ID is assigned to a first media file and a second media ID to a second media file means that the server in this operating state recognizes the first media ID and the second media ID. This means that the server does not have to wait for the program routine described in more detail below to find out the first media ID and/or the second media ID. In the operating state of the server according to the disclosure, the first media ID and the second media ID are stored in the media table and thus known to the server.

An identifier table is stored in a memory of the server. In the identifier table, an identifier that can be assigned to an identification carrier is assigned to the user. An identifier can be assigned to a user by directly assigning the identifier to the user. If, according to a preferred embodiment, the user is assigned to a user group in a user group table, the assignment of an identifier to a user can also be done by assigning the user group to which the user belongs to the identifier in the identifier table.

In a preferred embodiment, an identifier type is assigned to the corresponding identifier in the identifier table. In a preferred embodiment, the "content type" is provided as the identifier type. This identifier type can be used to convey that the identifier which is assigned to this identifier type was already assigned to a media ID in the allocation table when it was first placed on the market. In a preferred embodiment of the "content type" identifier type, the "series type" identifier type can be provided. This identifier type can be assigned to the identifier in the identifier table in addition to the "content type" identifier type or alternatively to the "content type" identifier type. The "series type" identifier type can be used to express that the identifier that is assigned to this identifier type was already assigned a media ID in the allocation table when it was first placed on the market, and the media file associated with it being a media file of a series. In a preferred embodiment of the "series type" identifier type, the identifier type that is assigned to a specific series can be provided, for example the "Benjamin Blümchen"® identifier type. The identifier type assigned to a particular series can be used to indicate that the identifier assigned to that identifier type was already assigned a media ID in the allocation table when it was first placed on the market, the media file assigned to it being a media file of a particular series; in our example, the series "Benjamin Blümchen"®. In particularly and preferably, the identifier type assigned to a specific series can be used to express the preference that the identifier assigned to this identifier type was already assigned a media ID in the allocation table when it was first placed on the market, which is assigned to a specific series in the media table (where a specific series is entered in the media table); in our example, the series "Benjamin Blümchen"®.

In a preferred embodiment, the "creative type" is provided as the identifier type; this identifier type can be used to convey the information that this identifier, which is assigned to this identifier type, was not assigned a media ID in the allocation table when it was first placed on the market.]

In a preferred embodiment, the server allows the identifier type to be changed. For example, an identifier that is initially assigned the "creative type" identifier type can be assigned the "content type" identifier type, particularly and preferably the "series type" identifier type and particularly and preferably the identifier type that is assigned to a specific series.

In a preferred embodiment, a locking attribute is assigned in the identifier table to a user or user group identifier. The existence of a locking attribute can be used to restrict changes to the assignment of an identifier to a user or user group.

In a preferred embodiment, a device identifier is assigned for the allocation of an identifier to a user or to a user group in the identifier table. The presence of a device identifier can be used to combine the allocation of an identifier to a user or a user group with an allocation to a device identifier. In a preferred embodiment, the device identifier assigned in the identifier table to an identifier and user or user group association can be a device identifier which is assigned to a user or a user group in the user table or the user group table.

An identifier is preferably a sequence of letters and/or numbers and/or special characters. A media ID can be a unique identifier (UID), a universally unique identifier (UUID) or a globally unique identifier (GUID). If, according to a preferred embodiment, an identification carrier is provided as part of the system according to the disclosure, which has an RFID transponder, the identifier is preferably stored in the RFID transponder. In a preferred embodiment, a sequence of letters and/or numbers and/or special characters, preferably a unique identification carrier (UID), a universally unique identification carrier (UUID) or a globally unique identification carrier (GUID), is stored in the RFID transponder. In this embodiment, the identifier is preferably the sequence of letters and/or numbers and/or special characters stored in the RFID transponder or a sequence of letters and/or numbers and/or special characters obtained according to a conversion rule from the sequence of letters and/or numbers and/or special characters stored in the RFID transponder.

An allocation table is stored in a memory of the server according to the disclosure. In the allocation table, the identifier can be assigned the first media ID and/or the second media ID.

The allocation table can be designed so that only one media ID can be assigned to an identifier. If an identifier, which is already assigned a media ID in the allocation file, for example the second media ID, is to be assigned another media ID, for example the first media ID, the assignment of the identifier to one media ID (e.g. the second media ID) is resolved (e.g. deleted) and the assignment of the identifier to the other media ID (e.g. the first media ID) is executed in this manner.

The allocation table can be designed in such a way that several media IDs are assigned to one identifier. In one embodiment, two media IDs can be assigned to an identifier. In a particular and preferred embodiment, a hierarchy of the two media IDs can be stored in the allocation table in this embodiment. The hierarchy of the media ID can result from the storage location of the media ID within the allocation table or from additional information stored in the allocation table. In a particularly simple embodiment, the hierarchy can be implemented with an allocation table with at least three columns in which:
an identifier is entered in the first column,
in a second column, a first media ID can be assigned to an identifier from the first column by writing the first media ID in the second column on the same line as the identifier in the first column, and
in a third column, a second media ID can be assigned to an identifier from the first column by writing the second media ID in the third column in the same line of the identifier in the first column.

This embodiment of the allocation table could include a media ID written in the third column (in this case the second media ID) in the hierarchy that is higher than the media ID written in the second column (in this case the first media ID). In such an embodiment of the allocation table, the media ID written in the second column in the row of the identifier can be regarded as the default (default media ID). If no media ID is entered in the row of the identifier in the third column, the default media ID stored in the second column is used as the media ID assigned to the identifier. However, if a media ID is entered in the third column in the identifier row, then— even if a media ID is entered in the second column in the identifier row—the media ID entered in the third column of the identifier row is used as the identifier. In a preferred embodiment of this embodiment, the user can only make an entry in the third column using the program routine. In this way it can be ensured that the specific identifier in the allocation table is always assigned a media ID.

In a preferred embodiment, a locking attribute is allocated to the assignment of an identifier to a media ID in the allocation table. The presence of a locking attribute can be used to restrict the possibility of making changes to the assignment of an identifier to a media ID in the allocation table to only specific users of a user group, for example the administrator of a user group.

In a preferred embodiment, a device identifier is assigned to the association of an identifier with a media ID in the allocation table. The presence of a device identifier can be used to combine the assignment of an identifier to a media ID with an assignment to a device identifier. In a preferred embodiment, the device identifier assigned in the allocation table to an assignment of an identifier and a media ID can be a device identifier assigned to a user or a user group in the user table or the user group table.

Additionally or alternatively, the device identifier can be assigned to an identifier in a table.

In an operating state of the server according to the disclosure, the first media ID of the identifier is not assigned in the allocation table. The server knows the first media ID, in particular because it is assigned to a first media file in the media table, but the first media ID is not assigned to the identifier.

According to an embodiment of the disclosure, a program routine is provided on the server with which the user changes the allocation table and assigns the first media ID to the identifier in the allocation table.

In a preferred embodiment, the program routine is triggered by receiving a change signal and comprises the step of evaluating the change signal.

In a first embodiment, the structure of the change signal can be selected such that the change signal contains the identifier whose assignment is to be changed in the allocation table and the media ID that is to be assigned to the identifier, namely the first media ID. In this embodiment, the program routine can be executed in such a way that the identifier and the first media ID are read from the change signal during the step of evaluating the change signal. In a subsequent step, the entry of the allocation table associated with the transmitted identifier is changed and the identifier is assigned the first media ID; in a preferred embodiment as the only Media ID and by deleting a possibly previously existing assignment to another Media ID, or in another preferred embodiment in addition to an already existing Media ID, but as a hierarchically higher Media ID.

In a further embodiment, the structure of the change signal can be selected in such a way that the change signal contains information about several identifiers and several media IDs and also contains at least the information that one of the identifiers contained in the change signal is assigned to one of the media IDs contained in the change signal. It is preferable for the change signal in this embodiment to contain an assignment to one of the media IDs contained in it for each identifier contained in it. For example, the change signal can reflect the contents of a UI allocation table stored in an external device or the contents of part of a UI allocation table stored in an external device. In this embodiment, the program routine can be executed in such a way that in the step of evaluating the change signal, the identifiers, the media IDs and their assignment to the identifiers are read from the change signal. In a subsequent step, the program routine can change the entry of each identifier transmitted in the change signal, for which a media ID was also transmitted in the change signal, in the allocation table of the server and assign the respective identifier to the media ID communicated with the change signal; in a preferred embodiment as the only media ID and by deleting a possibly previously existing assignment to another media ID or in another preferred embodiment in addition to an already existing media ID, but as a hierarchically higher media ID. In a preferred embodiment, the program routine can use the fact that an identifier in the change signal was not assigned a media ID in the change signal to leave the assignment to a media ID that may exist in the server allocation table unchanged. Alternatively, the program routine can use the fact that an identifier in the change signal was not assigned a media ID in the change signal to cancel any assignment of this identifier to a media ID in the server allocation table. In a preferred embodiment, the program routine can check which identifiers have already been assigned to a media ID contained in the change signal in the server's allocation table and, in doing so, check for which of the identifiers contained in the change signal an assignment to a different media ID than the media ID assigned in the server's allocation table or an initial assignment to a media ID is reported in the change signal, if no media ID has yet been recorded in the servers allocation table for the respective identifier. If a difference is detected, the program routine can cause a confirmation request signal to be sent out containing the identifiers for which there is a difference in assignment. Embodiments of the disclosure may provide that the program routine only makes a change to the assignment in the servers allocation table for those identifiers for which it has detected a difference in assignment if the server contains a confirmation signal in response to the sending of the confirmation request signal. This embodiment allows users:

to maintain their own UI allocation table on an external device, in which one identifier is assigned a media ID or several identifiers each have a media ID, to make changes to this UI allocation table offline, i.e. without communication to the server, after establishing a communication option with the server, the server and the external device synchronize the allocations.

In a third embodiment, the structure of the change signal can be selected such that the change signal contains information about the identifiers whose assignment is to be changed in the allocation table, but does not contain any information about the media ID. In this embodiment of the program routine, the reception of the change signal is preceded by the transmission of a library signal by the server. The structure of the library signal can be chosen such that the library signal contains information about a media ID. In this embodiment of the program routine, the server remembers the media ID which it sent out with the library signal. In this embodiment, the program routine can be executed in such a way that the identifier is read from the change signal during the step of evaluating the change signal. If the server now receives a change signal, as provided in this embodiment of the program routine, which contains information about the identifiers whose assignment is to be changed in the allocation table, the entry in the allocation table associated with the transmitted identifier is changed in a subsequent step and the identifier is assigned the media ID which was contained in the library signal and which the server has memorized; in a preferred embodiment as the only media ID and while deleting a possibly previously existing assignment to another media ID or in another preferred embodiment in addition to an already existing media ID, but as a hierarchically higher media ID.

The embodiments which include the step of receiving the change signal and the step of evaluating the change signal are particularly suitable for use in a system according to the disclosure in which a user interface is provided at the same time. The user interface running on an external device can be designed to generate a change signal understandable to the server and to transmit it by the external device.

As an alternative to embodiments of the program routine that use the step of receiving the change signal and have the step of evaluating the change signal, embodiments are possible in which the user has direct access to the server, for example via a virtual private network (VPN) or a remote desktop session, and generate a change signal directly in the server.

Execution of the program routine can be started by the server receiving a change signal. Alternatively, the execution of the program routine can be triggered by an event that is independent of the server and the user. For example, the program routine can be executed at certain specific times (every week, every day, every hour, every minute or in significantly shorter time units). It is also possible for the program routine to be executed within a defined time interval since the last time the program routine was executed. This type of execution is particularly suitable for embodiments in which a UI allocation table stored on an external device is synchronized with the allocation table of the server during the execution of the program routine. In addition or alternatively, the execution of the program routine can be triggered by events taking place on the server. For example, a user logging on to the server can cause the program routine to be executed.

The method according to an embodiment of the disclosure for providing a media file for downloading from a server by a user is executed on a server, preferably a server according to the disclosure, wherein the server is
- an operating system in which the user is created,
- a media table stored in a memory, in which at least a first media ID is assigned to a first media file and a second media ID is assigned to a second media file,
- an identifier table stored in a memory in which an identifier that can be assigned to an identification carrier is assigned to the user,
- equipped with an allocation table stored in a memory in which:
  i. the identifier can be assigned to at least the first media ID or the second media ID and
  ii. the first media ID is not assigned to the identifier.

The method according to an embodiment of the disclosure provides that the user executes a program routine provided on the server, with which the user changes the allocation table and assigns the first media ID to the identifier in the allocation table.

In contrast to the procedure known from WO 2017/129349 A1, the disclosure allows the user to initiate the assignment of an identifier to a Media ID within the server and without having to upload a media file associated with the Media ID from a UI to the server in the same process. This reduces the data volume that has to be exchanged between the UI and the server. While the media file must also be uploaded for WO 2017/129349 A1, this use of data volume can be dispensed with for the disclosure.

Since in the disclosure only a relatively short signal exchange (with the resulting short signal runtimes) takes place in relation to the simultaneous upload of a media file (with the long signal runtimes required for this) as known from WO 2017/129349, the interaction with the user can take place more quickly. The assignment of a media ID to an identifier is faster, so that the user can retrieve the media file assigned to the identifier via the media ID more quickly and play it back on a playback device.

Furthermore, the disclosure makes it possible to reduce the data volume in the server. With the procedure known from WO 2017/129349 A1, the user must upload a media file. It can be assumed that the server cannot detect, without considerable effort, whether the content of this media file is not already stored on the server by another user as part of a media file uploaded by this user. Thus, according to the procedure known from WO 2017/129349 A1, a separate media file must be kept for each user, even if its content is already present in another media file on the server. This requires an increased storage volume of the server. With the procedure according to embodiments of the disclosure, it is possible to make a media file stored in the server available to several users, namely by assigning the respective media ID to the respective user. Although several users use the information stored in the media file, the media file only needs to be stored once on the server.

In a preferred embodiment, the user uses the program routine to assign a media ID to the ID for a media file that was stored by another user in a media store on the server, or assigns a pointer to the media ID. In a preferred embodiment, the user uses the program routine to assign a media ID to the identifier, to which another user is listed in the media table as the user who uploaded the media file belonging to the media ID. In a preferred embodiment, the user uses the program routine to assign a media ID to the ID with the program routine for a media file that was not stored by the user in a media store on the server. In a preferred embodiment, the user uses the program routine to assign a media ID to which the user is not listed in the media table as a user who has uploaded the media file belonging to the media ID.

In a preferred embodiment, the user uses the program routine to assign to the identifier (a second identifier) a media ID which is also assigned to another identifier (a first identifier) in the identifier table, in particular and preferably without changing the assignment of the media ID to the other identifier (the first identifier). In a preferred embodiment, the first media ID is assigned to another identifier (a first identifier) in the identifier table and is also assigned to the other identifier (a first identifier) after the program routine has been executed. On the one hand, this makes it possible for a user to assign the same media ID to several of his or her identifiers. In addition, it is also possible within the server for several users to assign a media ID to their respective identifiers, for example a media ID for a specific episode of a series; and then only one media file for this specific episode of a series must then be kept available within the server, even though it is assigned to several users via its media ID.

In a preferred embodiment, an authorization table is stored in a memory of the server. In a preferred embodiment, media IDs are assigned to a user in the authorization table.

Additionally or alternatively, a media ID is assigned to one or more users in the authorization table. Additionally or alternatively, a media ID is assigned to a user group in the authorization table. Additionally or alternatively, a media ID is assigned to a user group in the authorization table.

In a preferred embodiment, the program routine checks whether the media ID to be assigned to the identifier when the program routine is executed is assigned to the user or a user group to which the user belongs in the authorization table. In a preferred embodiment, the program routine only assigns the media ID to the identifier if the media file is assigned to the user or a user group to which the user belongs in the authorization table.

In a preferred embodiment, the program routine checks whether the ID whose assignment to a media ID is to be changed when the program routine is executed is assigned to the user or a user group to which the user belongs in an ID table. In a preferred embodiment, the program routine only assigns the media ID to the identifier if the identifier is assigned to the user or a user group to which the user belongs in the identifier table.

In a preferred form of execution, the program routine checks whether the ID whose assignment to a media ID is to be changed when the program routine is processed is the ID of a particular ID type. In a preferred form of execution, the program routine only assigns the media ID to the ID if the ID is of a certain ID type. In a preferred form of execution, the program routine checks whether
- the media ID to be re-assigned to the identifier in the allocation table is a media ID belonging to a series, preferably a specific series, and
- the identifier to which the media ID is to be assigned in the allocation table is an identifier of the "series type" identifier type, in particular and preferably the identifier of the identifier type assigned to a specific series, in particular and preferably the series to which the media ID belongs This embodiment makes it possible, for example, to use the program routine to assign a media ID, which according to the media table belongs to the series "Benjamin Blüchen"®, only to an identifier whose identifier type according to the ID table is of the "Benjamin Blüchen"® identifier type.

In a preferred embodiment, a library routine is provided on the server. The library routine sends out a library signal. The library signal contains one or more media IDs. The library routine can
- have the step of reading at least one media ID from the media table, in particular the step of reading media ID from the media table which correspond to a library criterion, and/or
- have the step of reading at least one media ID from the authorization table, in particular the step of reading media IDs which are assigned in the authorization table to a specific user or a user group to which the specific user belongs according to the user group table, in particular the step of reading media IDs that correspond to a library criterion and are assigned in the authorization table to a specific user or a user group to which the specific user belongs according to the user group table.

In a preferred embodiment, the library signal contains the Media ID or the Media IDs read in this manner.

In the preferred embodiment:
- the library criterion can be selected so that when it is used in the library routine, all media IDs stored in the media table are read (library criterion "all") and/or
- the library criterion can be selected so that when it is used in the library routine, all media IDs stored in the media table are read, to which certain metadata are assigned in the media table, for example the affiliation to a specific series or certain categorizations, such as the assignment to Styles (pop, classical, RnB), (library criterion "certain metadata") and/or
- the library criterion can be selected so that when it is used in the library routine, all media IDs are read from the authorization table that are assigned in the authorization table to a specific user or a user group to which the specific user belongs according to the user group table (library criterion "User media ID") and/or
- the library criterion can be selected in such a way that when it is applied in the library routine, all media IDs stored in the media table are read which are not assigned in the authorization table to a specific user or user group to which the specific user belongs according to the user group table (library criterion "New Media ID") and/or
- the library criterion can be selected such that when it is applied in the library routine, all media IDs are read from the authorization table which are assigned in the authorization table to a specific user or user group to which the specific user belongs according to the user group table, and which are assigned in the allocation table to an identifier which is assigned in the identifier table to a specific user or user group to which the specific user belongs according to the user group table (library criterion "Assigned Media ID") and/or
- the library criterion can be selected in such a way that when it is applied in the library routine, all media IDs are read from the authorization table which are assigned in the authorization table to a specific user or user group to which the specific user belongs according to the user group table, and which are not assigned in the allocation table to an ID which is assigned in the ID table to a specific user or user group to which the specific user belongs according to the user group table (library criterion "Free Media ID")
  - First of all, all identifiers that are assigned in the identifier table to the user or a user group to which the user belongs according to the user group table are identified, and from these identifiers it is determined to which of these identifiers an identifier type is assigned that indicates the assignment of this identifier to a certain series, so that all series for which the user is assigned identifiers in the identifier table can be determined,
  - then all media IDs stored in the media table are read and the affiliation to one of the series determined in this manner is assigned in the media table,
  - then from the media IDs determined in this manner, those that are not assigned in the authorization table to the user or a user group to which the user belongs according to the user group table are assigned.

In a preferred embodiment, the library routine is triggered by receiving a library request signal. This includes the step of evaluating the library request signal. In a preferred embodiment, the library request signal contains a library criterion or information from which the server can form a library criterion when evaluating the library request signal.

In a preferred embodiment, the library signal for a media ID contained in the library signal contains information as to whether this media ID is already assigned to the user or a user group to which the user belongs in an authorization table of the server.

In a preferred embodiment, the library signal has metadata that is stored in the media table for the media ID. The metadata contained in the library signal can include:

Information about the content of the media file, for example the composer/author, the presenter, the piece, a summary of the content, the sequence number of this media file in a series, etc., Categorizations, such as the assignment to styles (pop, classic, RnB) or topics (poetry, prose) or languages (German, English, local dialects) or sub-genres (e.g. detective stories, fairy tales), releases for specific age groups, Information about the length of the music file (play time) or the size of the media file (in KB or MB) or for example about the file format, Information about chapters within the media file, the length of chapters or the points within the media file that you have to jump to in order to get to the beginning of a chapter, Information about the origin of the media file assigned to the media ID, for example, whether the media file was uploaded by a user and by which user, information about the recording medium with which the media file was created (as far as known), a path via which the media file stored in the server was loaded (app, web browser, immediate upload), Information about a media ID belonging to a series, Information about belonging to an identifier type, Version information, in particular and preferably a time stamp that identifies the point in time at which the media file was uploaded to the server, A release date that identifies when the media ID is available to users, Information about image files (file name, storage location) that can be used to display the media ID in a UI, Information about popularity (how often this media ID was purchased), user feedback, user ratings, promotions, rankings.

In a preferred embodiment, an expansion routine is provided on the server. In a preferred embodiment, the user can change the authorization table with the extension routine. The extension routine in particular and preferably enables a user to supplement the assignment of a media ID to himself and/or a user group to which he belongs in the authorization table. In a particular and preferred embodiment, a user can assign a media ID, which was not assigned to him before the extension routine was conducted, by performing the extension routine.

In a preferred embodiment, the expansion routine is triggered by the step of receiving an expansion signal by the server and comprises the step of evaluating the expansion signal.

In a first embodiment, the extension signal contains the user and/or the user group, the assignment of which is to be changed in the authorization table, and the media ID which is to be assigned to the user and/or the user group. In this embodiment, the expansion routine can be conducted in such a way that in the step of evaluating the expansion signal, the user and/or the user group and the media ID are read from the expansion signal. In a subsequent step, the entry in the authorization table is changed and the media ID in the authorization table is assigned to the user and/or the user group.

In a second embodiment, the structure of the expansion signal can be selected such that the expansion signal contains information about the media ID that is to be assigned to the user. The assignment to the user results from further circumstances, for example that the extension signal received from the server was initiated by a user interface on which the user has logged in.

In a preferred embodiment, the server checks whether the expansion signal contains a media ID which it has sent out in a previous library signal. In a preferred embodiment, the server only continues the expansion routine if the expansion signal contains a media ID which it has sent in a previous library signal, preferably in a previous library signal which it has sent within a predefined time window.

In a preferred embodiment, the change signal is part of the extension signal or a signal immediately following the extension signal. In this way, the user can tell the server which identifier the media ID contained in the extension signal is to be assigned in the allocation table.

In a preferred embodiment, the expansion routine has the step of receiving an enable signal from the server. The assignment of a Media ID to a user or user group in the authorization table can be made dependent on whether the server receives an enable signal. Similarly, the assignment of a media ID to an identifier in the allocation table as a result of the change signal can depend on whether the server receives a release signal. If the assignment of a media ID to an identifier in the allocation table, which is conditional upon the change signal, is dependent upon the media ID to be reassigned to the identifier being assigned to the user or a user group to which the user to whom the identifier belongs is assigned in the authorization table, then the assignment of a media ID to an identifier in the allocation table, which is made dependent on receiving a release signal by the change signal, can also be implemented by assigning a media ID to a user in the authorization table dependent on whether the server receives a release signal.

The release signal can contain confirmation that an amount of money has been credited to an account. For example, the confirmation signal can be generated by a PayPal® account. This gives the user the opportunity to buy media IDs and the associated media files or a license, or to rent them for a period of time. However, embodiments are also possible in which users want to exchange media files with one another. The release signal can therefore also contain a confirmation that a user to whom the media file is assigned in the authorization table agrees that this media file assigned to him is now also assigned to another user.

The extension routine may include the step of checking a users credit status. The assignment of a media ID to a user in the authorization table can be made dependent on whether the checking of the users credit status corresponds to a predetermined value or is greater than a predetermined value. A credit table can be stored in a memory of the server. A credit status is assigned to a user and/or—to the extent available—a user group in the credit table. The credit status can also be assigned to the user in the user table. The credit status can be a specific value, for example a point value or a monetary value. As part of the expansion routine, it can be determined whether the credit status is above a certain point value or monetary value. As part of the extension routine, after checking the credit status, a provision can further be made for the credit status to be changed, for example the point value or the monetary value can be reduced. The credit status can also express, via a predefined value, that the user has unlimited credit, for example if the user is a member of a flat fee program. Using the credit table makes it possible for a user to set a certain credit status on the server, for example to reload his "account". As a result of this, the user does not have to be concerned with the transmission of an otherwise possibly necessary release signal when executing the extension routine. In other words, the user does not have to make a transfer for the assignment of a specific media file. The credit status also makes it possible for a user to gift a certain amount of credit to another user, or in other words, increase the credit status of the user receiving the gift.

In a preferred embodiment, an inventory routine is provided on the server. The inventory routine sends out an inventory signal. The inventory signal contains one identifier or several identifiers and/or one device identifier or several device identifiers. Furthermore, the inventory signal can contain information about whether a locking attribute is assigned to the respective identifier carrier or the respective device identifier in the identifier table or the allocation table. The inventory routine can have the step of reading at least one identifier from the identifier table, in particular the step of reading identifiers from the identifier table that correspond to an inventory criterion. In a preferred embodiment, the inventory signal contains the identifier or identifiers thus read. In a preferred embodiment, the inventory signal for an identifier also contains the identifier type that is stored for this identifier in the identifier table. The inventory routine can have the step of reading at least one device identifier from the user table and/or the user group table, in particular the step of reading device identifiers from the user table and/or the user group table that correspond to an inventory criterion. In a preferred embodiment, the inventory signal contains the device identifier or device identifiers read in this manner.

In the preferred embodiment:
The inventory criterion can be selected so that when it is used in the inventory routine, all the identifiers stored in the identifier table are read, which are assigned in the identifier table to a specific user or a user group to which the specific user belongs according to the user group table (inventory criterion "user identifier") and/or The inventory criterion can be selected so that when it is used in the inventory routine, all the identifiers stored in the identifier table are read, which are assigned in the identifier table to a specific user or a user group to which the specific user belongs according to the user group table, and to those in the identifier table is assigned a certain identifier type (inventory criterion "specific user identifier") and/or The inventory criterion can be selected so that when it is used in the inventory routine, all the identifiers stored in the identifier table are read, which are assigned in the identifier table to a specific user or a user group to which the specific user belongs according to the user group table, and to those in the allocation table no media ID is assigned (inventory criterion "free user ID") and/or The inventory criterion can be selected so that when it is used in the inventory routine, all the identifiers stored in the identifier table are read, which are assigned in the identifier table to a specific user or a user group to which the specific user belongs according to the user group table; and to which a different media ID can be assigned in the allocation table than the one that is available at the time of the query (inventory criterion "changeable user ID") and/or The inventory criterion can be selected so that when it is used in the inventory routine, all the identifiers stored in the identifier table are read, which are assigned in the identifier table to a specific user or a user group to which the specific user belongs according to the user group table and to which a different media ID can be assigned in the allocation table than the one that is available at the time of the query, and which correspond to a specific identifier type or a selection of specific identifier types (inventory criterion "type-specific changeable user identification") and/or The inventory criterion can be selected so that when it is used in the inventory routine, all device identification carriers stored in the user table or the user group table are read, which in the user table are assigned to a specific user or in the user group table to a user group to which the specific user belongs according to the user group table are (inventory criterion "user device IDs").

In a preferred embodiment, the inventory routine is triggered by the receipt of an inventory request signal and comprises the step of evaluating the inventory request signal. In a preferred embodiment, the inventory request signal contains an inventory criterion or information from which the server can form an inventory criterion when evaluating the inventory request signal.

In a preferred embodiment, a first standard routine is provided on the server. The first standard routine includes:
  executing the library routine and transmitting a library signal within the library routine,
  waiting for the receipt of an extension signal and, upon receipt of an extension signal, executing the extension routine, in particular and preferably including the step of receiving an approval signal or the step of checking a user's credit status,
  waiting for the receipt of a change signal and upon receipt of the change signal, executing the program routine according to the disclosure with which the user changes the allocation table and assigns a media ID to the identifier in the allocation table.

In one embodiment of the first standard routine, the first standard routine includes executing the inventory routine, in particular executing the inventory routine before waiting for the receipt of a change signal.

In a preferred embodiment of the first standard routine, this includes
  executing the library routine and transmitting a library signal with a first media ID within the library routine,
  waiting for the receipt of an extension signal containing the first media ID and, upon receipt of an extension signal, executing the extension routine, in particular and preferably including the step of receiving an approval signal or the step of checking a user's credit status,
  waiting for the receipt of a change signal which contains the first media ID and, upon receipt of the change signal, executing the program routine according to the disclosure with which the user changes the allocation table and assigns the first media ID in the allocation table to the identifier.

In a preferred embodiment, an actual status routine is provided on the server. The actual status routine causes an actual status signal to be transmitted. The actual status signal includes:
  one media ID or multiple media IDs
  one identifier or several identifiers
  Information about the assignment of the respective media ID to the respective identifier.

The actual status routine can include the step of uploading the assignment of a media ID to an identifier belonging to a user or belonging to a user group to which the user belongs in the allocation table.

In a preferred embodiment, the actual status routine is triggered by the receipt of an actual status request signal and comprises the step of evaluating the actual status request signal.

In a preferred embodiment, a second standard routine is provided on the server. The second standard routine includes:
- executing the library routine and transmitting a library signal within the library routine,
- executing the current status routine and transmitting an actual status signal within the current status routine,
- waiting for the receipt of a change signal and upon receipt of the change signal, executing the program routine according to the disclosure with which the user changes the allocation table and assigns the first media ID to the identifier in the allocation table.

In a preferred embodiment, a stress routine is provided on the server. In a preferred embodiment, the user can change the identifier table and/or the user table and/or the user group table with the stress routine. In particular and preferably, the stress routine enables a user in the identifier table to supplement the assignment of an identifier to himself and/or to a user group to which he belongs. In particular and preferably, a user can assign an identifier, which was not assigned to him before the stress routine was conducted, by executing the stress routine in the identifier table.

In particular and preferably, the stress routine enables a user in the user table or the user group table to supplement the assignment of a device identifier to a user and/or a user group to which he belongs. In a particular and preferred embodiment, a user can assign himself or a user group to which he belongs a device identifier, which was not assigned to him before the stress routine was conducted, by executing the stress routine in the user table or the user group table.

In a preferred embodiment, the stress routine is triggered by the server receiving a load signal and has the step of evaluating the load signal.

In a first embodiment, the stress signal contains the user and/or the user group, the assignment of which is to be changed in the identifier table, and the identifier which is to be assigned to the user and/or the user group. In this embodiment, the stress routine can be executed in such a way that in the step of evaluating the stress signal, the user and/or the user group and the identifier are read from the stress signal. In a subsequent step, the entry in the identifier table is changed and the identification in the identifier table is assigned to the user and/or the user group. Before this step is conducted, the stress routine can check whether a locking attribute is assigned to the existing assignment of an identifier to a user or a user group, which is now to be changed. If a locking attribute is assigned to the existing assignment of an identifier to a user or a user group that is now to be changed, the entry in the identifier table is not changed and the identifier in the identifier table is not assigned to the user and/or the user group. In such a case, an error signal can be generated by the server. Alternatively, when a locking attribute is recognized, it can be checked whether the user who initiated the change has special authorization, for example an administrator within the user group. If the user has special authorization that authorizes him to make a change despite the locking attribute, the changes will be made.

Additionally or alternatively, the stress signal contains the user and/or the user group, the assignment of which is to be changed in the user table or the user group table, and the device identifier which is to be assigned to the user and/or the user group. In this embodiment, the stress routine can be conducted in such a way that in the step of evaluating the stress signal, the user and/or the user group and the device identifier are read from the stress signal. In a subsequent step, the entry of the user table or the user group table is changed and the device identifier in the user group or the user group table is assigned to the user and/or the user group. Before this step is conducted, the stress routine can check whether a locking attribute is assigned to the existing assignment of a device identifier to a user or a user group that is now to be changed. If a locking attribute is assigned to the existing assignment of a device identifier to a user or a user group that is now to be changed, the entry in the user table or user group table is not changed and the identifier in the user table or user group table is not assigned to the user and/or user group. In such a case, an error signal can be generated by the server. Alternatively, when a locking attribute is recognized, it can be checked whether the user who initiated the change has special authorization, for example an administrator within the user group. If the user has special authorization that authorizes him to make a change despite the locking attribute, the changes will be made.

In a further embodiment, the structure of the stress signal can be selected such that the stress signal contains the identifier to be assigned to the user. The assignment to the user results from further circumstances, for example that the stress signal received from the server was initiated by a user interface on which the user has logged in. In addition or alternatively, the structure of the stress signal can be selected in such a way that the stress signal contains the device identifier to be assigned to the user. The assignment to the user results from further circumstances, e.g. that the load signal received from the server was initiated by a user interface on which the user has logged in.

In a further embodiment, the stress signal contains an identifier and a device identifier. In a preferred embodiment, the stress signal in this embodiment is a playback device request signal. In this embodiment, the stress routine can be conducted in such a way that in the step of evaluating the stress signal, the identifier and the device identifier are read from the stress signal.

According to a first alternative, the identifier table can be used in a subsequent step to determine to which user or user group the stress signal is assigned in the identifier table and in a subsequent step the device identifier in the user table or user group table can be assigned to this user or user group. Before conducting this step, the stress routine can check whether a locking attribute is assigned to the existing assignment of a device identifier to a user or user group that is now to be changed. If a locking attribute is assigned to the existing assignment of a device identifier to a user or user group that is now to be changed, the entry in the user table or user group table is not changed and the identifier in the user table or user group table is not assigned to the user or user group. In such a case an error signal can be generated by the server.

According to a second alternative, in a subsequent step, from the user table or user group table, it can determined to which user or user group the device identifier read from the load signal is assigned in the user table or user group table and in a subsequent step, the identifier in the identifier table is assigned to this user or user group. Before conducting this step, the stress routine can check whether a locking attribute is assigned to the existing assignment of an identifier to a user or user group which is now to be changed. If a locking attribute is assigned to the existing assignment of a device identifier to a user or user group that is now to be changed, the entry in the identifier table is not changed and the user and/or user group is not assigned the identifier in the identifier table. In such a case an error signal can be generated by the server.

In a preferred embodiment, the stress routine comprises the step of receiving an enable signal from the server. The assignment of the identifier to a user or a user group in the identifier table and/or the assignment of a device identifier to a user or a user group in the user table and/or the user group table can be made dependent on whether the server receives an enable signal.

The stress routine may include the step of checking a users credit status. The assignment of the identifier to a user or a user group in the identifier table and/or the assignment of a device identifier to a user or a user group in the user table and/or the user group table can be made dependent on whether the checking of the credit status of the user has a predetermined value that corresponds to or is greater than a predetermined value.

In a preferred embodiment, a locking routine is provided on the server. The locking routine is triggered by the receipt of a lock signal. The lock signal can include a user and/or a user group and an identifier and a locking indicator. If the server receives a locking signal with a user and/or a user group and an identifier and a locking indicator, it assigns a locking attribute to the assignment of the identifier to the user or the user group in the identifier table. The locking signal can include a user and/or a user group and a device identifier and a locking indicator. If the server receives a locking signal with a user and/or a user group and a device identifier and a locking indicator, it assigns a locking attribute to the assignment of the identifier to the user or the user group in the user table or the user group table.

In a preferred embodiment, an unlock routine is provided on the server. The locking routine is triggered by the receipt of an unlock signal. The unlock signal can include a user and/or a user group and an identifier and an unlock indicator. If the server receives an unlock signal with a user and/or a user group and an identifier and an unlock message, then it deletes a locking attribute allocated to the assignment of the identifier to the user or the user group in the identifier table. The unlock signal can include a user and/or a user group and a device identifier and an unlock message. If the server receives an unlock signal with a user and/or a user group and a device identifier and an unlock indicator, then it deletes a locking attribute allocated to the assignment of the identifier to the user or the user group in the user table or the user group table.

In a preferred embodiment, an update routine is provided on the server. The update routine is triggered by the receipt of a playback device actual status signal. The actual status signal of the playback device includes:
  one identifier or several identifiers,
  the version information assigned to the respective identifier in a playback device allocation table, in particular the time stamp assigned to the respective identifier in the playback device allocation table, and/or
  the media ID assigned to the respective identifier in the playback device allocation table.

In a preferred embodiment in which the actual status signal of the playback device does not contain a media ID, receiving the actual status signal of the playback device causes the server to check in the allocation table for each identifier communicated to it with the actual status signal of the playback device in order to determine which media ID this identifier is allocated to, and to check for each media ID thus determined which version information, in particular which time stamp, is allocated to this media ID in the media table. The server then checks whether the version information determined in this way corresponds to the version information that was assigned to the identifier for which the server determined the media ID in the allocation table and, using the media ID, the version information in the media table in the actual status signal of the playback device. If the version information does not correspond, the server generates an update signal. The update signal can contain one or more identifiers.

In an alternative embodiment in which the actual status signal of the playback device contains a media ID, receiving the actual status signal of the playback device causes the server to check, for each media ID communicated to it in the actual status signal of the playback device, which version information, in particular which time stamp is assigned to this media ID in the media table. The server then checks whether the version information determined in this way corresponds to the version information which was assigned to the media ID for which the server determined the version information in the media table in the actual status signal of the playback device. If the version information does not correspond, the server generates an indicator that an update is needed indicator. The update signal can contain one or more identifiers.

In a preferred embodiment, a response routine is provided on the server. The response routine can be triggered by receiving a playback device request signal. The playback device request signal contains an identifier. In a preferred embodiment, the request signal contains a device identifier. In a preferred embodiment, the playback device request signal includes an indicator that an update is needed.

If the server receives a playback device request signal with an indication that an update is needed, the server checks which of the media IDs of the identifier is assigned in the allocation table and generates a response signal. The response signal contains a media file and/or a pointer which is assigned to this media ID in the media table. The response signal preferably contains the identifier, which was contained in the playback device request signal, and preferably the media ID and preferably version information associated with the media file in the media table, in particular and preferably a time stamp. When the control unit of the playback device receives the media file or pointer and the identifier assigned to the media file or pointer with the response signal, the control unit stores the media file in a memory of the playback device and updates the playback device allocation table by assigning the location of the media file in the memory of the playback device to the identifier in the playback device allocation table or by assigning the pointer to the identifier in the playback device allocation table. In a preferred embodiment, the control unit can reset a triggered update notice. In a preferred embodiment, the control unit of the identifier can assign the version information, in particular the time stamp, which the server communicated to the control unit together with the media file.

In a preferred embodiment, the server has a user maintenance routine. The user maintenance routine can be triggered by receiving a user maintenance signal. The user maintenance signal can include a user and a user group. If the server receives a user maintenance signal, it assigns the user to the user group in the user group table. As part of the user maintenance routine, the server can check whether the user from which it received the user maintenance signal is authorized to make changes to the user group, for example, he/she is the administrator of the user group. If, in a preferred embodiment, the user maintenance signal contains an e-mail address, the server sends a message to this e-mail address. The message can contain a confirmation link, and by clicking on this link, the recipient of the email can confirm that he/she would like to be assigned to the user group.

In a preferred embodiment, the server has a playback device maintenance routine. The playback device maintenance routine can be affected by receiving a playback device maintenance signal. The playback device maintenance signal can include a user and/or a user group and a device identifier. If the server receives a playback device maintenance signal, the server assigns the device identifier to a user and/or a user group in the user table or the user group table.

The system according to the disclosure has a server according and an identification carrier, whereby the identification carrier has an identifier which can be read by a reading device. In a preferred embodiment, the identifier has an RFID transponder. In this embodiment, the identifier can be stored in the RFID transponder. In a preferred embodiment, a sequence of letters and/or numbers and/or special characters, preferably a unique identifier (UID), a universally unique identifier (UUID) or a globally unique identifier (GUID), is stored in the RFID transponder. In such an embodiment, the identifier is preferably the sequence of letters and/or numbers and/or special characters stored in the RFID transponder or a sequence of letters and/or numbers and/or special characters obtained according to a conversion rule from the sequence of letters and/or numbers and/or special characters stored in the RFID transponder.

The user interface (UI) according to the disclosure can be executed on an external device, preferably a computer other than the server, a smartphone or a tablet or a wearable, for example a smart watch. The operator of the server according to the disclosure can make the user interface available to the user as a download and can license the user to use the user interface. Several user interfaces can also be part of the system, for example if a user interface with a reduced number of interactive options in relation to a user interface for a computer with more interactive options is to be offered on a smartphone. In a preferred embodiment, the user interface has a graphical user interface (GUI).

The user interface (UI) has a UI change routine. The UI change routine causes a change signal to be transmitted. In a first embodiment, the change signal contains the identifier whose assignment is to be changed in the allocation table of a server and the media ID which is to be assigned to the identifier in the allocation table of a server. In a second embodiment, the change signal can contain only the media ID which is to be assigned to the identifier in the allocation table of a server, for example if the assignment of the media ID to an identifier results from other circumstances, for example because the selected media ID is a media ID of a series and the user is assigned only one identifier in the identifier table that is of an identification type that belongs to this series.

The method according to the disclosure for interacting with a server for providing media files for downloading, in particular for interacting with a server according to the disclosure, by means of a user interface, provides for the implementation of a UI change routine which causes a change signal to be transmitted, the change signal contains:
 a media ID or
 a media ID and an identifier A method for providing a media file for downloading from a server by a user, in which the server includes:
 an operating system in which the user is created,
 a media table stored in a memory, in which at least a first media ID is assigned to a first media file and a second media ID is assigned to a second media file,
 an identifier table stored in a memory in which an identifier which can be assigned to an identification carrier is assigned to the user,
 and an allocation table stored in a memory in which:
  i. the identifier can be assigned to at least the first media ID or the second media ID; and
  ii. the first media ID is not assigned to the identifier,
such that a UI change routine is conducted on a user interface, which causes a change signal to be transmitted, the change signal contains:
 a first media ID or
 a first media ID and an identifier
and the server receives the change signal and, after receiving the change signal, executes a program routine with which the allocation table is changed and assigns the first media ID to the identifier in the allocation table.

In a preferred embodiment, the user interface (UI) has a UI library routine. In a preferred embodiment, the UI library routine has the step of receiving a library signal, the library signal including one or more identifiers. In a preferred embodiment, the UI library routine has the step of sending a library request signal. In a preferred embodiment, the step of transmitting a library request signal precedes the step of receiving a library signal.

The library request signal may include a library criterion. In a preferred embodiment:
 the library criterion can be selected so that when it is used in the library routine of a server, all media IDs stored in the media table of the server are read (library criterion "all") and/or
 The library criterion can be selected so that when it is used in the library routine of a server, all media IDs stored in the media table of the server are read, to which certain metadata are assigned in the media table, for example belonging to a specific series or a specific categorization. such as the assignment to styles (pop, classical, RnB), (library criterion "certain metadata") and/or
 The library criterion can be selected so that when it is applied in the library routine of a server, all media IDs are read from the server's authorization table that are assigned in the authorization table to a particular user or user group to which the particular user belongs according to the servers user group table, (library criterion "User Media ID") and/or
 The library criterion can be selected in such a way that when it is applied in a servers library routine, all media IDs stored in the servers media table that are not assigned to a specific user or user group in the servers authorization table to which the specific user belongs according to the servers user group table are read (library criterion "New Media ID"), and/or
 The library criterion can be selected so that when it is applied in a servers library routine, all media IDs from the servers authorization table are read that are assigned in the authorization table to a particular user or user group to which the particular user belongs according to the servers user group table, and which are assigned in the servers allocation table to an identifier which is assigned in the servers identifier table to a specific user or user group to which the specific user belongs according to the servers user group table (library criterion "Assigned Media ID") and/or The library criterion can be selected so that when it is applied in a servers library routine, all media IDs are read from the servers authorization table that are assigned in the authorization table to a particular user or user group to which the particular user belongs according to the servers table of user groups, and which are not assigned in the servers allocation table to an identifier which is assigned in the servers identifier table to a specific user or user group to which the specific user belongs according to the user group table (library criterion "Free Media ID") and/or The library criterion can be selected so that when it is used in the library routine of a server:

First, all identifiers are determined in the servers identifier table that are assigned to the user or a user group to which the user belongs according to the servers user group table, and from these identifiers, it is determined to which of these identifiers an identifier type is directed that indicates the assignment of this identifier to a specific series, so that all series to which the user is assigned identifiers in the servers identifier table are determined, Then, all media IDs stored in the servers media table are read in which the allocation to one of the series thus determined is assigned in the servers media table, Then, the media IDs determined in this way are then used to determine those that are not assigned to the user or a user group to which the user belongs according to the servers user group table (library criterion "new media ID to known Series")

In a preferred embodiment, the UI library routine is started by an interaction of the user with the user interface. In a preferred embodiment, the UI library routine features the creation of filter buttons in a GUI of the UI. In a preferred embodiment, the user presses a filter button in the GUI to create a selection window in which the user is offered factors that influence the creation of the library criterion. In addition or alternatively, a filter button pressed by the user leads directly to the generation of a library request signal with a specific library criterion. In this embodiment, the filter buttons represent abbreviations for creating a library request signal with a certain library criterion.

For example, the GUI may contain a filter button with a certain label, e.g. "All", which, when pressed by the user, generates a library request signal with a library criterion that is selected in such a way that when it is used in the library routine of a server, all media IDs stored in the servers media table are read (library criterion "all"). For example, the GUI may contain a filter button with a certain label, e.g. "My", which, when pressed by the user, generates a library request signal with a library criterion, which is selected in such a way that when it is used in the library routine of a server, all media IDs are read from the servers authorization table that are assigned in the authorization table to a certain user or a user group to which the certain user belongs according to the servers user group table (library criterion "User Media ID"). For example, the GUI may contain a filter button with a certain label, e.g. "Assigned", which, when pressed by the user, generates a library request signal with a library criterion that is selected in such a way that when it is used in the library routine of a server, all media IDs are read from the servers table of permissions, which are assigned in the authorization table to a specific user or user group to which the specific user belongs according to the servers user group table, and which are assigned in the servers allocation table to an ID which is assigned in the servers ID table to a specific user or user group to which the specific user belongs according to the servers user group table (library criterion "Assigned Media ID"). For example, there may be a filter button in the GUI with a specific label, such as "Available", which, when pressed by the user, generates a library request signal with a library criterion selected so that when it is applied in the library routine of a server, all Media IDs are read from the servers permission table, which are assigned in the authorization table to a specific user or user group to which the specific user belongs according to the servers user group table, and which are not assigned in the servers allocation table to an identifier which is assigned in the servers identifier table to a specific user or user group to which the specific user belongs according to the user group table (library criterion "Free Media ID").

The UI library routine may include the step of displaying the media ID contained in the library signal to the user with the GUI. The UI library routine can include the step of presenting a selection of the media ID contained in the inventory signal to the user with the GUI.

In a first embodiment, the user interface can be designed such that:

the user can—preferably using the GUI—generate a library query that contains at least one library criterion, the user interface can generate a library request signal that contains this library criterion on the basis of this library query and can transmit the library request signal, the user interface receives the library signal in response to the transmission of the library request signal and shows the user—preferably by means of the GUI—the media ID contained in the library signal, preferably all media ID contained in the library signal.

In such an embodiment, the requirements for the memory on the external device necessary for the user interface and the requirements for the computing effort on the external device can be kept low. The steps of reading media IDs that meet the library criterion are performed on the server and from the media table and/or authorization table and/or allocation table on the server. The user interface only displays the media ID contained in the library signal to the user (all is preferred), because the library signal only contains the media ID which, after evaluation by the server, corresponds to the library criterion.

In a second embodiment, the user interface can be designed in such a way that it generates a library request signal in which the library criterion is selected such that when it is used in the library routine of a server, all media IDs stored in the servers media table are read (library criterion "all"). If the server receives a library request signal with the library criterion "all", the server reads all media ID from the media table as part of its library routine and generates a library signal which contains the media ID or media ID read in this way and sends out this library signal. In this embodiment, the UI library routine may include the step of presenting the GUI user with all of the media IDs contained in the library signal. In this embodiment, however, the UI library routine can also include the step of using the GUI to present the user with a selection of the media ID contained in the library signal. In such an embodiment, the user can use the user interface to select which media ID communicated to the user interface by the library signal should be displayed. This can lead to an increased memory requirement and an increased computing effort for the UI on the external device, but it can reduce the number of signals to be exchanged, because changing a filter criterion and displaying the media ID corresponding to this filter criterion can be done directly in the user interface without having to generate and transmit a new library request signal with a changed library criterion. Displaying only a selection of the media ID can also serve to adapt the amount of information to the available display area.

The user interface can be designed such that it generates this library request signal and the transmission of this library request signal as part of a UI start routine. This simplifies operation.

In a preferred embodiment, the UI change routine has the step of selecting a media ID. With the step of selecting a media ID, the user selects a media ID within the UI which becomes part of the change signal in the course of executing the UI change routine.

In a preferred embodiment, as part of the library routine, the user is shown a media ID or a plurality of media IDs in a GUI, from which the user can select at least one media ID by interacting with the GUI. For example, content buttons are shown to the user in a screen view, a respective content button being assigned to a media ID within the UI. The user can select the media ID by pressing the content button in the screen view.

In a preferred embodiment, the selection of a media ID triggers the UI change routine. In an alternative embodiment, after the selection of the media ID, a check is conducted to determine whether the selected media ID has already been assigned to the user or to a user group to which the user belongs. This test will determine whether:
 the selected media ID is already assigned to the user or a user group to which the user belongs, in which case the UI change routine can then be triggered,
 the selected media ID has not yet been assigned to the user or a user group to which the user belongs, in which a UI extension routine can then be triggered.

In a preferred embodiment, a change signal is generated in the UI change routine, which contains the media ID selected in this manner. In a first variant of this embodiment, a change signal is transmitted by the UI without any further selection steps being conducted after the media ID has been selected. This version allows the assignment to be changed quickly. In this type of version, the change signal does not contain an ID or the change signal contains an ID that was selected in a selection step before the media ID was selected. If the change signal does not contain an identifier, the assignment of the selected media ID to an identifier can result from other circumstances, for example, the selected media ID is a media ID of a series and the user is only assigned an identifier in the table of identifiers that is of an identifier type that belongs to this series.

In a second variant of this embodiment, the UI change routine contains the step of selecting an identifier before the step of generating the change signal. As part of the step of selecting an identifier, the UI change routine can perform a UI inventory routine.

In a preferred embodiment, the user interface (UI) has a UI inventory routine. The UI inventory routine can be conducted independently. The UI inventory routine can be performed as part of a UI change routine. In a preferred embodiment, the UI inventory routine has the step of receiving an inventory signal, the inventory signal including one or more identifiers. In a preferred embodiment, the UI inventory routine has the step of transmitting an inventory request signal. In a preferred embodiment, the step of sending an inventory request signal precedes the step of receiving an inventory signal.

The inventory request signal may include an inventory criterion. In a preferred embodiment:

The inventory criterion can be selected in such a way that when it is applied in the inventory routine of a server, all identifiers stored in the servers identifier table are read, which are assigned in the identifier table to a specific user or user group to which the specific user belongs according to the server's user group table (inventory criterion: "user identification") and/or The inventory criterion can be selected in such a way that, when it is applied in the inventory routine of a server, all identifiers stored in the servers identifier table are read, which are assigned in the identifier table to a specific user or user group to which the specific user belongs according to the server's user group table, and to which a specific type of identifier is assigned in the identifier table (inventory criterion: "specific user identifier") and/or The inventory criterion can be selected in such a way that, when it is applied in the inventory routine of a server, all identifiers stored in the servers identifier table are read, which are assigned in the identifier table to a specific user or user group to which the specific user belongs according to the server's user group table, and to which no media ID is assigned in the servers allocation table (inventory criterion: "free user ID") and/or The inventory criterion can be selected in such a way that, when it is applied in the inventory routine of a server, all identifiers stored in the servers identifier table are read, which are assigned in the server's identifier table to a specific user or user group to which the specific user belongs according to the servers user group table, and to which a different media ID can be assigned in the servers allocation table at the time of the query (inventory criterion: "changeable user ID") and/or The inventory criterion can be selected in such a way that when it is applied in the inventory routine of a server, all the identifiers stored in the servers identifier table are read, which in the servers identifier table belong to a particular user or user group to which the particular user belongs according to the servers user group table, and which can be assigned a different media ID in the servers allocation table other than the one in use at the time of the query, and which correspond to a specific identifier type or a selection of specific ID types (inventory criterion: "type-specific changeable user ID") and/or The inventory criterion can be selected in such a way that when it is applied in the inventory routine of a server, all device identifiers stored in the user table of the server or the user group table of the server are read, which are assigned to a specific user in the user table or in the user group table to a user group to which the specific user belongs according to the user group table (inventory criterion: "user device IDs").

The UI inventory routine can include the step of presenting the identifiers contained in the inventory signal to the user via the GUI. The UI inventory routine may include the step of presenting a selection of the identifiers contained in the inventory signal to the user via the GUI.

In a first embodiment, the user interface can be designed such that:
 the user—preferably using the GUI—can generate an inventory request that contains at least one inventory criterion, the user interface can generate an inventory request signal based on this inventory request, which contains this inventory criterion, and can transmit the inventory request signal, the user interface receives the inventory signal in response to the transmission of the inventory request signal and shows the user—preferably using the GUI—identifiers contained in the inventory request signal, preferably all identifiers contained in the inventory request signal.

In such an embodiment, the requirements for the memory on the external device necessary for executing the user interface and the requirements for the computing effort on the external device can be kept low. The steps of reading identifiers which correspond to the inventory criteria are conducted on the server and from the identifier table or the user table or the user group table on the server. The user interface presents the user with only those identifiers contained in the inventory signal (preferably all of them), because the inventory signal contains only those identifiers which, after evaluation by the server, meet the inventory criterion.

In a second embodiment, the user interface can be designed to generate an inventory request signal in which the inventory criterion is selected in such a way that when it is applied in the inventory routine of a server, all identifiers stored in the servers identifier table are read, which are assigned in the identifier table to a specific user or user group to which the specific user belongs according to the user group table of the server (inventory criterion: "user identification"). If the server receives an inventory request signal with the inventory criterion "user ID", the server reads, as part of its inventory routine, all identifiers stored in the identifier table of the server which are assigned in the identifier table to a specific user or a user group to which the specific user belongs according to the server's user group table and generates an inventory signal containing the identifiers read in this manner and sends this inventory signal. In this embodiment, the UI inventory routine can include the step of displaying all identifiers contained in the inventory signal to the user via the GUI. However, the UI inventory routine in this embodiment can also include the step of displaying a selection of the identifiers contained in the inventory signal to the user via the GUI. In such an embodiment, the user can use the user interface to select which identifiers communicated to the user interface by the inventory signal should be displayed. This can lead to an increased memory requirement and computational strain for the UI on the external device, but can reduce the number of signals to be exchanged, because the modification of an inventory criterion and the display of the identifiers corresponding to this inventory criterion can be done directly in the user interface without having to generate and send a new inventory request signal with a modified inventory criterion.

In a preferred embodiment, the UI change routine includes the step of executing the UI inventory routine. In a preferred embodiment, the step of executing the UI inventory routine is performed after the step of selecting a media ID. In a preferred embodiment, the media ID selected during the step of selecting the media ID influences the formation of the inventory criterion. In a preferred embodiment, the UI provides that, for a selected media ID which is assigned to a specific series, the inventory criterion is selected such that when it is used in the inventory routine of a server, all the identifiers stored in the servers identifier table are read, which are assigned in the identifier table to a specific user or a user group to which the specific user belongs according to the server's user group table, and to which a specific identifier type is assigned in the identifier table, namely the identifier type associated with the specific series. With this version, the user is only offered to select his/her identifiers in the GUI that belong to the series of the selected media ID. For example, if the user has selected a sequence of the series "Benjamin Blüchen"® as the media ID, the inventory criterion can be selected in such a way that the inventory signal only contains identifiers that are assigned to the series "Benjamin Blüchen"®.

In a preferred embodiment, the UI inventory routine and/or the UI change routine has the step of selecting an identifier. With the step of selecting an identifier, the user selects an identifier within the UI, which becomes part of the change signal in the course of executing the UI change routine.

In a preferred embodiment, as part of the UI inventory routine, in particular if this is conducted as part of the UI change routine, the user is shown one or more identifiers in a GUI, from which the user can select at least one identifier by interacting with the GUI. For example, identifier images are shown to the user in a screen view, a respective identifier image being assigned to an identifier within the UI. The user can select the identifier by touching the identifier image in the screen view.

Following the selection of an identifier, the UI change routine may include the step of generating a change signal that contains the selected media ID and the selected identifier. The UI can then transmit the change signal generated in this manner.

In a preferred embodiment, the user interface (UI) has a UI extension routine. The UI change routine causes an extension signal to be sent. The extension routine can be conducted independently. The UI extension routine can be executed as part of a UI change routine. In a first embodiment, the extension signal contains the user and/or the user group whose assignment is to be changed in the server's authorization table and the media ID which is to be assigned to the user and/or the user group. In a second embodiment, the structure of the extension signal can be selected such that the extension signal contains information about the media ID that is to be assigned to the user in the server's authorization table. The assignment to the user then results from further circumstances, for example when the extension signal received by the server is initiated by a user interface on which the user is logged in.

The UI extension routine can be triggered if a check conducted after the selection of a media ID shows that the selected media ID has not yet been assigned to the user or a user group to which the user belongs.

In a preferred embodiment, as part of the UI extension routine in a GUI in the context of a media ID that the user would like to assign to himself or to a user group to which he belongs, the user is offered a possibility of generating an extension signal. For example, the media ID and an action button can be shown to the user in a screen view.

In a first embodiment, pressing the action button can cause the extension signal to be generated and the extension signal to be transmitted. This embodiment is particularly suitable for cases in which the user can assign new media IDs to himself free of charge or for an execution in which the user has a credit status in a server. It is possible for the UI, preferably in the GUI, to request a confirmation from the user before the extension signal is sent, especially in the case of executions in which the assignment of the selected media ID to the user causes a change in the user's credit status.

In a second embodiment, pressing the action button can cause the generation of the extension signal and the transmission of the extension signal and a first step to generate an enable signal. In one embodiment in which the assignment of a media ID to a user or group of users in the authorization table of a server is made dependent on whether the server receives an enable signal, pressing the action button can cause a first step to generate an enable signal, for example generating a start signal for a transfer routine, for example a start signal for a PayPal® account, with which the enable signal can be generated. As an alternative to the parallel generation of the extension signal, the transmission of the extension signal and the triggering of a first step for generating an enable signal, it can also be provided that the step of triggering a first step for generating an enable signal is conducted first, and the steps of generating the extension signal and transmitting the extension signal are only executed when the UI and/or the server has received the enable signal.

In a preferred embodiment, the library signal for a media ID contained in the library signal contains the information about whether this media ID is already assigned to the user or a user group to which the user belongs in an authorization table of the server. This configuration allows the user to be shown in the UI, in particular and preferably in the GUI, whether a certain media ID already belongs to him/her. If the user is shown a media ID as a content button in a screen view, the content button of a media ID that already belongs to the user can look different from a content button of a media ID that does not yet belong to the user. For example, in contrast to the content button of a media ID that does not yet belong to the user, the content button of a media ID that already belongs to the user can be displayed as a check mark. This configuration also makes it possible, when selecting this media ID, to conduct a check as to whether the selected media ID is already assigned to the user or to a user group to which the user belongs or does not belong.

In a preferred embodiment, the following actions are taken in preparation for executing the UI change routine:
the UI inventory routine is executed,
an identifier is selected within the UI inventory routine that is associated with a particular series,
the UI library query is conducted, the library criterion being selected so that when it is used in the library routine of a server, all the media IDs stored in the server's media table are read, which are assigned to the series as metadata in the media table, and
the user is shown the media ID contained in the library signal in a GUI, from which the user can select at least one media ID by interaction with the GUI.

Selecting a media ID can cause the UI change routine to be executed. A change signal can be generated in the UI change routine that contains the selected identifier and the selected media ID. In this way, the user can be given the opportunity to check in the GUI for an identifier of a certain series, which media ID there is within the series (which sequences there are within the series) and to assign another or a different media ID of this series to the identifier belonging to this series.

In a preferred embodiment, the user interface has a UI start routine. In a preferred embodiment, the UI start routine has the step of establishing a communication channel with the server. The communication channel is in particular and preferably via the Internet. In a preferred embodiment, the UI start routine has the step of identifying the user on the server, in particular and preferably logging on to the server.

In a preferred embodiment, the user interface has a UI locking routine. The UI locking routine sends out a locking signal. The locking signal can include a user and/or a user group and an identifier and a locking notice. The locking signal can include a user and/or a user group and a device identifier and a locking notice.

The UI locking routine can be executed when the user assigns a locking notice to an identifier or device identifier using the UI, preferably in a GUI of the UI. In a preferred embodiment, the UI displays an identifier to the user and, in the context of displaying the identifier, provides a means of interaction, such as a button or slider, which the user can use to assign the locking notice to the identifier. In a preferred embodiment, a device identifier is displayed to the user with the UI and, in the context of the display of the device identifier, an interaction option, for example a button or a slider, which the user can use to assign the locking notice to the device identifier. By assigning the locking notice, the generation and transmission of the locking signal can be triggered.

In a preferred embodiment, the user interface has a UI unlock routine. The UI unlock routine transmits an unlock signal. The unlock signal can include a user and/or a user group and an identifier and an unlock notice. The unlock signal can include a user and/or a user group and a device identifier and an unlock notice.

The UI unlock routine can be executed when the user unlocks an existing locking notice using the UI, preferably in a GUI of the UI of an identifier or device identifier. In a preferred embodiment, the UI displays an identifier to the user and, in the context of displaying the identifier, provides a means of interaction, such as a button or slider, that allows the user to unlock the lock associated with the identifier. In a preferred embodiment, a device identifier is displayed to the user with the UI and, in the context of the display of the device identifier, an interaction option, for example a button or a slider, which the user can use to remove the locking notice assigned to the device identifier. By removing the locking notice, the generation and transmission of the unlocking signal can be triggered.

In a preferred embodiment, the user interface has a UI identifier table or can generate a temporary UI identifier table. In a preferred embodiment, the user interface writes all the identifiers which it has read from an inventory signal received by it after it has generated an inventory request signal in which the inventory criterion is "user identifier" and has sent this inventory request signal into the UI identifier table. In a preferred embodiment, an identifier type is assigned to the respective identifier in the UI identifier table. In a preferred embodiment, in all the described embodiments, the UI identifier table is queried instead of a query of the server identifier table. In this way, steps can advantageously be conducted that would in any case require a connection to the server, even if a connection cannot or should not be established, or cannot or should not be established with sufficient speed or quality.

In a preferred embodiment, the user interface has a UI authorization table or can generate a temporary UI authorization table. In a preferred embodiment, the user interface writes all media ID, which it has read from a library signal received by it, after it has generated a library request signal in which the library criterion is "all" and has transmitted this library request signal, into the UI authorization table.

By means of a particular and preferred embodiment of this embodiment:
the user—preferably using the GUI—can generate a library request that contains at least one library criterion,
the user interface reads all media IDs from the UI authorization table that meet the library criterion, and the user is shown—preferably by means of the GUI—all media IDs read from the UI authorization table.

In such an embodiment, the requirements for the memory on the external device required to implement the user interface and the requirements for the computing effort on the external device are somewhat higher, since a UI authorization table is stored in a memory of the external device and computing effort for reading the media IDs that correspond to another library criterion must be maintained. In this manner, however, steps can advantageously be conducted that would in any case require a connection to the server, even if a connection cannot or should not be established, or cannot or should not be established with sufficient speed or quality.

In a preferred embodiment, the user interface (UI) has a UI actual status routine. In a preferred embodiment, the UI actual status routine has the step of receiving an actual status signal, the actual status signal includes:
one media ID or multiple media IDs
one identifier or several identifiers
information about the assignment of the respective media ID to the respective identifier In a preferred embodiment, the UI actual status routine has the step of sending an actual state request signal. In a preferred embodiment, the step of sending an actual status request signal precedes the step of receiving an actual status signal. The actual status request signal can contain query criteria, for example an identifier.

The UI actual state routine can include the step of presenting the user, via the GUI, with the information contained in the actual status signal about the assignment of the respective media ID to the respective identifier.

In a first embodiment, the user interface can be designed such that
the user—preferably by means of the GUI—can generate an actual status query that contains at least one query criterion,
the user interface can generate an actual status request signal based on this actual status request, which contains this query criterion, and can transmit the actual status request signal,
the user interface receives the actual status signal in response to the transmission of the actual status request signal and
the user is shown—preferably by means of the GUI— information contained in the actual status signal about the assignment of the respective media ID to the respective identifier, preferably all information.

In such an embodiment, the requirements for the memory on the external device necessary for the user interface and the requirements for the computing effort on the external device can be kept low. The steps of reading the assignment of a media ID to an identifier from the allocation table that matches the query criterion are performed on the server and from the allocation table on the server. The user interface presents the user with information contained in the actual status signal about the assignment of the respective media ID to the respective identifier (preferably all of them), because the actual status signal only contains information about assignments which, after evaluation by the server, correspond to the query criterion.

In a second embodiment, the user interface can be designed in such a way that it generates an actual status request signal in which the query criterion is "all" and transmits this actual status request signal. If the server receives an actual status request signal with the query criterion "all", the server reads, as part of its actual status routine, all assignments of media IDs to identifiers that belong to a specific user or user group to which the specific user belongs according to the user group table, and generates an actual status signal containing the information read about the assignment of the respective media ID to the respective identifier and sends this actual status signal. The user interface can be configured to perform the generation of the actual status request signal, in which the query criterion is "all", and transmit this actual status request signal as part of the UI start routine. The user interface can present the user with information contained in the actual status signal about the assignment of the respective media ID to the respective identifier. In addition or alternatively, the user interface can write all information contained in the actual status signal about the assignment of the respective media ID to the respective identifier into a UI allocation table.

In a preferred embodiment, the user interface has a UI allocation table or can generate a temporary UI allocation table. A media ID is assigned to at least one identifier in the UI allocation table. Preferably, several identifiers are contained in the UI allocation table, at least one media ID being assigned to the respective identifier in the UI allocation table. In a preferred embodiment, in all the described embodiments, the UI allocation table is queried instead of the server allocation table being queried. In this way, steps can advantageously be conducted that would in any case require a connection to the server, even if a connection cannot or should not be established, or cannot or should not be established with sufficient speed or quality.

In a preferred embodiment, the user interface has a UI user maintenance routine. The UI user maintenance routine can transmit a user maintenance signal. The user maintenance signal can include a user and a user group. By sending the user maintenance signal, the server receiving such a user maintenance signal can be prompted to change the assignment of users to a user group in the user group table.

In a preferred embodiment, the user maintenance signal can contain an e-mail address. When executing the UI user maintenance routine, the user can be asked by the UI, for example by a GUI of a UI, to enter an e-mail address.

In a preferred embodiment, the user interface has a UI player maintenance routine. The UI player maintenance routine can cause a player maintenance signal to be sent out. The player maintenance signal can include a user and/or a user group and a device identifier. By transmitting the player maintenance signal, the server receiving such a player maintenance signal can be caused to change the assignment of a device identifier to a user and/or a user group in the user table or the user group table.

In a preferred embodiment, the system has a device for reproducing a media file, in particular for reproducing audio information. The device for playing back a media file is also referred to as a playback device.

In a preferred embodiment, the playback device has
a speaker or a speaker connection,
a sensor that can detect a property or a change in a property of this environment within a region of its environment and
a control unit which can control the speaker or the speaker connection for the reproduction of the media file, in particular for the reproduction of the audio information, if the sensor detects, within the area of its environment, a certain property or a certain change of a property of this environment or if the control unit detects a certain change of the property detected by the sensor.

In a preferred embodiment, the playback device has no display and no display connection and is only designed to play audio files, but is not designed to play video files.

In a preferred embodiment, the playback device has a memory. In a preferred form of embodiment, a playback device AV allocation table is stored in the memory of the playback device, it being possible for a media ID and/or a media file to be allocated to an identifier by means of the playback device allocation table in the memory of the playback device. The assignment of the media ID and/or media file to the identifier in the playback device allocation table in the memory of the playback device can be limited to identifying the storage location of the media file assigned to the identifier in the memory or another memory of the playback device. In this manner, it is possible for a control unit of the playback device to determine, by reading the playback device allocation table in the memory of the playback device, at which position in the memory or the additional memory of the playback device a media file is stored, on the basis of which the control unit is then used to control the loudspeaker or the loudspeaker connection. It is also possible that the media ID and/or the media file is assigned to the ID in the playback device allocation table in the memory of the playback device by storing a pointer to a media file in the playback device allocation table. Such a pointer can be a URL, for example. The reading of such a pointer can be used by the control unit of the playback device to download or stream a media file not stored in a memory of the playback device from another storage location, for example from the server according to the disclosure.

In a preferred embodiment, the version information, preferably a time stamp, is assigned to an identifier in the playback device allocation table in the memory of the playback device.

In a preferred embodiment, the need for an update can be assigned to an identifier in the playback device allocation table in the memory of the playback device.

In a preferred embodiment, a playback device update routine is provided in the playback device. The update routine transmits an actual status signal of the playback device. The actual status signal of the playback device includes
one identifier or several identifiers,
the version information assigned to the respective identifier in the playback device allocation table, in particular the time stamp assigned to the respective identifier in the playback device allocation table, and/or
the media ID assigned to the respective identifier in the playback device allocation table.

To generate the actual status signal of the playback device, the control unit of the playback device reads the playback device allocation table. In a preferred embodiment, the control unit in the playback device update routine reads the playback device allocation table completely. The actual status signal of the playback device then contains:
any identifier that is stored in the playback device allocation table,
the version information assigned to the respective identifier in the playback device allocation table, in particular the time stamp assigned to the respective identifier in the playback device allocation table, and/or
the media ID assigned to the respective identifier in the playback device allocation table.

In a preferred embodiment, the playback device update routine includes receiving an update signal. The update signal can contain one identifier or several identifiers.

In a preferred embodiment of the playback device update routine, the control unit reads the update signal and changes the playback device allocation table by assigning the need for an update to each identifier contained in the update signal in the playback device allocation table. If the control unit later reads the entry for an identifier located in the playback device allocation table, for example in order to play the media file assigned to the identifier, and the control unit then determines that the identifier is associated with an update need, the control unit can perform a request routine to initiate. With the request routine, the control unit can load a media file from the server into a memory of the playback device. This can reduce the amount of communication between the playback device and the server. The playback routine does not download a media file to an identifier that was contained in the update signal until this media file is actually used in the playback device. Until then, the fact that there is a different/new media file for the identifier is stored within the playback device simply by setting the update requirement.

In a preferred embodiment, the update signal contains one or more identifiers and a media file for each identifier. In this manner, the playback device can update the media file stored in it immediately if the playback device receives the update signal indicating that the media file has changed for certain identifiers.

In a preferred embodiment, the update signal contains one or more identifiers and a media ID for each identifier. In a preferred embodiment of the playback device update routine, the control unit reads the update signal and changes the playback device allocation table by assigning the respective identifier which was contained in the update signal to the media ID which was transmitted in the update signal to the identifier. In a preferred embodiment, the control unit to which it has assigned a new media ID assigns the update requirement.

In a preferred embodiment, a request routine is provided in the playback device. The request routine causes a playback device request signal to be sent. The playback device request signal contains an identifier. In a preferred embodiment, the request signal contains a device identifier of the playback device. In a preferred embodiment, the playback device request signal includes an indication that an update is needed.

In a preferred embodiment, the playback device request signal can be generated if the sensor detects a specific property or a specific change in a property of this environment within the region of its environment or if the control unit detects a specific change in the property determined by the sensor, in particular if the sensor recognizes the presence of an identification carrier and recognizes the identifier of the identification carrier. In a preferred embodiment, the playback device request signal contains the identifier that the sensor has read from the identification carrier.

In a preferred embodiment, the playback device request signal will always be generated if the sensor detects a specific property or a specific change in a property of this environment within the area of its environment or if the control unit detects a specific change in the property determined by the sensor, in particular if the sensor detects the presence of an identifier and recognizes the identifier of the identification carrier. The playback device request signal can be sent with a time delay, in particular if the playback device does not have a communication channel to the server at the time the playback device request signal is generated.

In a preferred embodiment, the control unit checks in the request routine whether there is an entry in the playback device allocation table for the identifier recognized by the sensor. If there is no entry or if there is an entry that contains a need for an update, the control unit generates a playback device request signal with an indication of a need for an update.

If the server receives a playback device request signal with an indication of a need for an update, the server checks which of the media IDs of the identifier is assigned in the allocation table and generates a response signal. The response signal contains a media file and/or a pointer which is assigned to this media ID in the media table. The response signal preferably contains the identifier, which was contained in the playback device request signal, and preferably the media ID and preferably the version information associated with the media file in the media table, in particular and preferably a time stamp. When the control unit of the playback device with the response signal receives the media file or the pointer and the identifier assigned to this media file or this pointer, the control unit stores the media file in a memory of the playback device and updates the allocation table by adding the identifier in the allocation table, assigns the storage location of the media file in the memory of the playback device or assigns the pointer to the identifier in the allocation table. In a preferred embodiment, the control unit can reset a set update requirement. In a preferred embodiment, the control unit of the identifier can assign the version information, in particular the time stamp, which the control unit communicated to the control unit together with the media file. In a further embodiment, the control unit can assign a self-generated time stamp to the identifier.

This embodiment makes it possible to keep the playback device simple in terms of its structure and in terms of the software to be executed by the device's control unit. The playback device is already operational within the system if it can perform two core functions, namely reading the identifier of an identification carrier and executing the request routine. If there is already an entry for this identifier in the playback device allocation table stored in the memory of the playback device and, in a preferred embodiment, no update need is assigned to this identifier, the control unit only needs to be designed to provide the information assigned to the identifier in the playback device allocation table, to read the media files and to use the information about the media file, in particular about its storage location, to read or stream the media file from the storage location and thus control the speaker or the speaker connection. Or in the case in which the identifier that is read does not yet exist in the playback device allocation table in the memory of the device, write this identifier in the playback device allocation table in the memory of the device and generate the playback device request signal.

executes the playback device update routine.

This embodiment thus differs from the approach chosen in US 2018/0353869 A1. There, under the heading "Remote administration of control object 120", a routine is described as to how a user directly accesses the device via an external device, for example a smartphone, a tablet or an external computer, for example a laptop. Within this routine, the possibility should be created to adapt the information stored in the identification carrier. In the procedure provided for in US 2018/0353869 A1, the device must therefore be powerful enough to understand the request transmitted to it by the external device to change the information stored in the identifier carrier and to translate it in a change routine to be executed by it, by means of which it actively intervenes in and changes the information stored in the identification carrier. This requires high demands with regard to the program and the electrotechnical equipment of the device. However, the system according to the disclosure and the server according to the disclosure make it possible, as described above with regard to a preferred embodiment, to simply equip the playback device itself. Complex calculation steps, such as the comparison of version information, are outsourced to the server in the inventors preferred embodiment.

In one embodiment, the media files stored in the memory of the playback device can have different formats. In a preferred embodiment, the media files stored in the memory of the playback device have the same format. In an alternative embodiment, the media files stored in the memory of the playback device have a format from a group of formats, the group in particular and preferably containing not more than 20, in particular and preferably not more than 10, in particular and preferably not more than 5 different formats.

In a preferred embodiment, a playback device start routine is provided in the playback device. In a preferred embodiment, the playback device executes the playback device start routine when the playback device is switched on, with switching on also being understood to mean waking up from an energy-saving state.

As part of the playback device start routine, the playback device can request the server to inform it of the current time. This allows the player to be kept simple because the player itself does not need a clock.

As part of the playback device start routine, the playback device can request the server to inform it of the current status of the firmware or to check whether the current status of the firmware is running on the playback device. In a preferred embodiment, the playback device transmits information about its firmware status to the server as part of the playback device start routine. The server checks whether the firmware version is current and, if necessary, transmits a more current firmware version to the playback device.

As part of the playback device start routine, the player can also perform the playback device update routine.

In a preferred embodiment, the playback device has an operating element. In a preferred embodiment, the playback device executes the playback device update routine when the control element is activated, in particular and preferably when the control element is actuated in a certain way, in particular and preferably over a certain period of time. For example, if a control element is pressed for a certain time, for example for more than 3 seconds.

A system according to the disclosure has a server according to the disclosure and a user interface according to the disclosure.

A system according to the disclosure has a server according to the disclosure and a user interface according to the disclosure and an external device on which the user interface can be executed.

A system according to an embodiment of the disclosure has a server according to an embodiment of the disclosure and an identification carrier in which the identification carrier has an identifier which can be read by a reading device.

A system according to an embodiment of the disclosure has a server according to an embodiment of the disclosure and an identification carrier in which the identification carrier has an identifier which can be read by a reading device, and a user interface according to an embodiment of the disclosure.

A system according to an embodiment of the disclosure has a server according to an embodiment of the disclosure and an identification carrier in which the identification carrier has an identifier which can be read by a reader, and a user interface according to an embodiment of the disclosure and an external device on which the user interface can be executed.

A system according to an embodiment of the disclosure has a server according to an embodiment of the disclosure and a playback device.

A system according to an embodiment of the disclosure has a server according to an embodiment of the disclosure and a playback device and a user interface according to an embodiment of the disclosure.

A system according to an embodiment of the disclosure has a server and a playback device according to an embodiment of the disclosure and a user interface according to an embodiment of the disclosure and an external device on which the user interface can be executed.

A system according to an embodiment of the disclosure has a server according to an embodiment of the disclosure and a player and an identification carrier in which the identification carrier has an identifier which can be read by a reading device.

A system according to an embodiment of the disclosure has a server according to an embodiment of the disclosure and a playback device and an identification carrier in which the identification carrier has an identifier which can be read by a reading device, and a user interface according to an embodiment of the disclosure.

A system according to an embodiment of the disclosure has a server according to an embodiment of the disclosure and a playback device and an identification carrier in which the identification carrier has an identifier which can be read by a reading device, and a user interface according to an embodiment of the disclosure and an external device on which the user interface can be executed.

In a preferred embodiment, a signal containing an identifier contains a placeholder in addition to the identifier or in place of the identifier. In a preferred embodiment, the change signal, the inventory signal, the actual status signal, the stress signal, the locking signal, the unlock signal, the update signal, the response signal, the inventory request signal, the extension signal, the playback device actual status signal and/or the playback device request signal contain a placeholder in addition to the identifier or in place of the identifier. If, in a preferred embodiment, the identifier is a UID, UUID or GUID or other type of a longer sequence of letters and/or numbers and/or special characters, it may be desirable to provide the user with a placeholder for presentation in the UI, preferably for presentation in the GUI, and for interaction with the UI, preferably for interaction with the GUI, the placeholder preferably being shorter than the sequence of letters and/or numbers and/or special characters of the identifier. The UI, in particular the GUI, may allow the user to choose a placeholder for an identifier. This placeholder can be stored in the identifier table for the identifier.

In a preferred embodiment, a signal that contains a device identifier contains, in addition to the device identifier or placeholder of the device identifier, a placeholder. In a preferred embodiment, this contains the inventory signal, the stress signal, the locking signal, the unlock signal, the player maintenance signal, the inventory request signal, and/or the playback device request signal in addition to the identifier or a placeholder for the identifier. If, in a preferred embodiment, the device identifier is managed as a UID, UUID or GUID or as another type of a longer sequence of letters and/or numbers and/or special characters, it may be desirable for the user to be represented in the UI, preferably for representation in the GUI and for interaction with the UI, preferably for interaction with the GUI, to specify a placeholder that is preferably shorter than the sequence of letters and/or numbers and/or special characters of the device identifier. The UI, in particular the GUI, can enable the user to choose a placeholder for a device identifier. This placeholder can be stored in the user table and/or the user group table for the device identifier.

In a preferred embodiment, a signal that contains a media ID contains, in addition to the media ID or placeholder for the media ID, a placeholder. In a preferred embodiment, the change signal, the library signal, the expansion signal, the release signal, the actual status signal, the update signal, the response signal, the library request signal, the expansion signal, the actual status signal of the playback device, the playback device request signal in addition to the media ID or placeholder for the media ID is a placeholder. If, in a preferred embodiment, the media ID is managed as a UID, UUID or GUID or as another type of a longer sequence of letters and/or numbers and/or special characters, it may be desirable for the user to be shown in the UI, preferably for the placeholder in the GUI and for interaction with the UI, preferably for interaction with the GUI, to specify a placeholder that is preferably shorter than the sequence of letters and/or numbers and/or special characters of the media ID. The UI, in particular the GUI, can enable the user to choose a placeholder for a media ID. This placeholder can be stored in the media table for the media ID.

The disclosure is described in this description in the context of signals that trigger queries from tables, primarily with reference to a user and a user group to which the user belongs according to the user group table and/or with reference to a user and/or a user group. This is the case in particular for the extension signal, the stress signal, the locking signal, the unlock signal and/or the player maintenance signal. This version of the preferred embodiments is preferred because it is assumed that a user is normally interested in being able to see all identifiers, media IDs or device identifiers which are associated with them.

Within these embodiments, but also as an independent embodiment, special embodiments are also possible in which the signal only queries the user; the description in the context of the signals then applies under the condition that the reference to a user and a user group to which the user belongs according to the user group table and/or the reference to a user and/or a user group is changed into a reference to (only) a user and no reference to a user group; this is in particular the case for the extension signal, the load signal, the locking signal, the unlock signal and/or the playback device maintenance signal. This kind of special embodiment is useful if the user is specifically interested in assignments to a user, preferably himself, but possibly also the assignment to another user whose assignment he is allowed to see, for example if users within the same household are allowed to see each other's assignments. It is thus possible that the UI, preferably by means of the GUI, offers the user the option of choosing whether he wants to see all assignments that affect him and user groups to which he belongs, or only assignments to a specific user (without the assignment to user groups). Embodiments also possible in which the creation of user groups is not intended. The description in the context of the signals then applies under the condition that the reference to a user and a user group to which the user belongs according to the user group table and/or the reference to a user and/or a user group is changed to a reference to (only) a user and no reference to a user group; this is especially the case for the extension signal, the demand signal, the locking signal, the unlock signal and/or the playback device maintenance signal.

Within these embodiments, but also as an independent embodiment, special embodiments are also possible in which the signal only queries the user group; the description in the context of the signals then applies under the condition that the reference to a user and a user group to which the user belongs according to the user group table and/or the reference to a user and/or a user group is changed to a reference to (only) a user group and no reference to a single user; this is in particular the case for the extension signal, the load signal, the locking signal, the unlock signal and/or the playback device maintenance signal. This kind of special embodiment is useful if the user is specifically interested in assignments to a user group. It is thus possible that the UI, preferably by means of the GUI, offers the user the option of choosing whether he wants to see all assignments concerning him and user groups to which he belongs or only assignments to a user group (without the assignment to a single user). Embodiments are also possible in which the use of users alone is not intended and only user groups are used. In these embodiments, it is possible that each user is assigned to at least one user group, whereby such a user group can also consist of a single user. The description in the context of the signals shall then apply subject to the proviso that the reference to a user and a user group to which the user belongs according to the user group table and/or the reference to a user and/or a user group is changed to a reference to (only) a user group and no reference to a user; this is especially the case for the extension signal, the load signal, the locking signal, the unlock signal and/or the playback device maintenance signal.

In this description, the disclosure is used in the context of criteria, in particular criteria that are contained in request signals, primarily with reference to a user and a user group to which the user belongs according to the user group table and/or with reference to a user and/or user group described. This is the case in particular for the library criterion and the library request signal contain the library criterion, the inventory criterion and the inventory request signal the inventory criterion and the query criterion and the actual status request signal containing the query criterion. This embodiment of the preferred embodiments is preferred because it is assumed that a user is normally interested in being able to see all identifiers, media IDs or device identifiers which are associated with them.

Within these embodiments, but also as an independent embodiment, special embodiments are also possible in which the criterion and the signal containing it only queries the user; the description in the context of the criteria and the signals containing them then applies on the condition that the reference to a user and a user group to which the user belongs according to the user group table and/or the reference to a user and/or a user group is changed to a reference to (only) a user and no reference to a user group; this is especially the case for the library criterion and the library request signal containing the library criterion, the inventory criterion and the inventory request signal containing the inventory criterion, and the query criterion and the actual status request signal containing the query criterion. This type of special embodiment is useful if the user is specifically interested in assignments to one user, preferably himself, but possibly also the assignment to another user whose assignment he is allowed to view, for example if users within the same household are allowed to see each other's assignments. It is thus possible that the UI, preferably by means of the GUI, offers the user the option of choosing whether he wants to see all assignments that affect him and user groups to which he belongs, or only assignments to a specific user (without the assignment to user groups). Embodiments are also possible in which the creation of user groups is not intended. The description in the context of the criteria and the signals containing them is then valid under the condition that the reference to a user and a user group to which the user belongs according to the user group table and/or the reference to a user and/or a user group is changed into a reference to (only) a user and no reference to a user group; this is especially the case for the library criterion and the library request signal containing the library criterion, the inventory criterion and the inventory request signal containing the inventory criterion and the query criterion and the actual status request signal containing the query criterion.

Within these embodiments, but also as an independent embodiment, special embodiments are also possible in which the criterion and the signal containing it only queries the user group; the description in the context of the criteria and the signals containing them then applies on condition that the reference to a user and a user group to which the user belongs according to the user group table and/or the reference to a user and/or a user group is changed to a reference to (only) a user group and no reference to an individual user; this is especially the case for the library criterion and the library request signal containing the library criterion, the inventory criterion and the inventory request signal containing the inventory criterion, and the query criterion and the actual status request signal containing the query criterion. This type of special embodiment is useful if the user is specifically interested in assignments to a user group. It is thus possible that the UI, preferably by means of the GUI, offers the user the option to view all assignments that concern him and user groups to which he belongs, or only assignments to a user group (without the assignment to a single user). Embodiments are also possible in which the use of users alone is not intended and only user groups are used. Within such embodiments, it is possible that each user is assigned to at least one user group, whereby such a user group can also consist of a single user. The description in the context of the criteria and the signals containing them then applies under the condition that the reference to a user and a user group to which the user belongs according to the user group table and/or the reference to a user and/or a user group is changed into a reference to (only) a user group and no reference to a user; this is in particular the case for the library criterion and the library request signal the library criterion, the inventory criterion and the inventory request signal containing the inventory criterion and the query criterion and the actual status request signal containing the query criterion.

The reference to a user in a signal can be made by the fact that the user, or information identifying the user, is contained in the signal, for example by placing it at a certain position in the signal or by identifying it within the signal by prefixing a keyword. However, the reference to a user in a signal can also be made by having a designated communication channel between the sender of the signal (e.g. the UI) and the receiver of the signal (e.g. the server), which alone determines that each signal sent via this communication channel originates from a specific user. The disclosure can then be implemented in such a way that the user from whom the signal originates is taken as a reference to a user in a signal. For example, the user can establish a designated communication channel between the UI and the server, in which he logs into the UI and then logs into the server from the UI.

If it is explained in this description that a device (in particular a server, external device, playback device) reads information from a table, this can also be achieved by determining the information not directly, but indirectly from the table, for example with conversion or other intermediate steps, with or without using further information from other tables.

In a preferred embodiment, the playback device has a device identifier and a device for transmitting a signal dependent on the device identifier. A device identifier can be the identifier of a processor or a memory chip. The device identifier can also be an identifier provided separately from a processor or a memory chip, for example a tag, for example an RFID transponder, which is provided as part of the playback device. In a preferred embodiment, the device identifier is selected such that it is suitable for uniquely identifying the playback device in relation to an external control unit, for example a server.

The device for transmitting a signal dependent on the device identifier can transmit a wired signal, for example if the playback device is connected to an external control unit via a cable. The device for transmitting a signal dependent on the device identifier can, however, also transmit a radio signal, for example a signal according to an NFC standard, a Bluetooth standard or a WLAN standard, for example if the playback device is integrated into a radio network.

The provision of a device identifier and the possibility of transmitting a signal dependent on the device identifier, for example to an external control unit, for example a server, enables further data traffic between the playback device and an external control unit and/or an external memory to be determined beforehand to make defined permissions dependent. This description describes embodiments of the disclosure in which the playback device is used to play back content (in particular audio books, music or other audio information, images, videos or 3D information), but in which a data packet is transferred from an external memory to a memory of the playback device before playback. This data packet may—depending on the selected data system or data structure—contain all or parts of the content to be played back. The provision of a device identifier and the possibility of sending a signal dependent on the device identifier can now be used to make a request for the transmission of a data packet from the playback device to the external control unit and/or the external memory dependent on an authorization check, showing that a playback device with such a device identifier is authorized to receive the data packet.

This type of identification of the playback device in a network or in a system can be used to bill a user of the playback device for the transmission of data packets to the playback device. Thus, the transmission of individual data packets, e.g. the transmission of data packets necessary for the playback of an audio book, can be billed individually. Flat rate billing systems are also conceivable. Or linking the possibility of downloading such data packages to a time or period of time, for example in the sense of "borrowing an audio book".

This type of identification of the playback device in a network or in a system can also be used to transmit control information concerning the operation of the playback device, which is kept as a data packet in an external memory until the playback device logs on to the system with the corresponding device identification, to exactly the playback device. If such a playback device is integrated, for example, into a system which is intended to enable third parties, for example parents, to limit the usage time of the playback device or the maximum volume of the playback of audio information via a program (a user interface) on a smartphone or a tablet of the third party, an embodiment is conceivable in which the restrictions generated on the smartphone or the tablet are stored as a data package in an external memory or in an external control unit, for example a cloud (a server). The device identifier allows the third party to inform the external storage or external control unit for which playback device the data package is intended. If the playback device logs on with this device identifier, the data package is then transferred to the playback device.

In a preferred embodiment, the system according to the disclosure provides an external memory from which a data packet can be transferred to a memory of the playback device and/or to which a data packet can be transferred from the playback device if the sensor has a specific property within the area of its environment or detects a specific change in a property of this environment or if the control unit detects a specific change in the property detected by the sensor. Such external storage can be, for example, a "cloud". The external memory can preferably be designed such that it only transmits data packets after an authorization check, with handshake methods, encryption methods, secret and public keys or a combination of a selection of these techniques being further preferably used for the authorization check. The device identifier can also be used for the authorization check.

In a preferred embodiment, the system according to the disclosure provides an external control unit to which a data packet can be transmitted from the playback device if the sensor detects a specific property or a specific change in a property of this environment within the area of its environment or if the control unit detects a specific change in the property detected by the sensor. Such an external control unit can be a server, for example. This server can be part of a local area network or part of the Internet.

In a method according to an embodiment of the disclosure, a provision is made for a playback device with
- a speaker or a speaker connector,
- a sensor that can detect a property or a change in a property of this environment within a region of its environment,
- a control unit which can activate the speaker or the speaker connection for the reproduction of music or a spoken story if the sensor detects, within the range of its environment, a certain property or a certain change of a property of this environment or if the control unit detects a certain change of the property detected by the sensor,
- a memory and a data set (a media file) stored in the memory, and a receiving unit for a certain release signal, in order to provide a method for reproducing music or a spoken story on a playback device designed in this way, in which the control unit activates the speaker or the speaker connection for reproducing music or a spoken story on the basis of the data set (which can be activated when the control unit has received the specific enable signal.

The method according to an embodiment of the disclosure results in the storage of data records (media files) in the memory of the playback device which are blocked for the control unit. In a preferred embodiment, the control unit cannot activate the speaker or the speaker connection to play audio information based on the data set if the control unit has not yet received the specific enable signal.

The disclosure can also be implemented in the context of a system, the system having a playback device with a speaker or a speaker connector, a sensor that can detect a property or a change in a property of this environment within a region of its environment, a control unit which can activate the speaker or the speaker connection for the reproduction of music or a spoken story, if the sensor detects within the range of its environment a certain property or a certain change of a property of this environment or if the control unit detects a certain change of the property detected by the sensor, wherein the computer has a control unit, wherein the system has a data line (in particular and preferably a communication/computer network) between the playback device and the computer, wherein the data record stored in the memory of the computer can only be called for the control unit of the playback device via the data line when the control unit of the computer has received a specific release signal, and wherein where the control unit can activate the speaker or the speaker connection to play music or a spoken story based on the data set.

Embodiments of the disclosure thus makes it possible to manage replay authorizations. If the data set, on the basis of which the control unit can activate the speaker or the speaker connection for the reproduction of music or a spoken story based on the data set, is already present in the memory of the control unit, the control unit makes it dependent on the receipt of the specific enable signal whether it activates the speaker or the speaker connection for the reproduction of music or a spoken story based on the data set. If the data record is still stored on a computer, for example a server, the data record stored in the memory is only retrievable for the control unit of the playback device via the data line when the control unit of the computer has received a specific enable signal.

In a preferred embodiment of this embodiment, in which the data record is already stored in the memory of the playback device, the receiving unit for the specific release signal is a different module than the sensor also provided in the playback device, which is a property or a change of a property within a region of its environment in this environment. In a preferred embodiment, the sensor is a reading device for an RFID transponder and the receiving unit for the specific enable signal is a receiving unit for an NFC signal or a receiving unit for a Bluetooth signal or a receiving unit for a WLAN signal.

In a preferred embodiment, the sensor transmits an identifier to the control unit when the sensor detects a property or a change in a property of that environment within a region of its environment, or the control unit determines an identifier from a signal from the sensor, the sensor transmitting the signal to the control unit when the sensor detects a property or a change in a property of that environment within a region of its environment.

In a preferred embodiment, the playback device has an allocation table (hereinafter: referred to as the allocation table), in which possible values for an identifier assign information about data records (media files). The playback device allocation table assigns information about a data record (a media file) to a value that the identifier can accept. If the control unit receives an identifier with a certain value from the sensor or if the control unit determines a certain value from the signal of the sensor, the control unit can read from the playback device allocation table that this identifier value is allocated certain information about a data record (a media file). The specific information can be for example the file name of the data set or the storage location of the data set.

The receipt of the specific release signal by the control unit can cause the control unit to revise the WIP allocation. In a preferred embodiment, the control unit adds a new value for an identifier to the WIP allocation table and assigns new information about a record to this new value in the WIP allocation table. In an alternative embodiment, the control unit changes the information about a data record that is assigned to the value of the identifier. For example, the record information associated with a value may be "no record" or "unknown" or "locked", and the control unit may change this information to, for example, a specific file name or record location information after receiving the specific enable signal.

Embodiments are also possible in which the playback device allocation table contains, in addition to the assignment of a data record to a value of the identifier, a status attribute for the respective data record. The status attribute can, for example, be "activated". In the opposite case, the status attribute can be "not activated" or "locked". In such an embodiment, the receipt of the specific release signal can lead to the control unit changing the status attribute, in particular changing from "not activated" to "activated".

Embodiments are also possible in which the receipt of the specific release signal leads to the assignment of a possible value (an identifier) to information (media ID) about a data record (media file) in the assignment of this value (identifier) to one unit of Information (media ID) about another record (media file) is changed.

Embodiments are also possible in which the receipt of the specific release signal results in the assignment of a possible value (an identifier) to information (media ID) via a data record (media file) being changed to the assignment of this value (identifier) to information (media ID) via another data record (media file).

In a preferred embodiment, the specific release signal is assigned to a single, specific data record. The control unit can activate the speaker or the speaker connection for playing music or a spoken story based on the specific data record if the control unit has received the specific release signal. The ability of the control unit to control the speaker or the speaker connection for playing music or a spoken story on the basis of another data record stored in a memory of the control unit remains unaffected by the reception of the specific release signal in a preferred embodiment. If the other data record is released for playback, it remains released. If the other data record is locked, it remains locked and is only released when the control unit has received the specific release signal for the other data record.

In a preferred embodiment of the embodiment in which the data record is stored in the memory of a computer (preferably a server) of the system, the computer preferably has an allocation table. In a preferred embodiment, the sensor transmits an identifier to the control unit if the sensor detects a property or a change in a property of this environment within a region of its environment, or the control unit determines an identifier from a signal of the sensor, the sensor indicating the signal the control unit sends when the sensor detects a property or a change in a property of this environment within a region of its environment. In a preferred embodiment, the control unit uses the identifier to send a request to the computer to download a record (a playback device request signal). In the computer's allocation table, information (media ID) about data records (media files) is preferably assigned for the possible values of the identifier. The allocation table assigns information (a media ID) about a data record (a media file) to a value that the identifier can accept. If the control unit transmits a signal to the computer containing the identifier (a playback device request signal), the computer can read from the allocation table that certain information (a media ID) about a data record (a media file) is assigned to this value of the identifier. The specific information can be, for example, the file name of the data record or the storage location of the data record.

The receipt of the specific release signal, which can also be the change signal, by the computer can cause the computer to revise the allocation table. In a preferred embodiment, the computer adds a new value for an identifier to the allocation table and assigns new information about a data record to this new value in the allocation table. In an alternative embodiment, the computer, in particular and preferably after receiving a change signal, changes the information (the media ID) about a data record which is assigned to the value of the identifier. For example, the information about a record associated with a value may have the content "no record" or "unknown" or "locked", and the computer can change this information, for example, into a concrete file name or information (a media ID) about a location of the record after receiving the specific enable signal.

Embodiments are also possible in which the allocation table of the computer contains, in addition to the assignment of a data record to a value of the identifier, a status attribute for the respective data record. The status attribute can, for example, be "activated". In the opposite case, the status attribute can be "not activated" or "locked". In such an embodiment, the receipt of the specific release signal can cause the control unit to change the status attribute, in particular changing from "not activated" to "activated".

Embodiments are also possible in which the receipt of the specific enable signal, in particular and preferably an enable signal designed as a change signal, results in the assignment of a possible value (an identifier) to information (a media ID) via a data record (a media file) being changed into the assignment of the computer of this value (this identifier) to information (a media ID) via another data record (another media file)

Embodiments are also possible in which the receipt of the specific release signal, which can also be a change signal, causes the assignment of a possible value to information about a data record to be changed to the assignment of this value to information about one data record and information about another data record. For example, the possible value of the identifier can be assigned to a sequence of information about data records.

In a preferred embodiment, the specific release signal, preferably a release signal designed as a change signal, is assigned to a single, specific data record. The specific data record stored in the memory of the computer can only be called for the control unit of the playback device via the data line when the control unit of the computer has received a specific release signal for this specific data set. In a preferred embodiment, the ability of the control unit calling up another data record stored in the memory of the computer remains unaffected by the reception of the specific release signal. If the other data record is released for retrieval, it remains released. If the other data record is locked, it remains locked and is only released when the control unit has received the specific release signal for the other data record.

In a preferred embodiment, the computer is a server or a computer of a network of computers connected to a cloud.

In a preferred embodiment, the data line is a direct radio line between the playback device and the computer, for example a connection via a WLAN or a connection via Bluetooth or NFC. In an alternative embodiment, the data line is a connection over the Internet.

In a preferred embodiment, a generation unit for a specific enable signal is connected to the receiving unit for a specific enable signal provided on the playback device or a generating unit for a specific enable signal is provided as part of the system. Such a generating unit can be a credit card reader as a subassembly, in particular and preferably a credit card reader for reading an RFID tag of a credit card. The credit card reader can also be an NFC reader that can read a credit card stored in a smartphone or tablet (for example, in the "Apple Pay" system). The generation unit can make the generation of the specific enable signal dependent on the credit card reader sending a confirmation signal, in particular a confirmation signal that a certain amount has been debited from a credit card. Such a generating unit may contain, in addition or alternatively, other subassemblies that can generate confirmation signals about payment flows that have been made, for example, successfully completed transfers from one bank account to another bank account.

In a possible embodiment of the disclosure, the administration of playback authorizations can be used to assign a different data record to the identifier belonging to an identification carrier. For example, an embodiment is possible in which the data record of a first sequence of an audio book with several sequences is assigned to an identification carrier. By means of the disclosure, the data record of another sequence of the audio book can now be assigned to this identification carrier, whereby the disclosure permits the new assignment to be made dependent on a payment, for example, by controlling the specific release signal (preferably the specific release signal in the form of a change signal). Likewise, an embodiment is possible in which an identification carrier, to which initially only one sequence of an audio book with several sequences was assigned, is now assigned two or more sequences of the audio book, whereby the new assignment can be made dependent on a payment, for example, by controlling the specific release signal.

Systems are possible in which a consumer already has several identification carriers, whereby a respective data record is assigned to the respective identification carrier. The disclosure now makes it possible to subsequently assign another data record to one of these identification carriers or to subsequently provide an assignment to two data records in addition to the existing assignment to a data record. If it is intended to sell the identification carriers in such a system, the disclosure now permits the change or supplement of the assignment of existing identification carriers via the Internet and via payment transactions that can be processed via the Internet. As a result of this, the consumer does not have to order new identification carriers, but instead assigns the new desired content to the existing identification carriers.

In a preferred embodiment of the method, a data packet is transferred from an external memory to a memory of the playback device and/or a data packet from the playback device to an external memory and/or an external control unit if the sensor that is within the area of its environment detects a certain property or a certain change in a property of this environment or if the control unit detects a certain change in the property detected by the sensor.

This insight can be used, for example, to reduce the communication time between the toy and the device and an external memory. For example, it can be provided that if no communication connection initially exists between the toy or the device and the external memory or the external control unit, if the sensor within the region of its surroundings detects a specific property or a specific change in a property in these surroundings or if the control unit detects a specific change in the property detected by the sensor, the fact that the sensor within the region of its surroundings detects a specific property or a specific change in a property in these surroundings or the fact that the control unit detects a specific change in the property detected by the sensor is utilized as the triggering event for the formation of a communication channel between the toy or the device and the external memory or the external control unit.

In particular, a procedure of this type also makes it possible to close an existing communication channel again when a specific event occurs. For example, if the communication channel is established wirelessly, the radio connection can be broken when a specific event is reached. In this way, it is possible to reduce the radiation to which a user of the toy, or of the device is exposed. The triggering event can, for example, be the removal of an identifier from the toy or the device. Likewise, the triggering event can be the elapsing of a previously established time interval (also after removal of an identifier). With these measures a good balance can be found between maximum operating convenience, which is most likely to exist with a permanently existing channel between the external memory or the external control unit and the toy or the device, and the desire to reduce the radiation load.

The external memory can be provided in an external computer, with which the toy or the device can be connected via a cable or a radio connection. A computer of this type may be present locally, for example on a home network, in which the toy or the device is also located. However, the external memory may also be a memory with which the toy or the device makes contact over the Internet, for example a memory in a so-called "cloud."

To achieve the benefits of the disclosure, it is not necessary for a data packet always to be transmitted from an external memory to a memory of the toy if the sensor within the region of its surroundings detects a specific property or a specific change in a property in these surroundings or if the control unit detects a specific change in the property detected by the sensor. For example, in one preferred embodiment of the method it is possible that the toy or the device has a memory in which data packets can be stored and a control unit of the toy, or of the device knows which data packets are stored in the memory of the toy, or of the device. In this preferred embodiment of the method, a data packet is only transmitted by an external memory to a memory of the toy if the sensor within the region of its surroundings detects a specific property or a specific change in a property in these surroundings or if the control unit detects a specific change in the property detected by the sensor, if the control unit detects that the data packet to be transmitted from the external memory to a memory of the toy is not already stored in the memory of the toy. In this way the volume of data exchanged between the external memory and the memory of the toy, or of the device can be reduced.

Embodiments are possible in which the external memory provides data packets which in any case are to be transmitted from the external memory to a memory of the toy, or of the device if the sensor within the region of its surroundings detects a specific property or a specific change in a property in these surroundings or if the control unit detects a specific change in the property detected by the sensor. Such data packets can, for example, be software updates for the software used by the control unit. Such data packets can also control data packets. With these control data packets, it is possible, for example, to establish a maximum volume at which the toy or the device replays audio information through a speaker or a speaker connection. In one preferred embodiment, a control data packet of this type can control the functioning method of the control unit of the toy, or of the device. For example, by means of the data packet it is possible to determine how long the control unit will replay audio information or images, videos or 3D information or execute software. In this manner, there can be a chronological limitation of use. Furthermore, the control data can be used to replay specific audio information or specific images, videos or 3D information, or specific software can be locked. This locking can be performed in general, so that the respective content cannot be replayed at all, for example to maintain age limits. However, such locking may also be temporary, for example in order to prevent only one item of content from always being replayed over a specific time period.

In one preferred embodiment, a data packet from the player of the toy, or of the device is transmitted to the external memory if the sensor within the region of its surroundings detects a specific property or a specific change in a property in these surroundings or if the control unit detects a specific change in the property detected by the sensor. For example, it is possible for the control unit of the toy, or of the device to maintain statistics about the use of the device, thus especially about the replayed audio information or the replayed images, videos or 3D information, or about the software executed, for example how frequently the respective content was replayed or executed. If the content of these statistics is transmitted to the external memory, for example parents who have access to data from the external memory can determine which content was used how frequently by their children, how long any content at all was retrieved, and other statistical information, for example the software status of the control unit or the charging status of a battery of the toy, or of the device.

The data packet that is transmitted from an external memory to the memory of the toy, or of the device can come from a library of databases made available in the external memory. This library can be provided by an external service provider, for example by audiobook providers or film distributors. However, embodiments are also possible in which the data packet in the external memory can be a data packet individually recorded using recording software. The recording software can be executed by a processor that is part of the computer to which the external memory belongs. Solutions of this type are available for home networks. However, the recording software can also be executed on an external computer, for example on a Smartphone, a tablet computer, a laptop, a desktop computer or a workstation, and the data packet generated in this way placed over the Internet in the external computer, for example a "Cloud," from which it is transmitted to the memory of the toy, or of the device. This makes it possible for a third party to record speaker's notes, images or film sequences, for example stories, and make them available in the external memory. The corresponding data packet can be transmitted from the external memory to a memory of the device if the sensor within the region of its surroundings detects a specific property or a specific change in a property in these surroundings or if the control unit detects a specific change in the property detected by the sensor. The external memory can be designed to replace an existing image with a new image. When the toy or the device requests data packages from the external memory, the external memory and the device can be designed such that first a check is made to see whether a copy of the data packet is already stored in the toy or the device. This check can be performed by the toy or the device, or preferably by the external memory. Depending on this, it is possible to decide, for example, whether and which data packets will be transmitted from the external memory to the toy or the device. In this way, different content can be retrieved over time, for example, primarily content that changes regularly over time (e.g., so-called podcasts) or content that changes depending on events. In such an embodiment, the toy or the device can be designed to check automatically at predetermined times whether the content assigned to a specific identifier has changed, and preferably also automatically store the new content so that it will be available more quickly upon the next recognition of the identifier. For this purpose, the toy or the device transmits a notification to the external memory that the command is taking place automatically. Thus the external memory can process this command differently from other commands, for example with regard to the priority of data transmission.

In the context of the following embodiment, described in further detail, in which the sensor within the region of its surroundings detects a specific property or a specific change in a property in these surroundings or if the control unit detects a specific change in a property detected by the sensor, when an identifier located in a figurative corpus is brought into the surroundings of the sensor, various strategies are now available, which may in particular be linked with the shape of the figure. For example, the figure may be the shape of the main character in a specific story. If this figure, with its identifier, is brought into the region of the sensor, and if within the region of the surroundings of the sensor there is a specific property associated with this figure or a specific change in a property of these surroundings associated with this figure is detected or if the control unit detects a specific change, associated with this figure, in the property detected by the sensor, a data packet can be loaded from the external memory into the memory of the device or the toy, which is in the context of this main figure. In this way, for example, audio for children can be downloaded. However, this embodiment also offers the opportunity to choose figurative forms for the identifier that are not assigned to any main character in a known story, so-called fantasy identifiers.

Fantasy identifiers may also, for example, be based on objects or persons, and more preferably may be either mass-produced or individually produced, for example by 3D printing techniques. If the sensor within the region of its surroundings detects a specific property assigned to this fantasy identifier or a specific change in a property in these surroundings assigned to the fantasy identifier, or if the control unit detects a specific change, assigned to this fantasy identifier, in the property detected by the sensor, this can cause the transfer of a data packet from the external memory to a memory of the device, whose data packet was first recorded by recording software. In this way, for example, the possibility arises that parents or grandparents can tell stories to their children or grandchildren or record bedtime stories that the children can listen to or—in the case of a video or 3D recording, can watch when they place the fantasy identifier in the surroundings of the sensor.

To transmit a packet to the external memory, recording software may be used, which can record content or otherwise imported content, all or part of which content can be transmitted to an external memory over a network, and can assign the content to one or more specific identifiers or groups of identifiers. For this purpose, the recording software identifies—once or repeatedly—over a connection to the toy or the device (either directly or over a server connected as an intermediate) one or more specific identifiers or groups of identifiers that are considered for the assignment, and allows the user of the recording software to determine before or after the recording or importing, which identifiers(s) should be assigned. This can preferably occur when—if the user has the identifier for the reporting software—the identifier is placed in the recognition area of the toy, or of the device. However, it can also occur when there is a relationship between the user of the recording software (or a user group) and one or more identifiers is stored, for example, in the form of a user account. It can also occur when there is a relationship between a user account of the user and a device identifier is stored, and the identifier(s) are assigned to the device identifier. The assignment to the user account may preferably also be accomplished in that individual information that is associated with the identifier but can be transported separately from it, used in the recording software or different software, can make the assignment to the user account. The individual information may be, for example, an alphanumeric code, a bar code or a QR code. The assignment possibilities mentioned can preferably be combined to achieve greater convenience for the user of the recording software. The assignments to a user account are, for example, stored in an external memory or in the same device as the recording software, preferably at both locations. In particular, recording software can be designed such that it allows assignment to this identifier even without physical access to a specific identifier.

The recording software and the external memory can also be designed such that the recording software can transmit the desired limitations of authorization for specific identifiers or groups of identifiers to the external memory, especially for fantasy identifiers. These limitations can be transmitted by the above-described control packets to a toy or a device. However, they can also (for example, additionally) be considered in an authorization check prior to the transmission of data packets by the external memory.

Preferably, in order to achieve greater convenience, at the same time the recording software also offers the previously described possibilities for generating additional control data packets, for example for limiting the sound volume.

It is also possible to transmit data packets continuously, and particularly and preferably continuously over a specific time period, from the external memory to the device memory, or to stream them. For example, data packets for radio transmission or for television viewing or for replaying films can be transmitted in this way from an external memory to a memory of the device or the toy.

The playback device makes particular use of the simplified operating concept described in WO 2015/104222A1, WO 2017/129349A1. The basic idea of this concept is to use a sensor as part of the playback device which can detect a property or a change of a property of this environment within a range of its environment, and to provide a control unit which can perform the desired control if the sensor detects a certain property or a certain change of a property of this environment within the range of its environment. A playback device comprising this sensor and this control unit and a method using such a sensor and such a control unit result in a particularly simple operation. For the reproduction of the desired information it may suffice, according to embodiments of the disclosure, to give the environment a certain property detectable by the sensor or to make a change in the property of this environment detectable by the sensor and thus—in a particular and preferred embodiment of the disclosure—directly affect the reproduction of the desired information or the execution of the software.

One area of use of the disclosure is the replay of audio information, in particular of pieces of music, spoken texts or the combination of pieces of music and spoken texts. This audio information has particularly and preferably a replay duration of at least 10 s, with a preference of more than 15 s, particularly and preferably of more than 20 s, and especially and preferably of more than 25 s. In one particularly preferred embodiment, the replay duration of the audio information may last at least 30 s and particularly and preferably more than 1 min. By way of example, radio plays, which are intended particularly and preferably to be replayed by means of the disclosure, often have a length of more than 5 min, in some instances also of up to 30 min or even more. The audio information to be replayed according to an embodiment of the disclosure is, in particular, not a confirmation signal. In particular, the audio information to be replayed according to an embodiment of the disclosure is not an acknowledgement sound that may be output, for example, if a first object has been aligned correctly relative to a second object. Likewise, the audio information is particularly and preferably not a jingle played if a first object is brought into the vicinity of a second object or is brought into a previously defined, specific position relative to the second object. The disclosure is concerned with the audio information whose replay duration lasts for a relatively long time, as is the case for pieces of music or spoken texts. The audio information is particularly and preferably such audio information whose replay involves replaying a non-periodic sequence of different sounds.

The speaker of the device according to an embodiment of the disclosure is particularly and preferably a transducer that can convert electrical signals into mechanical oscillations (sound).

The device according to an embodiment of the disclosure may also comprise, instead of a speaker, a speaker connection, for example a Speakon, XLR connection or a 6.35 mm jack socket. By virtue of the fact that the control unit drives the speaker connection, if a speaker is connected to the speaker connection, this control unit can also drive said speaker. The speaker connection may also be a transmitting unit that can communicate with a speaker via radio, for example, via Bluetooth or via a WLAN radio network. Particularly and preferably, however, the transmitting unit does not communicate with the speaker by means of a WLAN radio network, but rather via Bluetooth, for example. Likewise, the device may comprise, as a speaker connection or as connection for the display or replay of images, videos or 3D information, a connection compatible with a docking station of a smartphone. Docking stations for smartphones can be used to drive a speaker or a display for replaying images, videos or 3D information on the basis of drive commands of the smartphone. By virtue of the fact that the device according to an embodiment of the disclosure comprises a connection compatible with such a docking station and is connected to the docking station instead of the smartphone, the control unit of the device according to an embodiment of the disclosure acquires the possibility of driving the speaker connected to the docking station or the display—connected to the docking station—for replaying images, videos or 3D information. The docking station can be connected to the speaker or the display for replaying images, videos or 3D information by means of cables. However, the docking station can also be connected to the speaker or the display for replaying images, videos or 3D information wirelessly, for example via a radio network. The following description—unless explicitly describing the special features of controlling a speaker connection or a connection for a display for replaying images, video or 3D information—describes the disclosure on the basis of the preferred area of use of the control of a speaker in a manner representative of the further possibilities for controlling a speaker connection or a connection for a display for replaying images, videos or 3D information. For the area of use involving the control of a speaker connection or of a connection for a display for replaying images, videos or 3D information, in so far as the following description describes driving the speaker or a display for replaying images, videos or 3D information, this is also taken to mean driving a speaker connection or a connection for a display for replaying images, videos or 3D information.

In one preferred embodiment, the device according to the disclosure comprises at least two speakers, such that it becomes possible to replay the audio information in stereo.

The change in a property of an area of its surroundings to be detected by the sensor is in particular and preferably understood to be the change in a property of an electromagnetic wave. An electromagnetic wave can, for example, be generated by a reading device for communicating with a passive RFID transponder and can be changed in that the passive RFID transponder is brought into an area in the vicinity of the reading device in which its presence changes the electromagnetic wave. The change in the electromagnetic wave brought about by the introduction of the RFID transponder can be recognized by the sensor as a change in a property of an area of its surroundings. As a result, the playback device according to an embodiment of the disclosure has the possibility of determining the presence of a passive RFID transponder in a specific area of the sensors surroundings and of reproducing the audio information, for example, if an RFID transponder is present in the area of the sensor, or to reproduce the audio information when a specific RFID transponder is detected in the area around the sensor. Likewise, in a preferred embodiment, the property that can be detected by the sensor in the area of its surroundings, or the change in the property of the area of its surroundings to be detected by the sensor, is brought about by an active RFID transponder.

In particular and preferably, an identifier is transmitted via the electromagnetic wave, with which the control unit can identify a data record stored in a memory of the playback device according to an embodiment of the disclosure or on a server and, based on the data record, can control the speaker for reproducing the audio information. In a preferred embodiment, the sensor is thus a reading device for communicating with a passive RFID transponder and/or for communicating with an active RFID transponder.

The control unit of the device according to an embodiment of the disclosure can control the speaker for replaying the audio information if the sensor detects within the region of its surroundings, a specific property or a specific change in a property of said surroundings or the control unit detects a specific change in the property detected by the sensor. In one preferred embodiment, the sensor generates a signal having a value detectable by the control unit if the sensor detects, within the region of its surroundings, a specific property or a specific change in a property. It is also conceivable, for example, for the sensor to generate a signal that is fed to the control unit only if the sensor detects, within the region of its surroundings, a specific property or a specific change in a property of its surroundings. These types of embodiments have the effect that the sensor already performs the evaluation and either feeds a signal to the control unit only if it detects a specific property or a specific change in a property of the surroundings, or else sends the control unit a permanent signal having a specific value, whereby this signal is changed to a specific other value detectable by the control unit if the sensor detects, within the region of its surroundings, a specific property or a specific change in a property of these surroundings. In addition or alternatively, it is conceivable for the control unit to perform the evaluation. In such an embodiment, the sensor permanently sends a measurement signal to the control unit. The control unit is designed, for example by storing a table of values, to recognize by means of the measurement signal send to it by the sensor whether a specific property or a specific change in a property is present within the region of the surroundings of the sensor. In this case, the change in the property of the surroundings of the sensor is understood to mean not only the single occurrence of a specific change, for example the single occurrence of a change in the field direction of the magnetic field in the surroundings of the sensor in a specific direction, but also a temporal succession of properties in the region of the surroundings of the sensor, or a specific succession of changes in the properties of the surroundings of the sensor, for example as is the case when reading out modulated waves or when evaluating electromagnetic waves.

In one preferred embodiment, the control unit controls the speaker for replaying the audio information only if the sensor detects, within the region of its surroundings, a specific change in a property of said surroundings in the form of a specific succession of changes in the properties, or if the control unit detects a specific change in the property detected by the sensor in the form of a specific succession of changes in the properties. This succession of changes may be configured in the manner of a character string (a string). This character string may contain, for example, at one specific place, the information about the audio information to be replayed and at another specific place, an identifier word that can function as copy protection or for authentication. If the succession of changes in the manner of the character string does indeed contain the information about the audio information to be replayed, but not the identifier word, the control unit does not drive the speaker. As an alternative to the identifier word, the character string may also be an instruction sequence of a program (of software) that is executable by the control device for verification purposes.

In a preferred embodiment, the playback device has a memory in which data is stored, on the basis of which the control unit can control the loudspeaker to play back the audio information. In particular, the data preferably contains the audio information in the specific data format, for example an MP3 format or a WAV format. There are conceivable embodiments in which the memory only contains data for a single piece of audio information. The playback device according to the disclosure can be used in such a way to play back a single piece of audio information whose playback duration lasts at least 10 seconds, in particular and preferably, if the property of the area surrounding the sensor is set accordingly or if the property of the area surrounding the sensor is changed accordingly. In a preferred embodiment, data from different audio information pieces is stored in the memory. In such a preferred embodiment, the control unit is designed in such a way that, if the sensor detects a specific first property or a specific first change in a property of this environment within the area of its surroundings, or if the control unit detects a specific first change in the property detected by the sensor, it uses the speaker to reproduce a first piece of audio information, the reproduction of which lasts at least 10 s, in particular and preferably while the control unit drives the speaker for the reproduction of a second piece of audio information, the reproduction of which lasts in particular and preferably at least 10 s, if the sensor detects within the range of its surroundings a certain second property or a certain second change of a property of this surroundings or the control unit detects a certain second change of the property detected by the sensor. In this way it is possible to determine which piece of audio information from a plurality of audio information is reproduced by the playback device by means of a certain influence on the property of the area of the sensors surroundings or by a certain influence on the change in the property of this sensors surroundings. For example, the playback device can play a certain first piece of audio information if the presence of a first RFID transponder is detected in the area surrounding the sensor, while the playback device can play a second piece of audio information if the presence of a second RFID transponder is detected in the area surrounding the sensor.

In a preferred embodiment, the data regarding the piece of audio information is stored as a data record with data sequences which can be read separately, for example in order to reproduce an audio book in the form of individual chapters or to make the individual chapters of an audio book controllable. In a preferred embodiment, each data sequence of a data record can be read separately and used to control the speaker.

In a preferred embodiment, the playback device has a unit for receiving data from the Internet and/or for sending data to the Internet, in particular and preferably an antenna for a wireless local area network (WLAN), a mobile data radio technology such as LTE, UMTS or their predecessor or successor or a connection socket for connecting a cable of a local network, which also has Internet access, for example a connection socket for an Ethernet cable. The presence of a unit for receiving data from the Internet enables the control unit to download the data containing the audio information to be reproduced in a specific data format from the Internet. In this way, the playback device can play back audio information that was not stored in the playback device before the sensor detects a specific property or a specific change in a property of this environment within the area of its surroundings, or the control unit can determine a specific change in the property determined by the sensor notices. The control unit can be designed in such a way that it receives the data from the Internet and stores it permanently in a memory and the speaker is activated to reproduce the audio information on the basis of the data stored in the memory. Additionally or alternatively, it is conceivable that the control unit uses the data received from the Internet directly to control the speaker for playing back audio information (so-called streaming), whereby this embodiment may also include the temporary intermediate storage of data received from the Internet in a buffer.

In embodiments that receive the data containing the audio information in a specific data format from the Internet, it is conceivable, for example, that the control unit holds in memory a specific server address of a server connected to the Internet and holds in memory a table in which a specific property or a specific change to a property is assigned to a specific identification number. The control unit in such an embodiment is then designed to communicate with the specific server upon recognition of the specific property or the specific change to the property and, using the identification number assigned to the specific property or the specific change to the property, to download a specific data record from the server and to use it for driving the speaker to reproduce the audio information resulting from this data. For example, music titles can be stored on the server as data in a specific data format, whereby the respective music title or the data contained in this music title is stored on the server under a specific identification code. In a preferred embodiment, the playback device according to the disclosure already contains an allocation table (playback device allocation table), which allocates certain properties or changes in the properties of the area of the sensors environment to some, to a plurality or in a preferred embodiment even to all identification numbers, which are also used in the servers database. This enables the control unit to download specific data sets from the server. Alternatively, it is conceivable that the control unit is designed to transmit information containing the detected specific property or information containing the detected specific change of the property to a specific server connected to the Internet. The assignment of the detected specific property, or the detected specific change of the property to a specific piece of audio information can then take place on the server. The control unit is then designed to receive data from the server containing the audio information to be played back. The server transmits the data to the playback device according to the disclosure which it has assigned to the specific property transmitted to it by the control unit or the specific change of the property transmitted to it by the control unit. This embodiment avoids the necessity of keeping an allocation table in the playback device according to the disclosure and thus increases the flexibility of receiving certain data containing the audio information on the basis of a certain determined property or a certain determined change of a property of the area surrounding the sensor. This embodiment allows, for example, the number of data sets provided on the server to be increased without having to adapt an allocation table in the control unit of the playback device according to the disclosure.

In a preferred embodiment, the playback device has an antenna for a wireless local area network (WLAN) which can be switched off. In particular, if the playback device according to the disclosure is to be used to reproduce audio information for children, there may be an interest in reducing the electromagnetic waves generated in the child's environment. For this purpose it may be advisable to switch off the WLAN antenna.

It is also possible for a playback device integrated into a wireless local area network via a WLAN antenna to transmit the audio information to be reproduced to other participants in the network, for example streaming to a television or another speaker.

In a preferred embodiment, the operating system of the control unit is Firefox OS. In a preferred embodiment, the operating system of the control unit can be updated.

In a preferred embodiment, the control unit is designed to determine and document information about the activation of the speaker, for example the frequency with which certain audio information was played or the sequence with which certain audio information was played. The playback device is in particular and preferably designed to communicate such information to a server.

The system according to an embodiment of the disclosure has a playback device according to the disclosure and an identification carrier in which the identification carrier has a property that the sensor can determine if the identification carrier is within the range of the sensors surroundings, or the identification carrier changes a property of the sensors surroundings. The basic idea of the system according to the disclosure is that the control unit activates the speaker to reproduce audio information when a specific identification carrier is brought into the area around the sensor in which the sensor can determine a property or a change in a property. In a particular and preferred embodiment, however, moving the identification carrier in this area should trigger the activation of the speaker to reproduce the audio information without having to generate further operating commands.

This basic concept of the system according to the disclosure considerably simplifies the operation of playback devices for the reproduction of audio information. It is now no longer necessary to handle scratchable CDs, as is the case with CD players known from practical experience, or to learn the complex operating sequences of operating elements required for the control of the speakers for the reproduction of audio information with MP3 players known from practical experience. In the simplest embodiment of the disclosure, it is sufficient to place the identification carrier in the area surrounding the sensor in which the sensor can detect the property or a change in the property, and thus automatically triggers the control unit to drive the speaker to reproduce the audio information.

In a preferred embodiment, the identification carrier has an RFID transponder or an antenna with which a modulated wave can be emitted and/or received. Thus, the identification carrier can be designed, for example, in such a way that it can communicate with the playback device according to an embodiment of the disclosure via the Bluetooth standard or via the NFC standard. Especially the use of these technologies allows a variety of communication possibilities between the identification carrier and the playback device. In particular, the use of these technologies allows the recognition of a large number of identifiers. This makes it possible for the playback device according to an embodiment of the disclosure to select the audio information to be played from a multitude of audio information, for example if each audio information to be played is assigned its own identifier, for example in an allocation table stored in the playback device according to the disclosure or on a server.

In a preferred embodiment, the identification carrier has a magnet and the playback device has a surface to which the magnet can adhere. Alternatively, the playback device can have a magnet and the identification carrier has a surface with which the identification carrier can adhere to the magnet. In this way, the playback device and the identification carrier can be detachably connected to each other. This allows the playback device to be moved without the identification carrier losing a certain relative position relative to the playback device In a preferred embodiment, the identification carrier has the shape of a figure, in particular the shape of a human figure or an animal figure or a fantasy figure. The identification carrier in particular and preferably has the shape of a figure with feet. In a particular and preferred manner, in the case of an identification carrier in the form of a figure with feet, the magnet is arranged in the feet of the figure, so that the figure can stand on the playback device according to the disclosure.

In a preferred embodiment, the identification carrier is designed in such a way that the operator can associate it with certain audio information based on its shape, color, surface structure and/or material, and that when it is brought into the area surrounding the sensor in which the sensor can detect a property or a change in a property of this environment, the driving of the speaker is triggered to reproduce audio information which is related in content to the user's association. For example, it can be designed in the manner of a figure and trigger the reproduction of audio information that is related to the shape of the figure. For example, the figure can have the shape of Benjamin Blümchen® and the audio information played back can be a listening story with Benjamin Blümchen® as the protagonist. It is also conceivable that the identification carrier can be individually adapted. For example, the identification carrier can be designed as a figure that resembles the shape of a person in the immediate environment of another person and the audio information played back can be audio information previously recorded by this person. It is also conceivable that the identification carrier has the shape of a figure that resembles a scientist and the audio information has the contents of what the scientist has found out. It is also conceivable that the figure resembles a composer or performer and the audio information contains content from this composer or performer. It is conceivable that an identification carrier triggers the audio information for a piece of music, a collection of pieces of music (album) or a playlist.

In a supplementary or alternative embodiment, the identification carrier is designed as a sticker or module that can be attached to other objects.

A method according to an embodiment of the disclosure for playing music or a spoken story with a playback device that includes:
  a speaker or a speaker connector,
  a sensor that can detect a property or a change in a property of this environment within a region of its environment,
  a control unit which can control the speaker or the speaker connection for playing music or a spoken story, if the sensor detects a specific property or a specific change in a property of this environment within the area of its surroundings or if the control unit detects a certain change in the property detected by the sensor,
  and a memory and a data record stored in the memory,
  and a receiving unit for a specific release signal,
  whereby the control unit can control the speaker or the speaker connection for playing music or a spoken story on the basis of the data record if the control unit has received the specific release signal.

A method according to an embodiment of the disclosure for reproducing audio information and/or reproducing images, videos or 3D information and/or for executing software with a playback device including:
  a speaker or a speaker connection and/or a display for images, videos or 3D information or a connection for such a display and/or a processor that can execute the software,
  a sensor that can detect a property or a change in a property of this environment within a region of its environment,
  a control unit,
  which can control the speaker or the speaker connection for reproducing audio information,
  and/or which can control the display or the connection for the display in order to reproduce images, videos or 3D information,
  and/or which can control the processor to execute the software, if the sensor detects a specific property or a specific change in a property of this environment within the area of its environment or if the control unit detects a specific change in the property determined by the sensor
  and a memory and a data record stored in the memory,
  and a receiving unit for a specific release signal,
  whereby the control unit can control the speaker or the speaker connection for reproducing audio information on the basis of the data record,
  and/or which can control the display or the connection for the display in order to reproduce images, videos or 3D information on the basis of the data record, and/or which can control the processor to execute the software on the basis of the data record,
  when the control unit has received the specific release signal.

In a preferred embodiment, the method is developed in such a way that the control unit cannot control the speaker or the speaker connection to play back music or a spoken story based on the data record if the control unit has not yet received the specific release sign and/or the control unit:
  cannot drive the speaker or the speaker connection to reproduce audio information based on the data record,
  and/or which cannot control the display or the connection for the display to reproduce images, videos or 3D information on the basis of the data record, and/or which cannot control the processor to execute the software on the basis of the data record,
  if the control unit has not yet received the specific release signal.

A method according to an embodiment of the disclosure for playing music or a spoken story with a system with a playback device including:
  a speaker or a speaker connector,
  a sensor that can detect a property or a change in a property of this environment within a region of its environment,
  a control unit which can control the speaker or the speaker connection for playing music or a spoken story, if the sensor detects a specific property or a specific change in a property of this environment within the area of its surroundings or if the control unit detects a certain change in the property detected by the sensor,
  the system further comprising a computer, the computer having a memory and a data record being stored in the memory,
  whereby the computer has a control unit,
  whereby the system has a data line between the playback device and the computer,
  whereby the data record stored in the memory is only retrievable for the control unit of the playback device via the data line when the control unit of the computer has received a specific enable signal and wherein the control unit can drive the speaker or the speaker connection for the playback of music or a spoken story on the basis of the data record.

A method according to an embodiment of the disclosure for reproducing audio information and/or reproducing images, videos or 3D information and/or for executing software with a system with a playback device that contains:
  a speaker or a speaker connection and/or a display for images, videos or 3D information or a connection for such a display and/or a processor that can execute the software,
  a sensor that can detect a property or a change in a property of this environment within a region of its environment,
  a control unit, which can control the speaker or the speaker connection for reproducing audio information,
  and/or which can control the display or the connection for the display in order to reproduce images, videos or 3D information, and/or which can control the processor to execute the software, if the sensor detects a specific property or a specific change in a property of this environment within the area of its environment or if the control unit detects a specific change in the property determined by the sensor, whereby the system further has a computer and the computer has a memory and a data record being stored in the memory, whereby the computer has a control unit, whereby the system has a data line between the playback device and the computer, in which the data record stored in the memory can only be called for the control unit of the playback device via the data line when the control unit of the computer has received a specific release signal, in which the control unit can control the speaker or the speaker connection for reproducing audio information on the basis of the data record, and/or which can control the display or the connection for the display in order to reproduce images, videos or 3D information on the basis of the data record, and/or which can control the processor to execute the software based on the data record.

In a preferred embodiment, the method is developed such that the sensor is a reading device for communicating with a passive RFID transponder and/or for communicating with an active RFID transponder.

In a preferred embodiment, the method is developed in such a way that an identification carrier is provided, whereby the identification carrier has a property in which the sensor can determine if the identification carrier is within the range of the sensors environment, or the identification carrier is a property of the environment that the sensor can detect in the area of its environment.

In a preferred embodiment, the method is developed in such a way that an external computer or server is provided and there is a communication path via which the toy can communicate with the external computer or the server.

In a preferred embodiment, the method is developed in such a way that the playback of the music or the spoken story or the audio information takes at least 10 seconds.

In a preferred embodiment, the method is developed in such a way that the processor can execute software even if it has not yet been stored in the playback device before the sensor has determined a property or a change in a property of this environment within a region of its environment.

In a preferred embodiment, the method is further developed in such a way that a support is provided on which an object can be placed permanently, the sensor being able to detect a property or a change in a property of this area at least in an area above the support, and/or a fastener to which an object can be permanently attached, the sensor being able to detect a property or a change in a property of this area at least in an area adjacent to the fastener.

In a preferred embodiment, the method is developed such that the sensor is an inductive sensor, a magnetic field sensor, a capacitive sensor, a piezoelectric sensor, an electrochemical sensor or a temperature sensor.

In a preferred embodiment, the method is developed such that the sensor is a reading device for communicating with a passive RFID transponder and/or for communicating with an active RFID transponder.

In a preferred embodiment, the method is developed in such a way that the sensor has an antenna and can emit and/or receive a modulated wave.

In a preferred embodiment, the method is developed in such a way that the control unit can control the speaker or the speaker connection in order to reproduce speech information the reproduction of which lasts at least 10 seconds.

In a preferred embodiment, the method is further developed in such a way that the control unit can directly control the speaker or the speaker connection, or the display for images, videos or 3D information or the connection for such a display, or the processor for executing the software.

In a preferred embodiment, the method is further developed in such a way that a housing is provided in which the sensor is arranged, the area in the environment of the sensor in which the sensor can detect a property or a change in a property of this environment extending no further than 100 mm beyond a surface of the housing.

In a preferred embodiment, the method is further developed in such a way that no control element is provided with which an operator can control the driving of the speaker or the speaker connection to start the reproduction of the audio information, or the driving of the display for an image, video or 3D information or the connection for such a display to start the reproduction of the image, video or 3D information, or the control unit could influence the processor for executing the software at the start of the execution of the software if the sensor detects a certain property or a certain change of a property of this environment within the range of its environment.

In a preferred embodiment, the method is developed in such a way that an operating element is provided and in that the control unit controls the speaker or the speaker connection, or the display for images, videos or 3D information or the connection for such a display, or can control the processor for executing the software solely by the sensor determining a specific property or a specific change in a property of this environment within the area of its environment and without an operator operating the control element.

In a preferred embodiment, the method is developed in such a way that an identification carrier is provided, in which the identification carrier has a property whereby the sensor can determine if the identification carrier is within the range of the sensors environment, or the identification carrier is a property of the environment that the sensor can detect in the area of its environment.

In a preferred embodiment, the method is developed in such a way that the identification carrier has an RFID transponder or an antenna and can emit and/or receive a modulated wave.

In a preferred embodiment, the method is developed in such a way that the reproduction of the audio information takes at least 10 seconds.

BRIEF DESCRIPTION OF DRAWINGS

The disclosure is explained in more detail below on the basis of drawings which show embodiments of the disclosure.

LIST OF FIGURES

Figure 1:
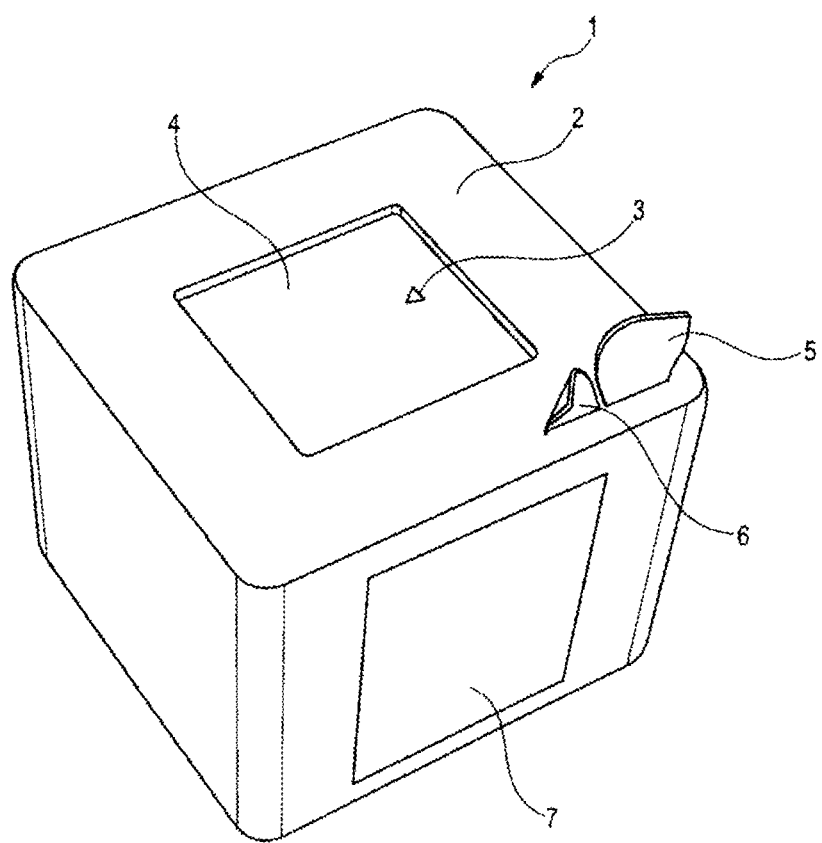
Figure 2:
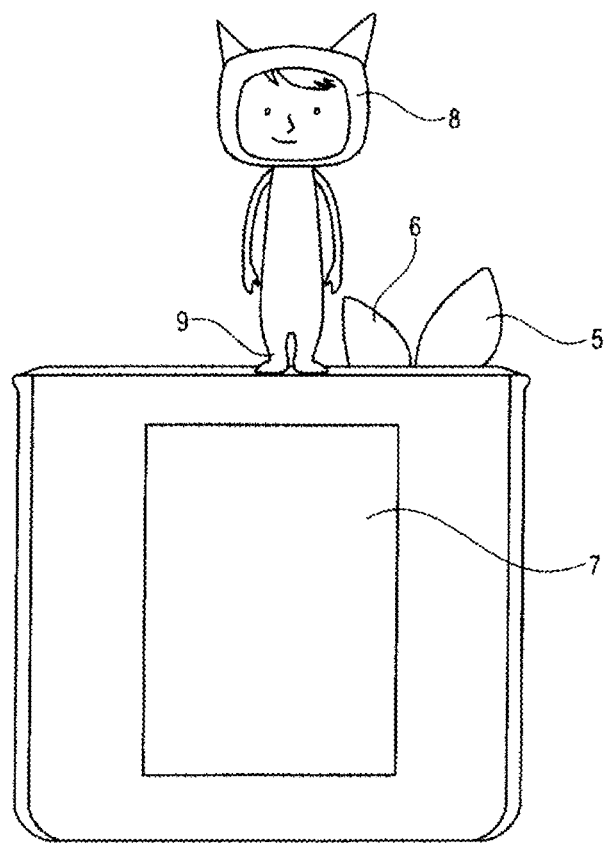
Figure 3:
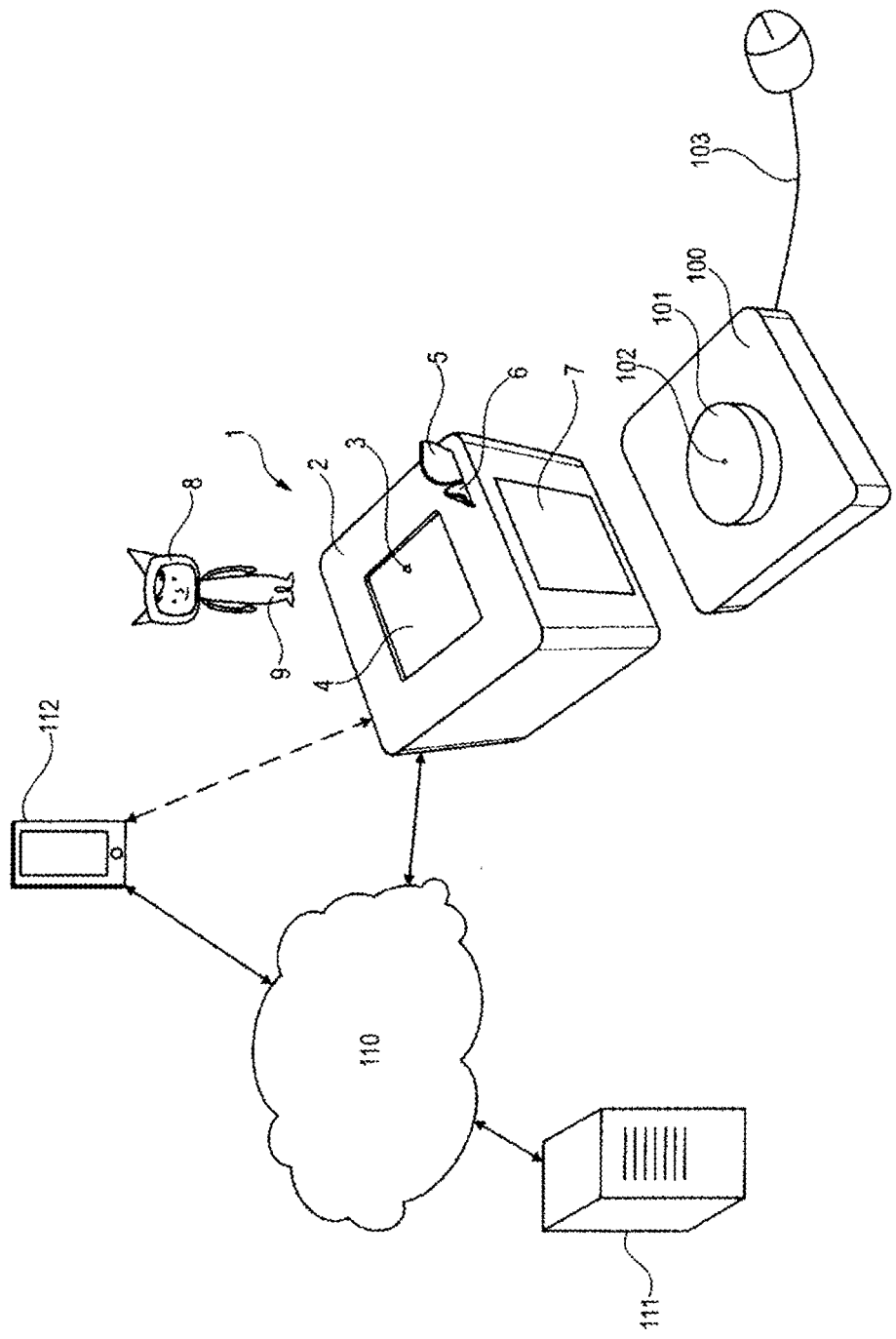
Figure 4:
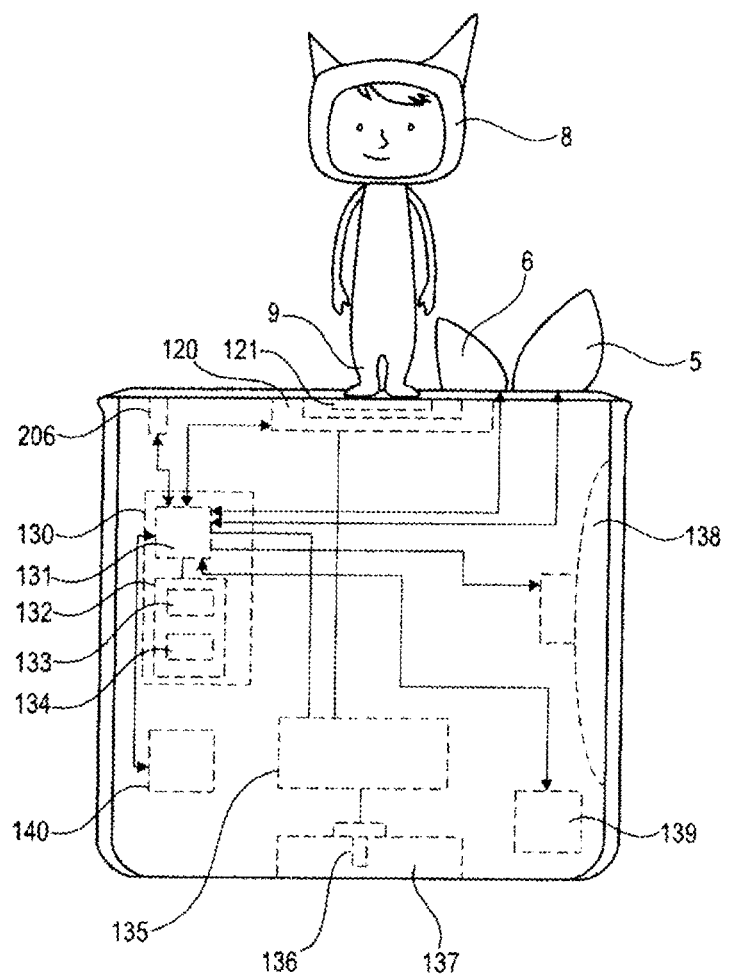
Figure 5:
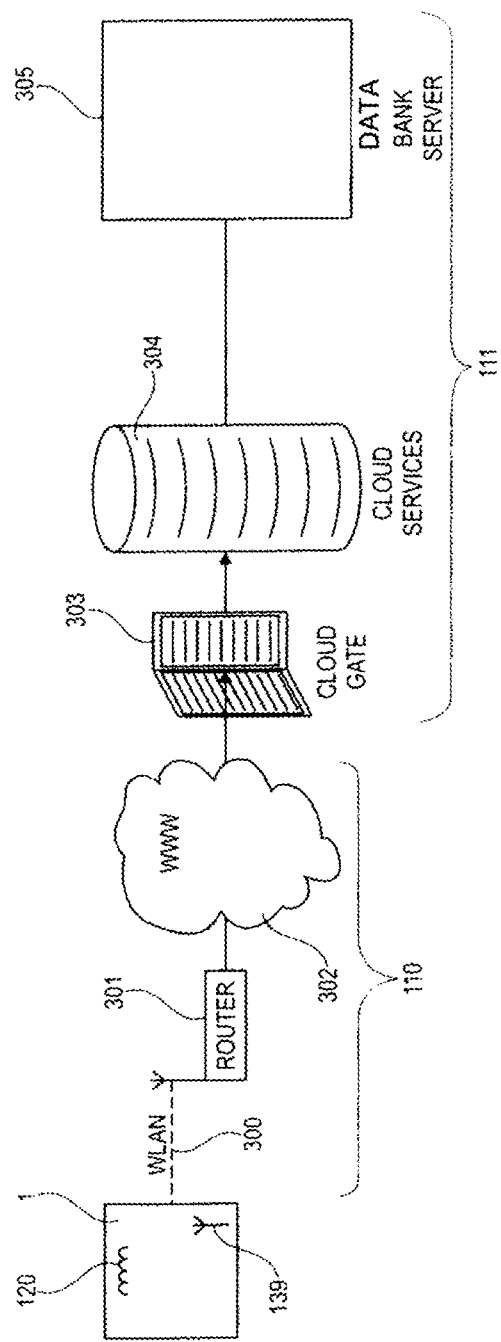
Figure 6:
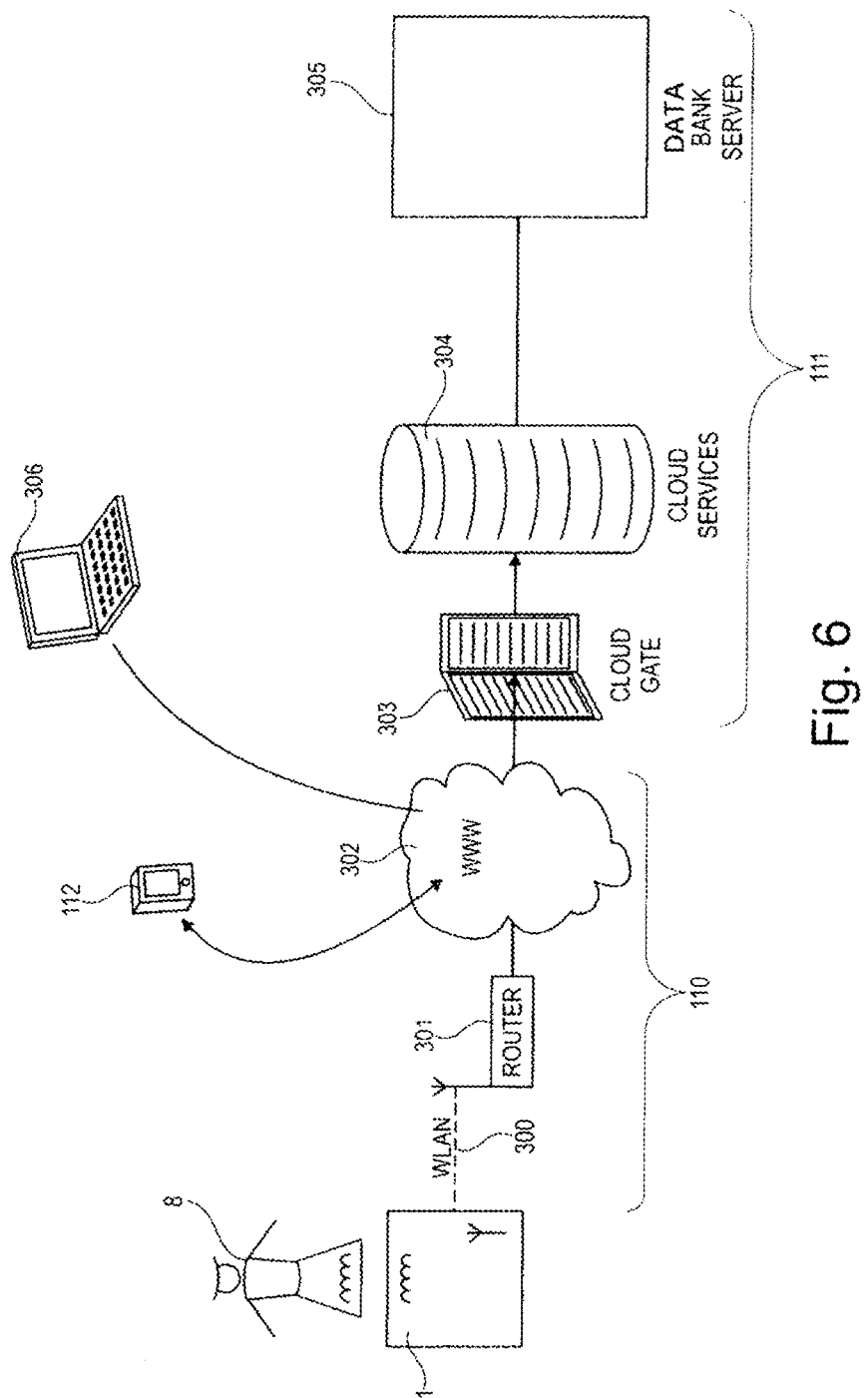
Figure 7:
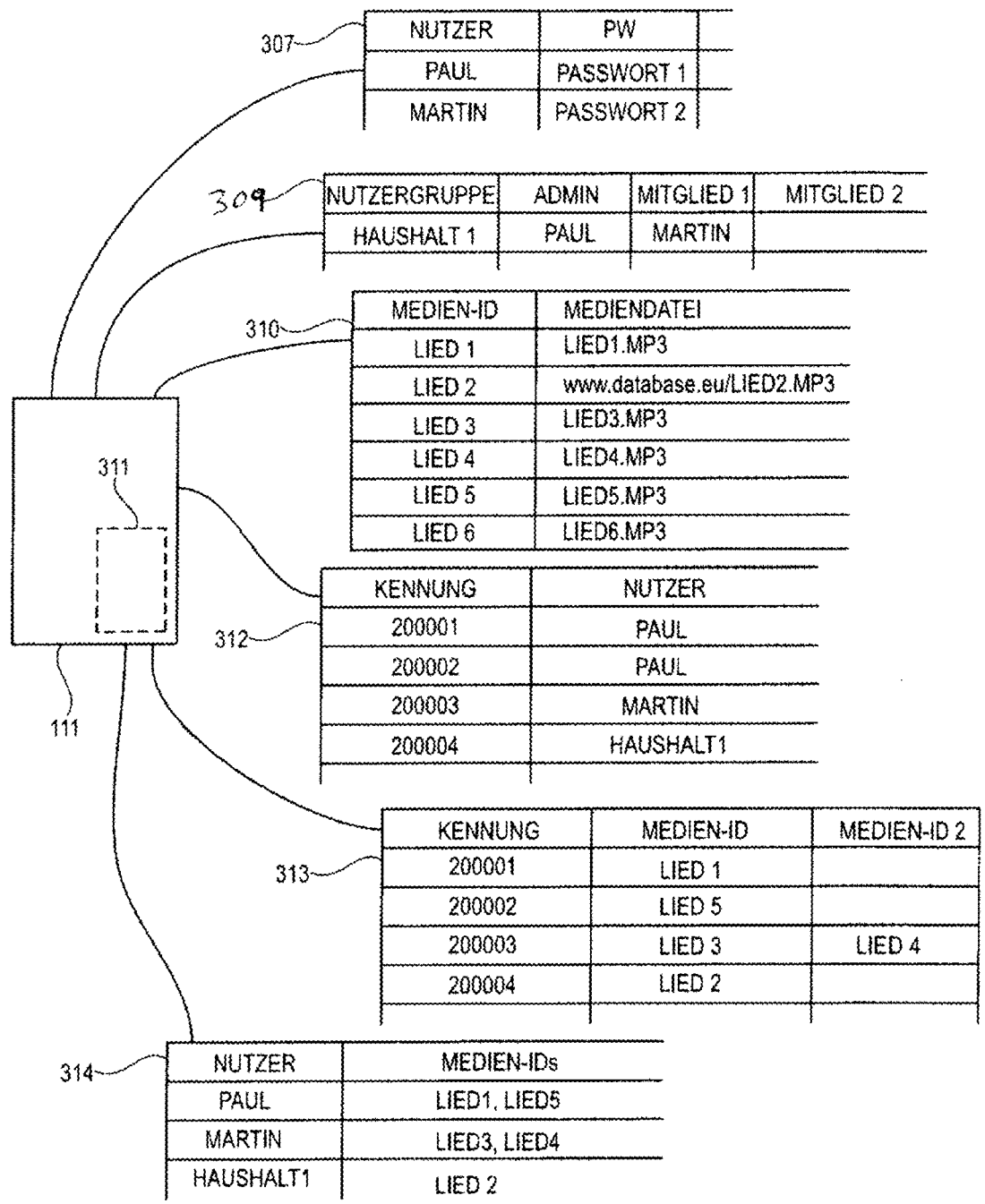
Figure 8:
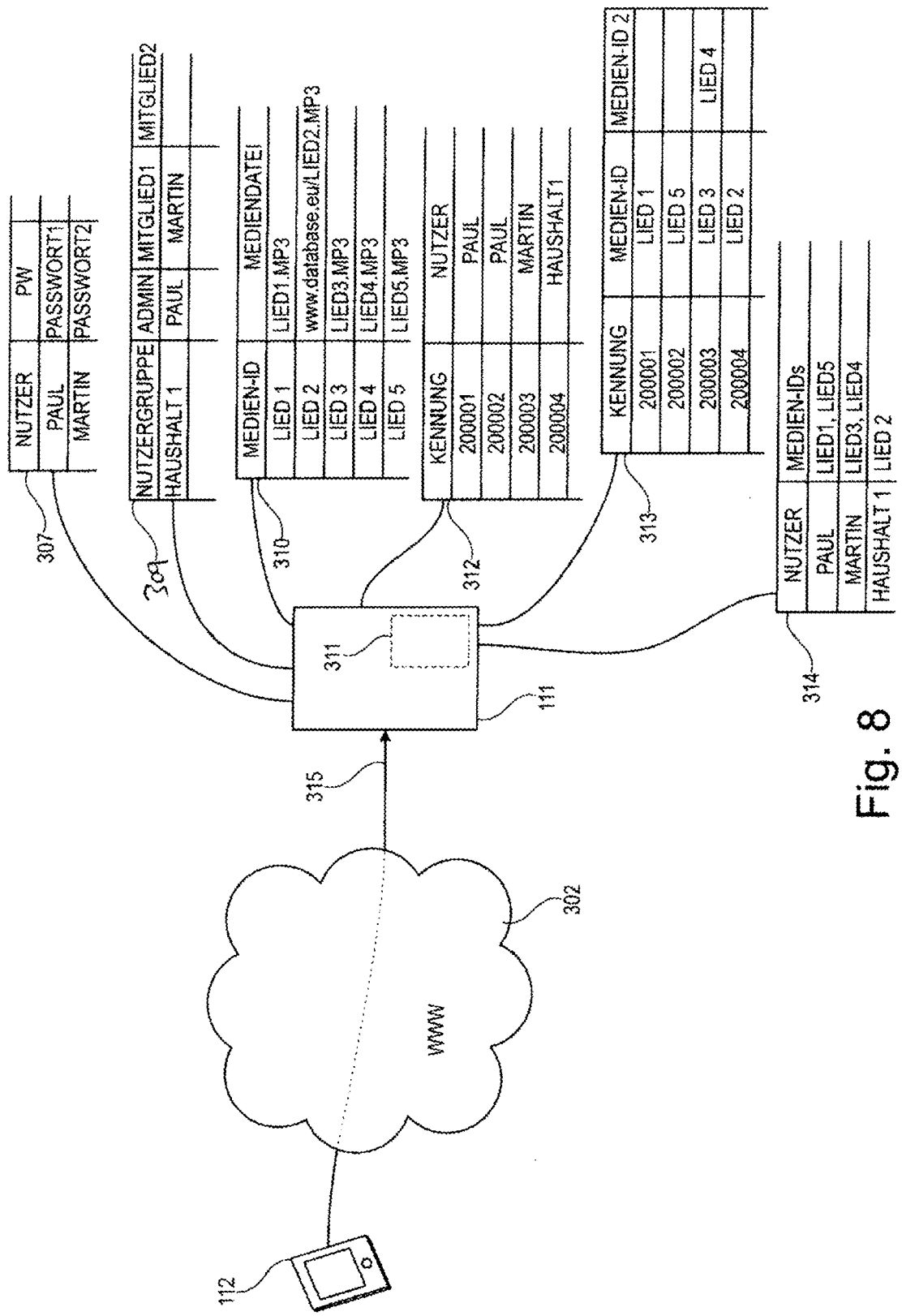
Figure 9:
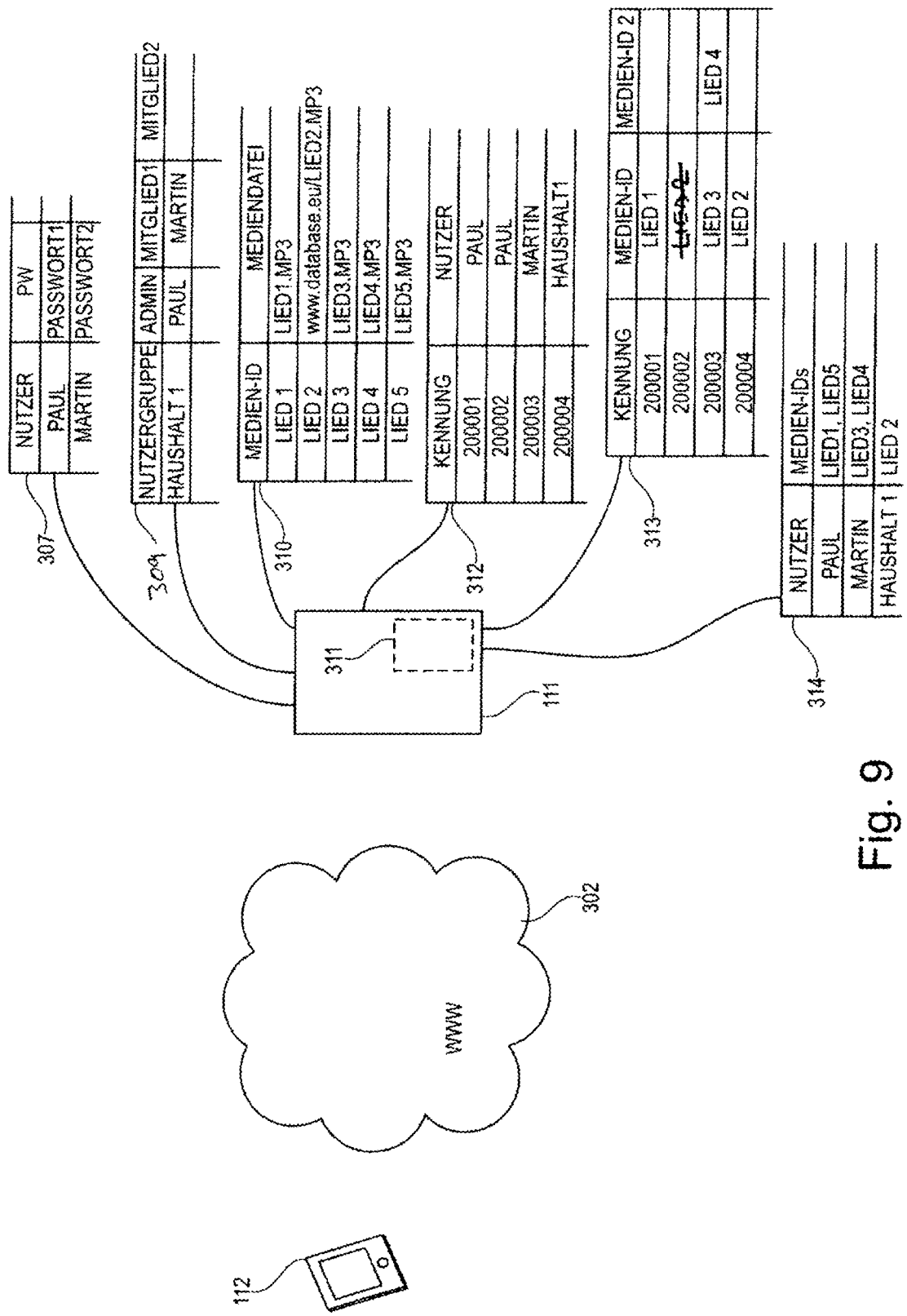
Figure 10:
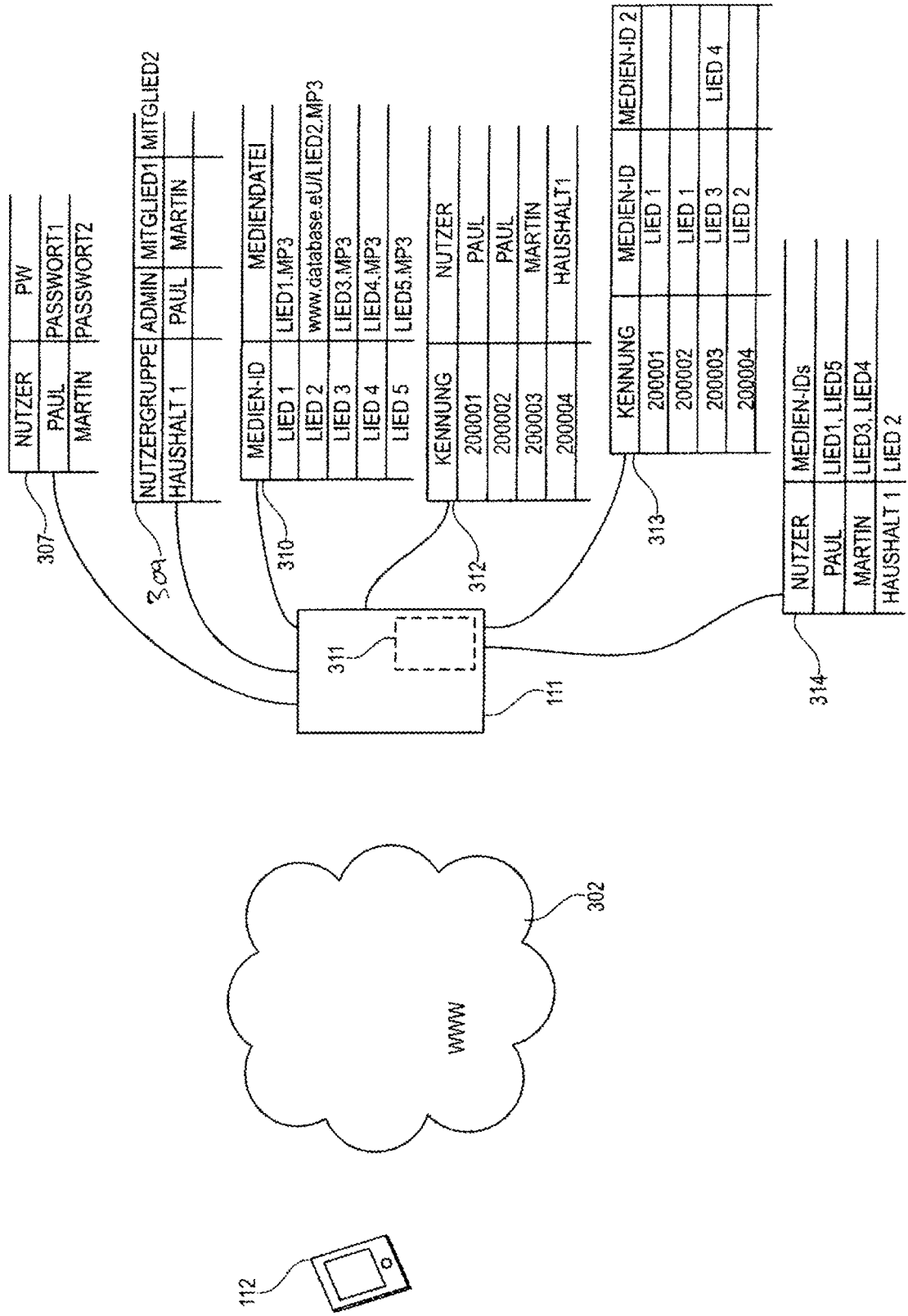
Figure 11:
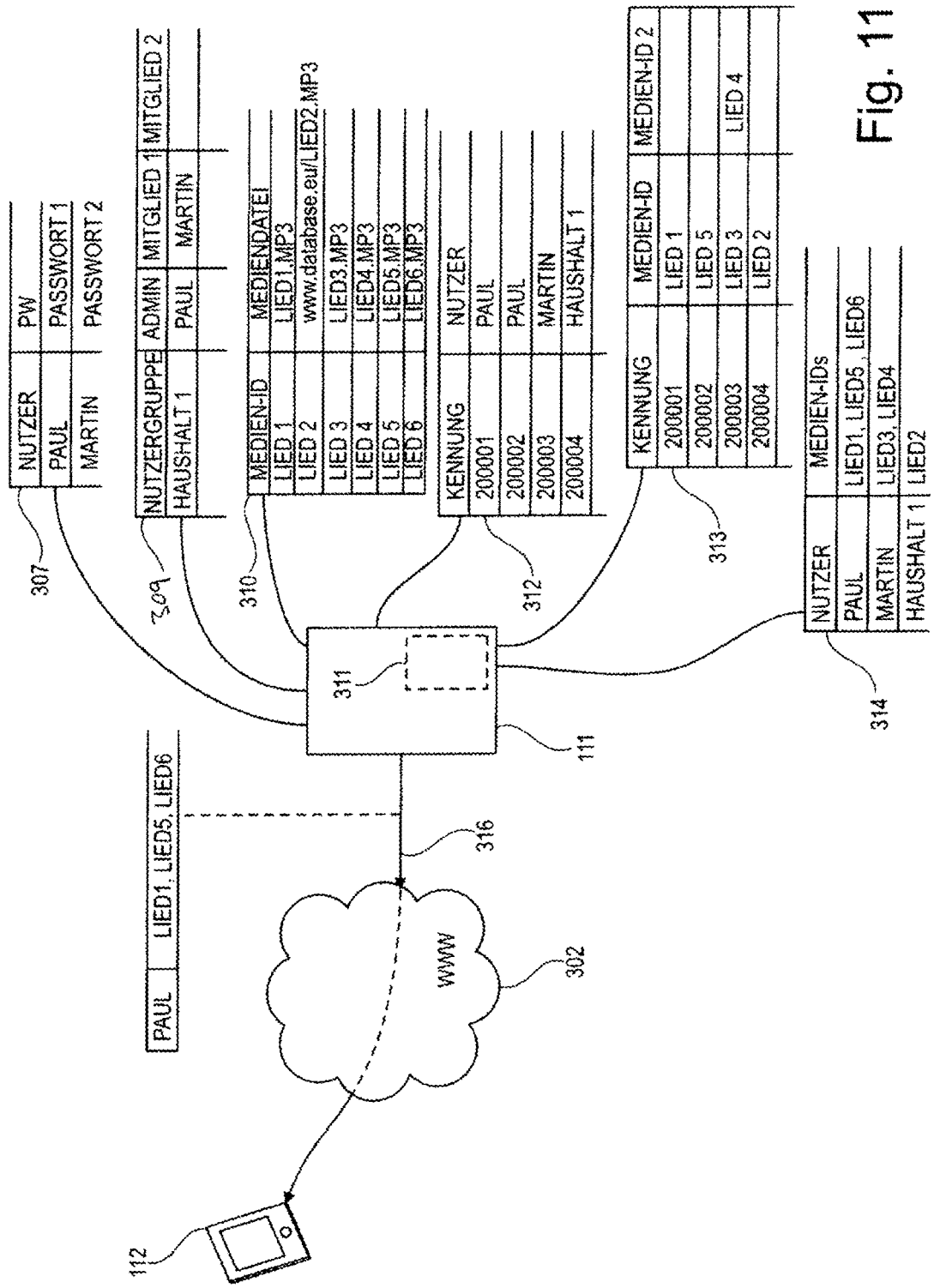
Figure 12:
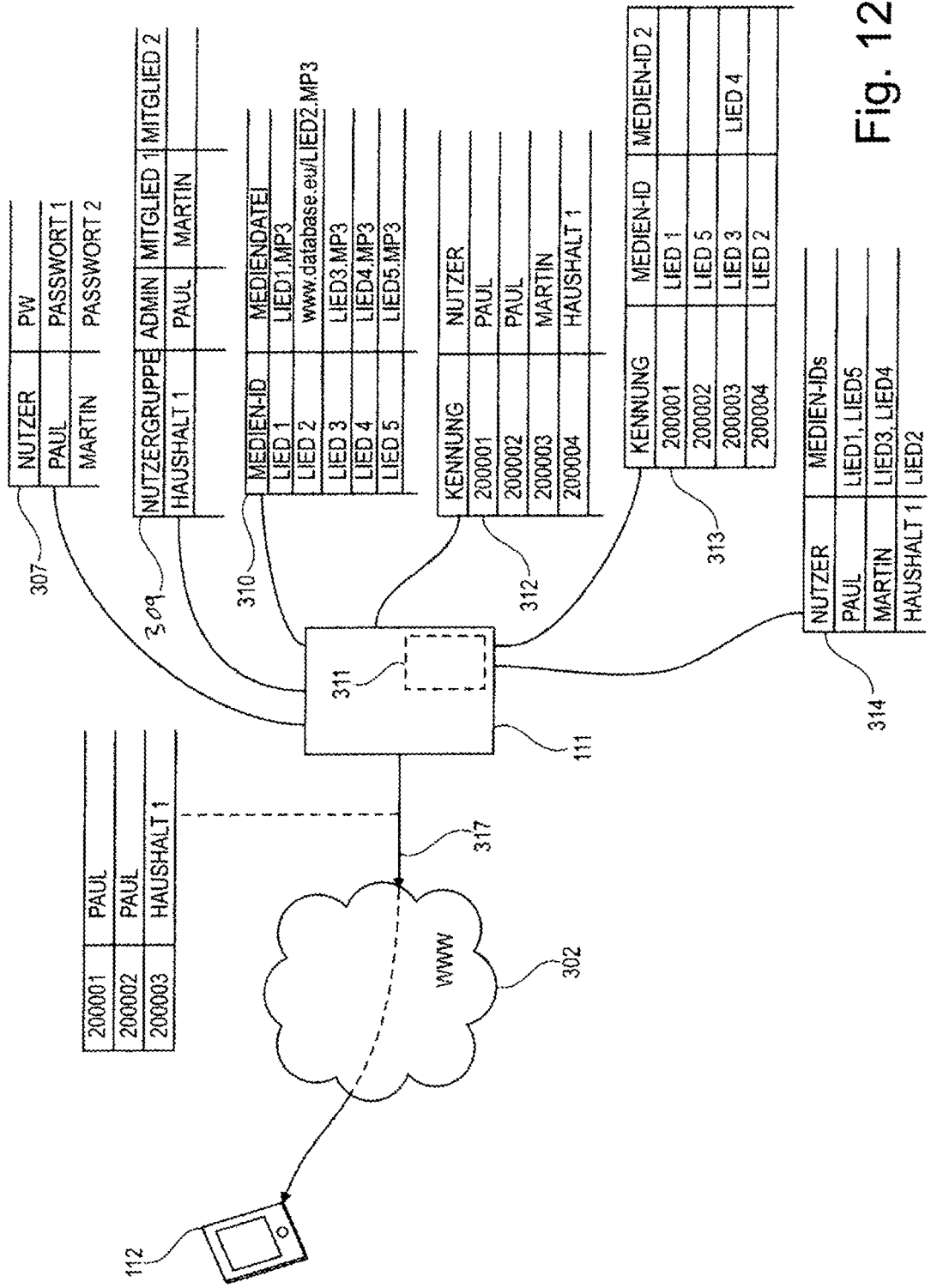
Figure 13:
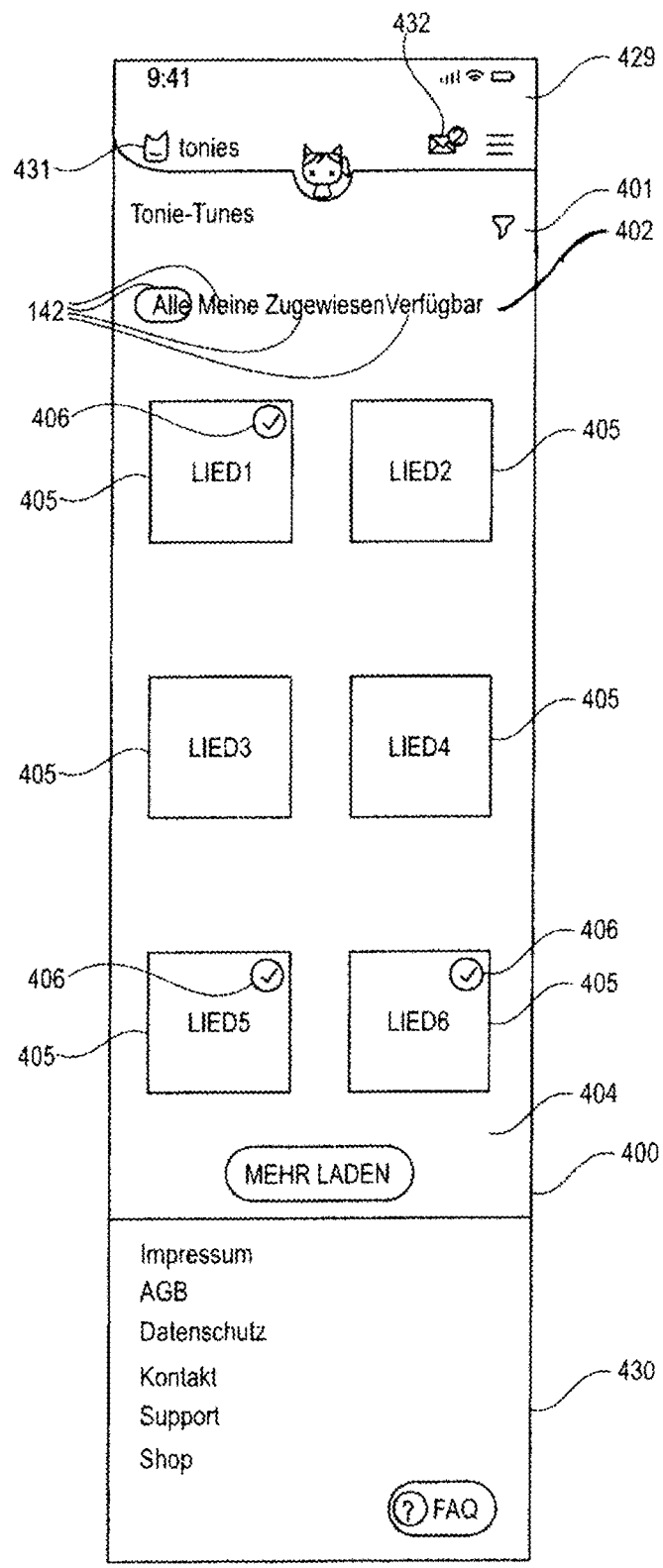
Figure 14:
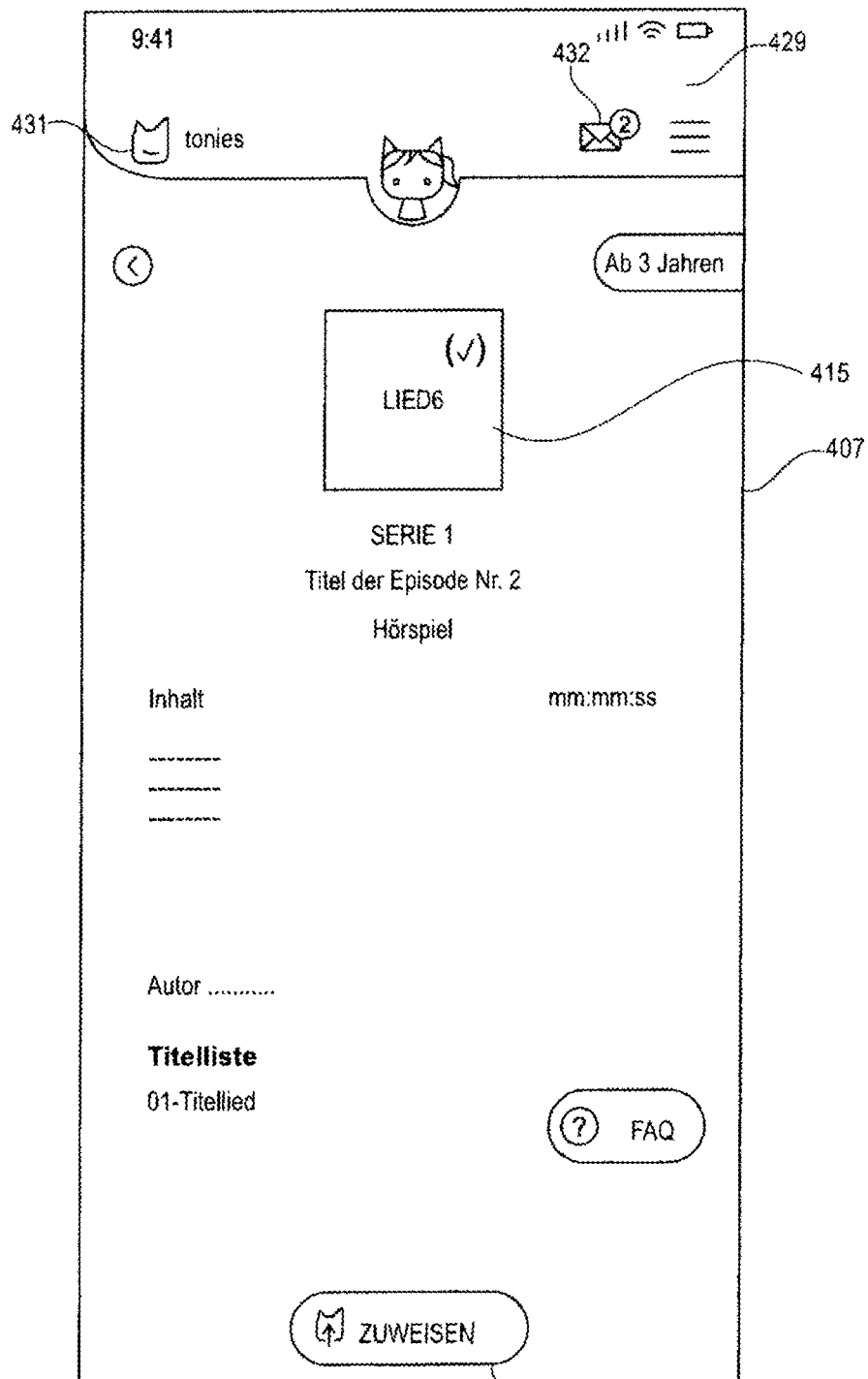
Figure 15:
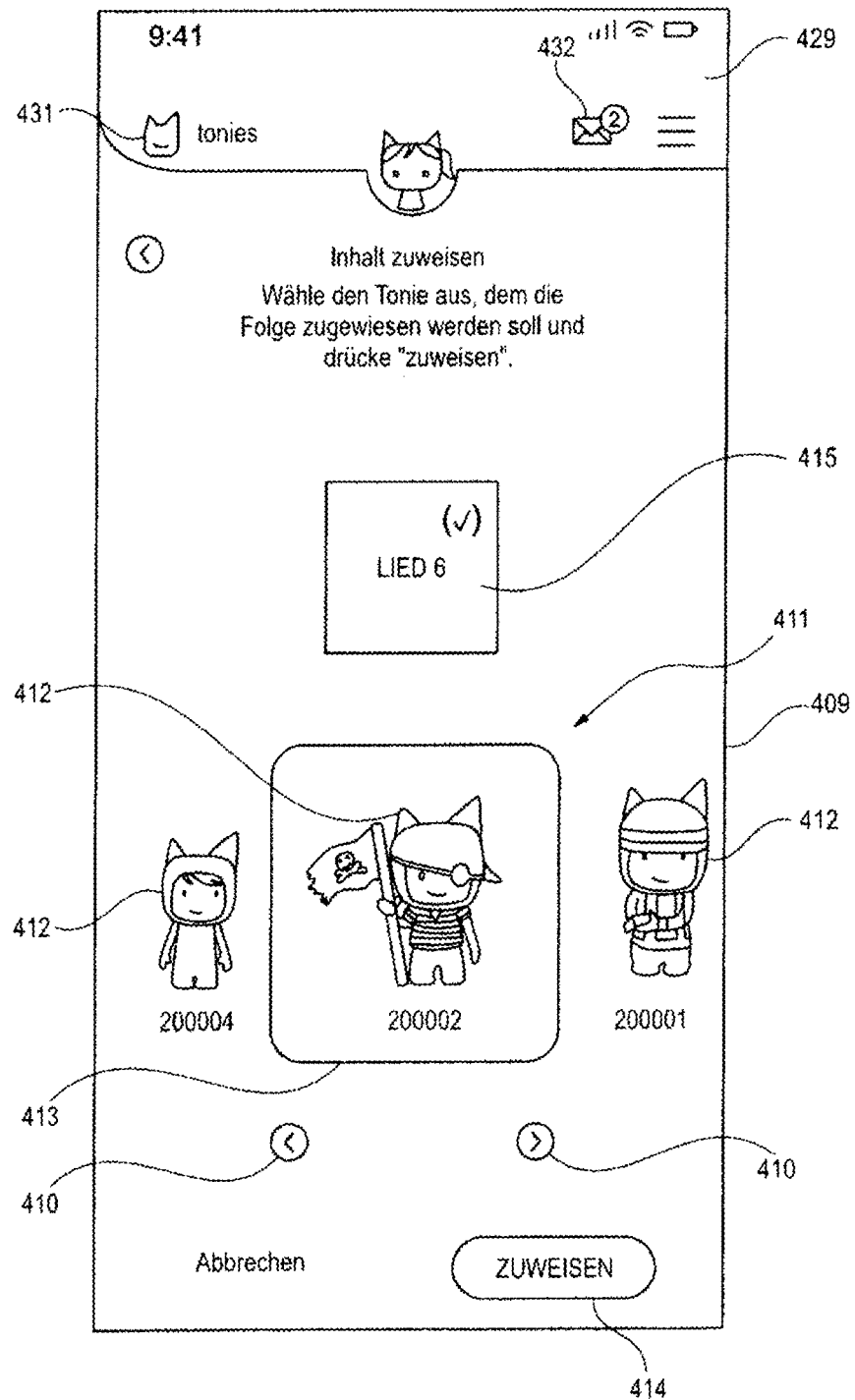
Figure 16:
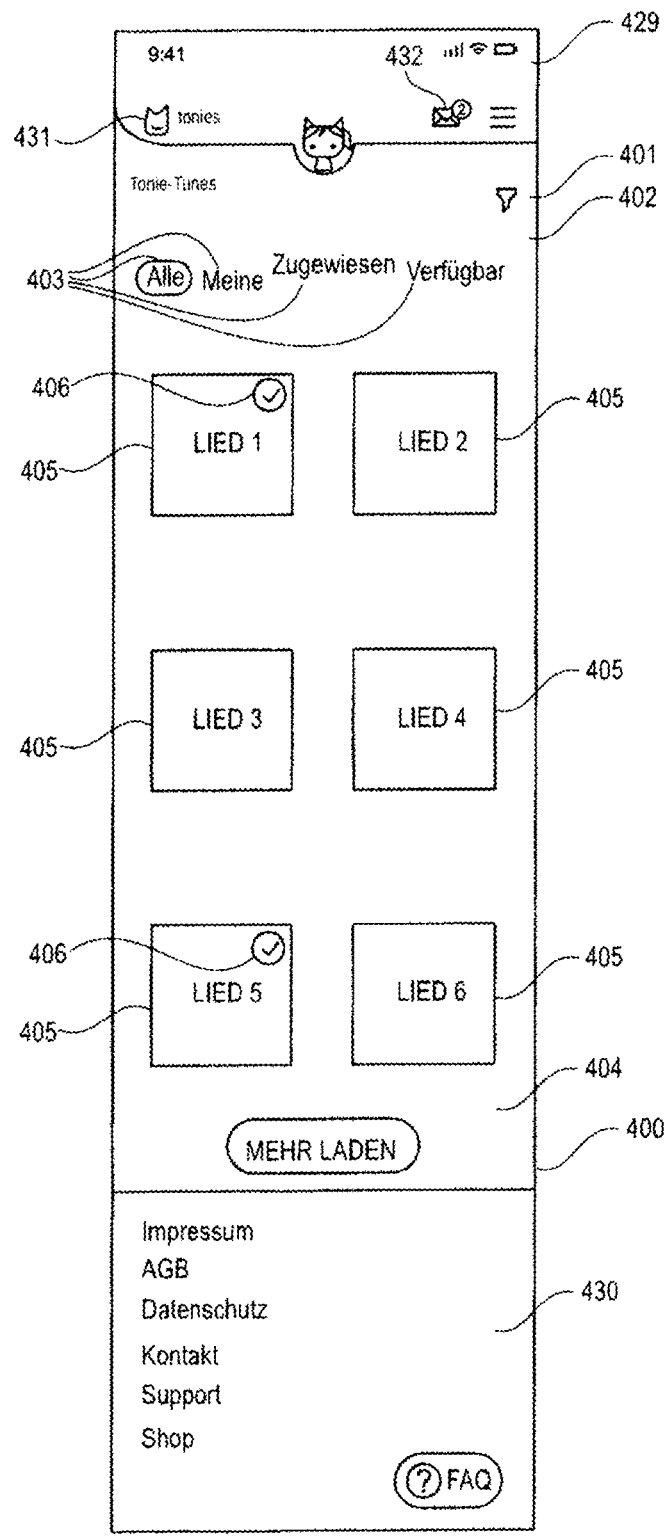
Figure 17:
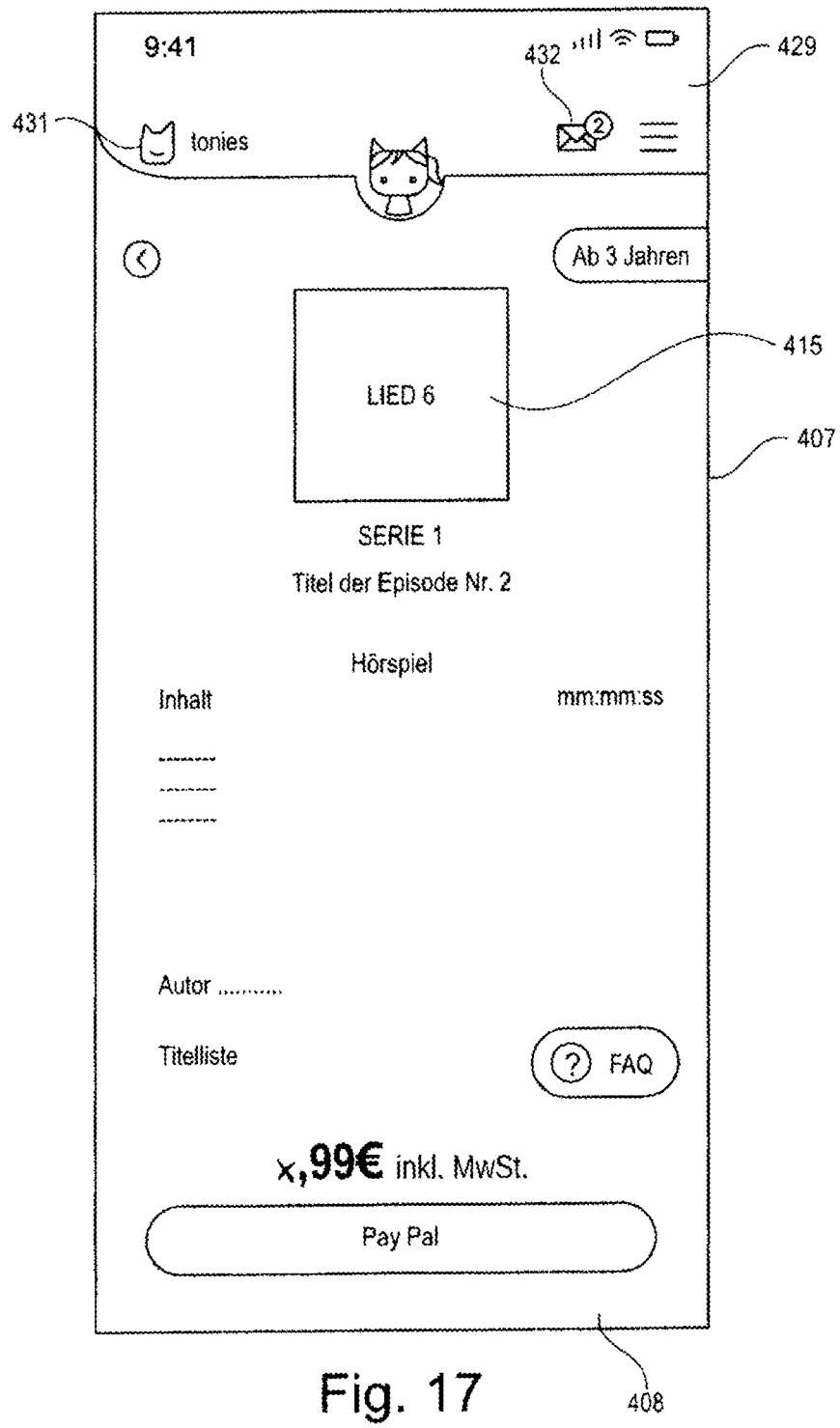
Figure 18:
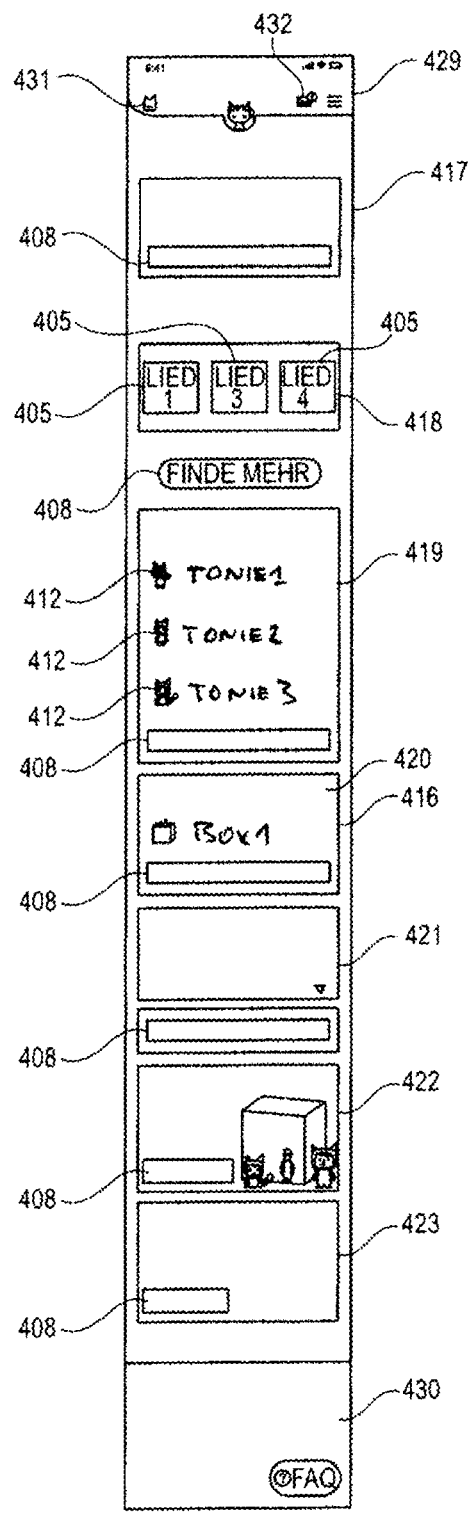
Figure 19:
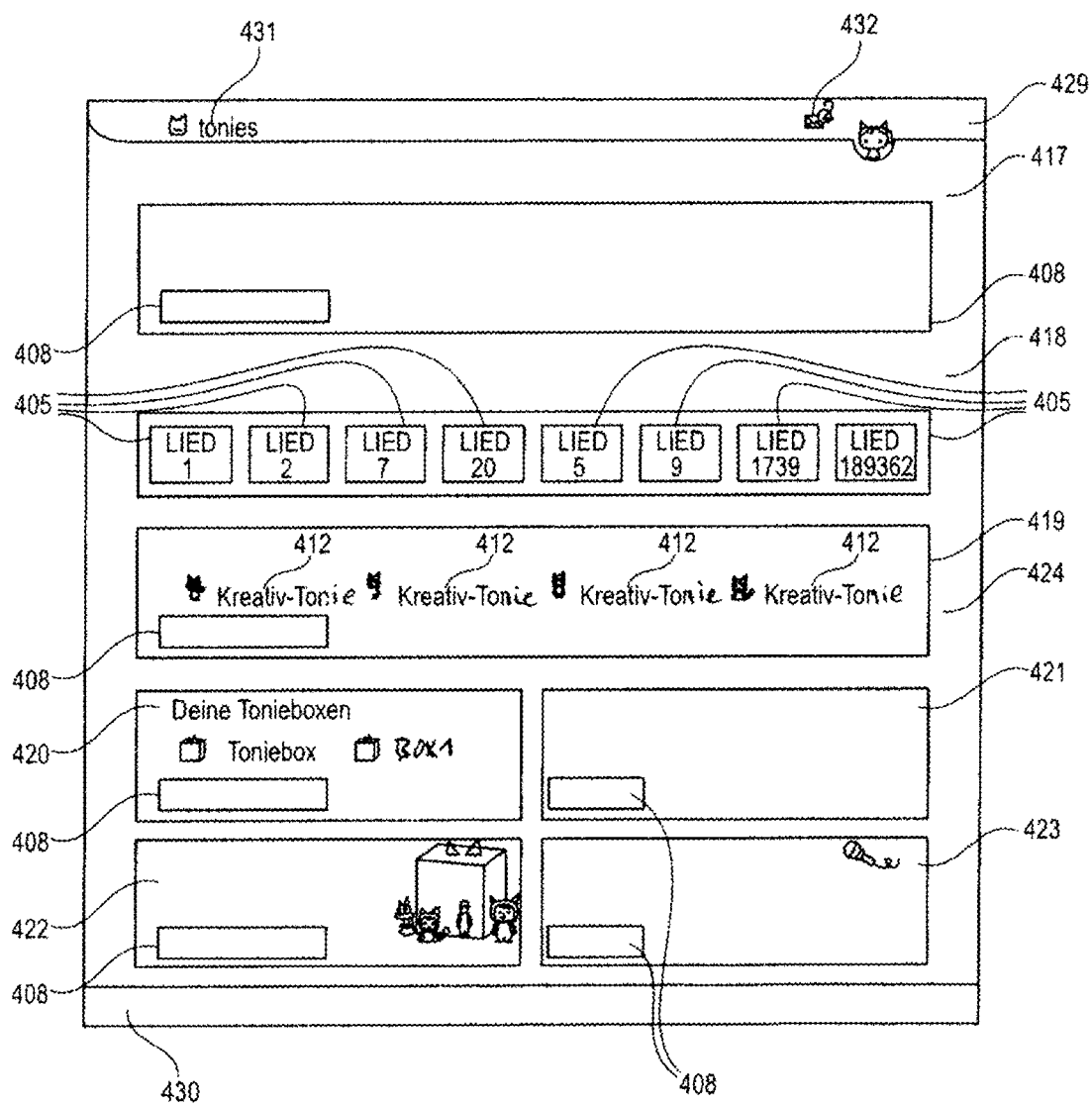
Figure 20:
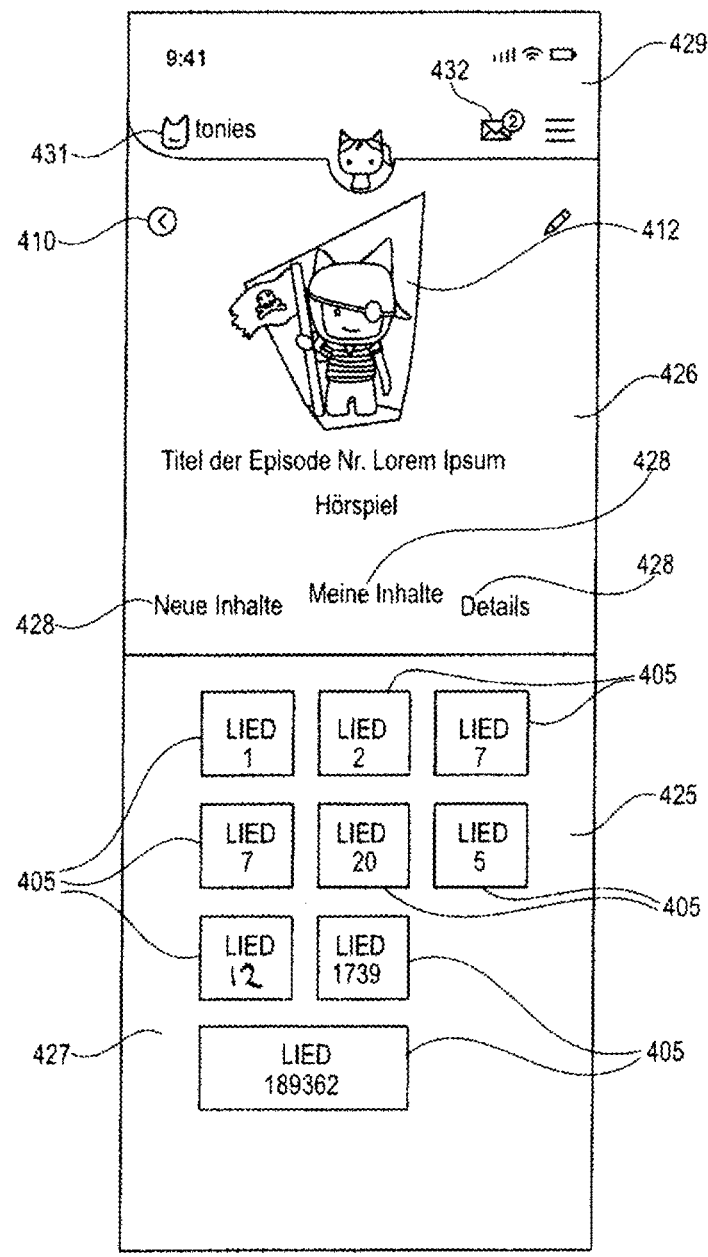
Figure 21:
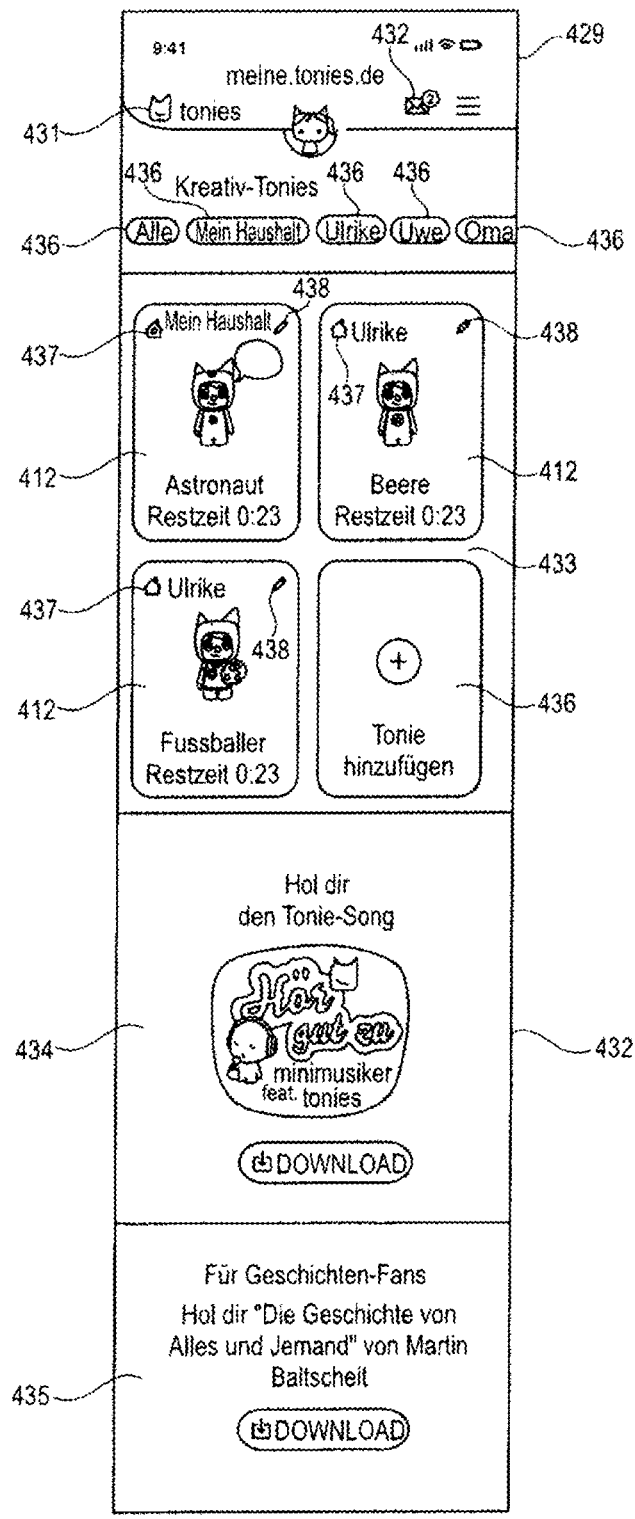
Figure 22:
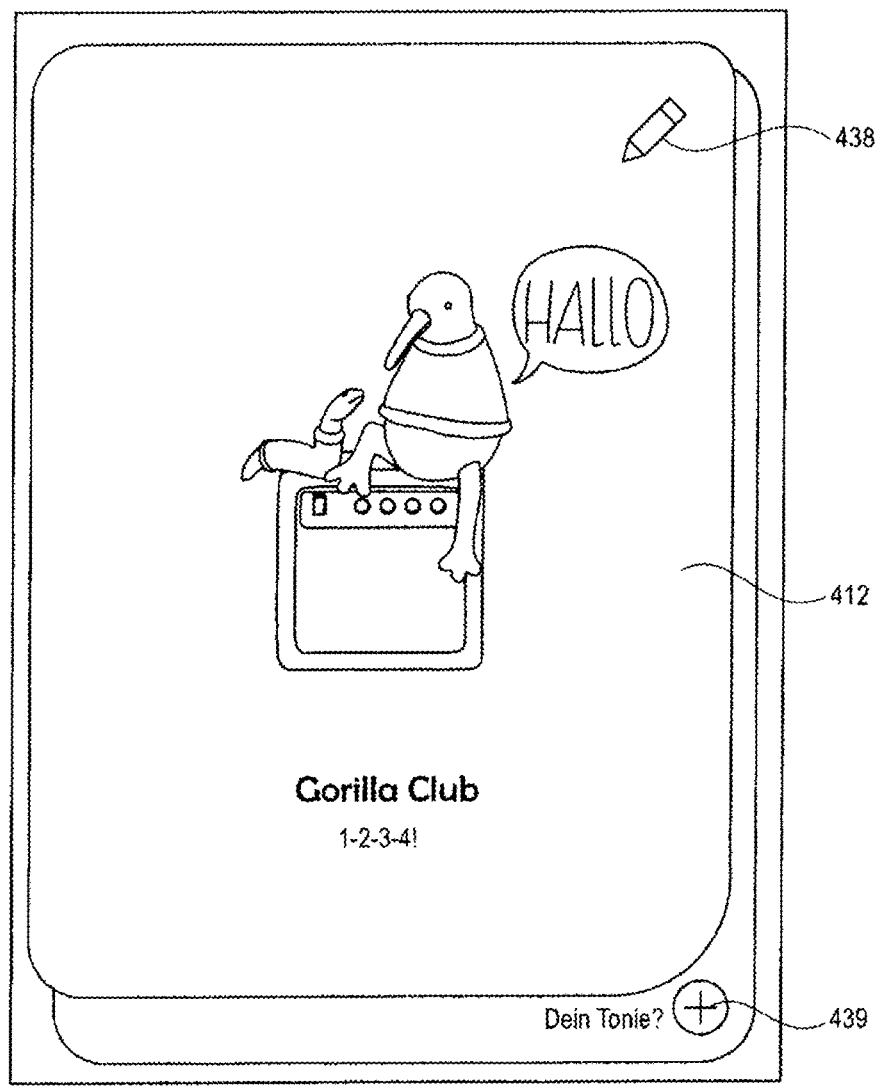
Figure 23:
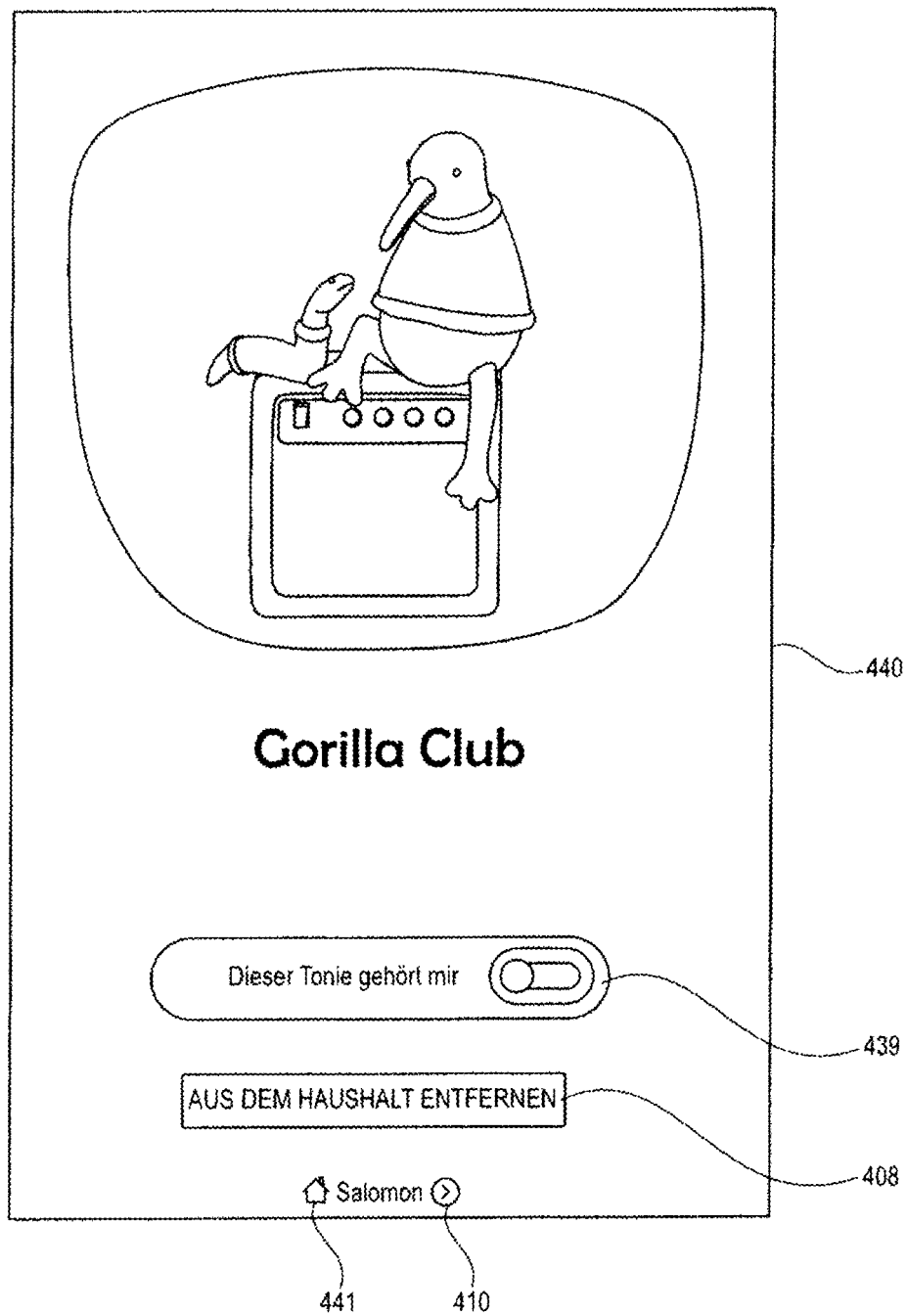
Figure 24:
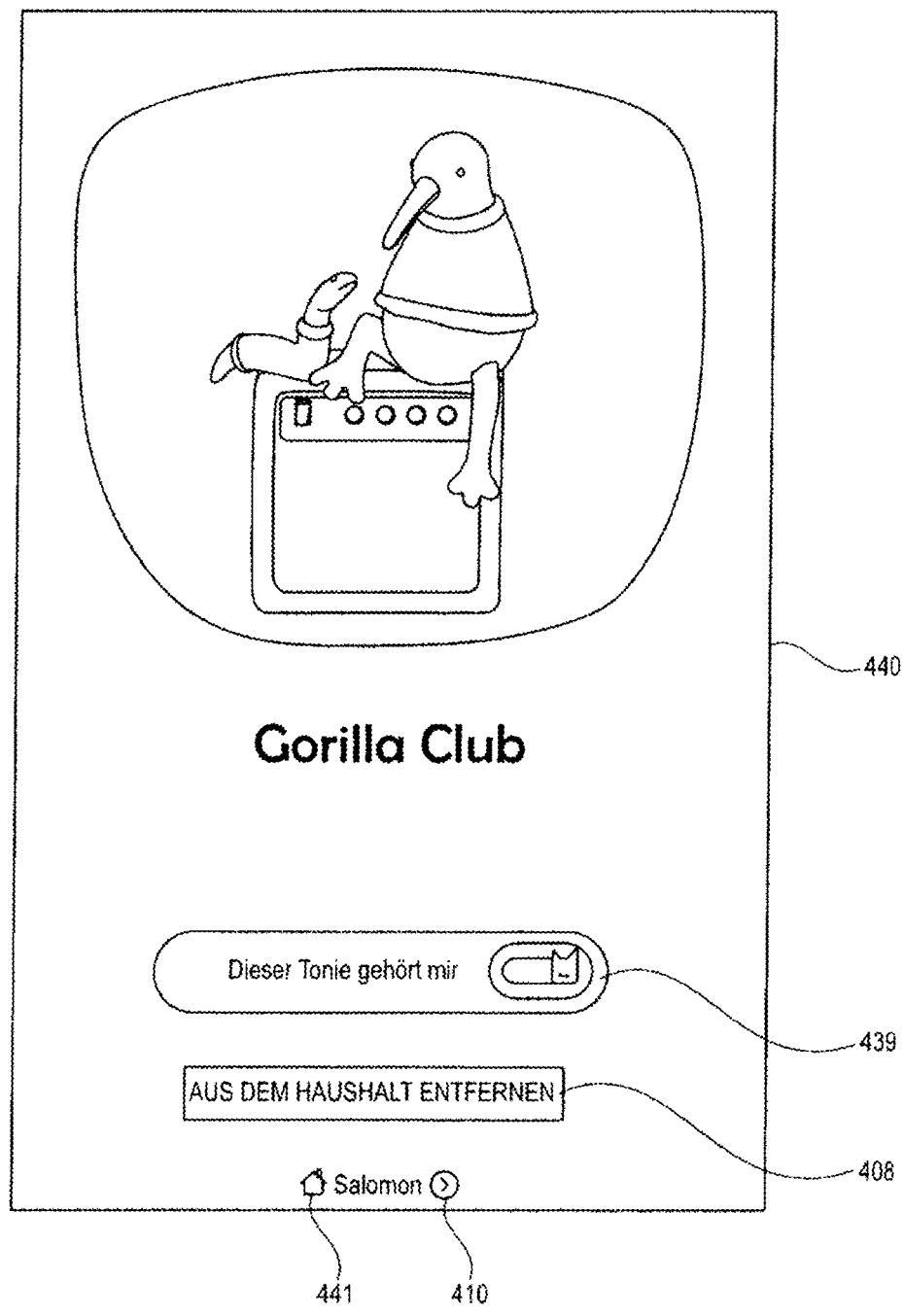
Figure 25:
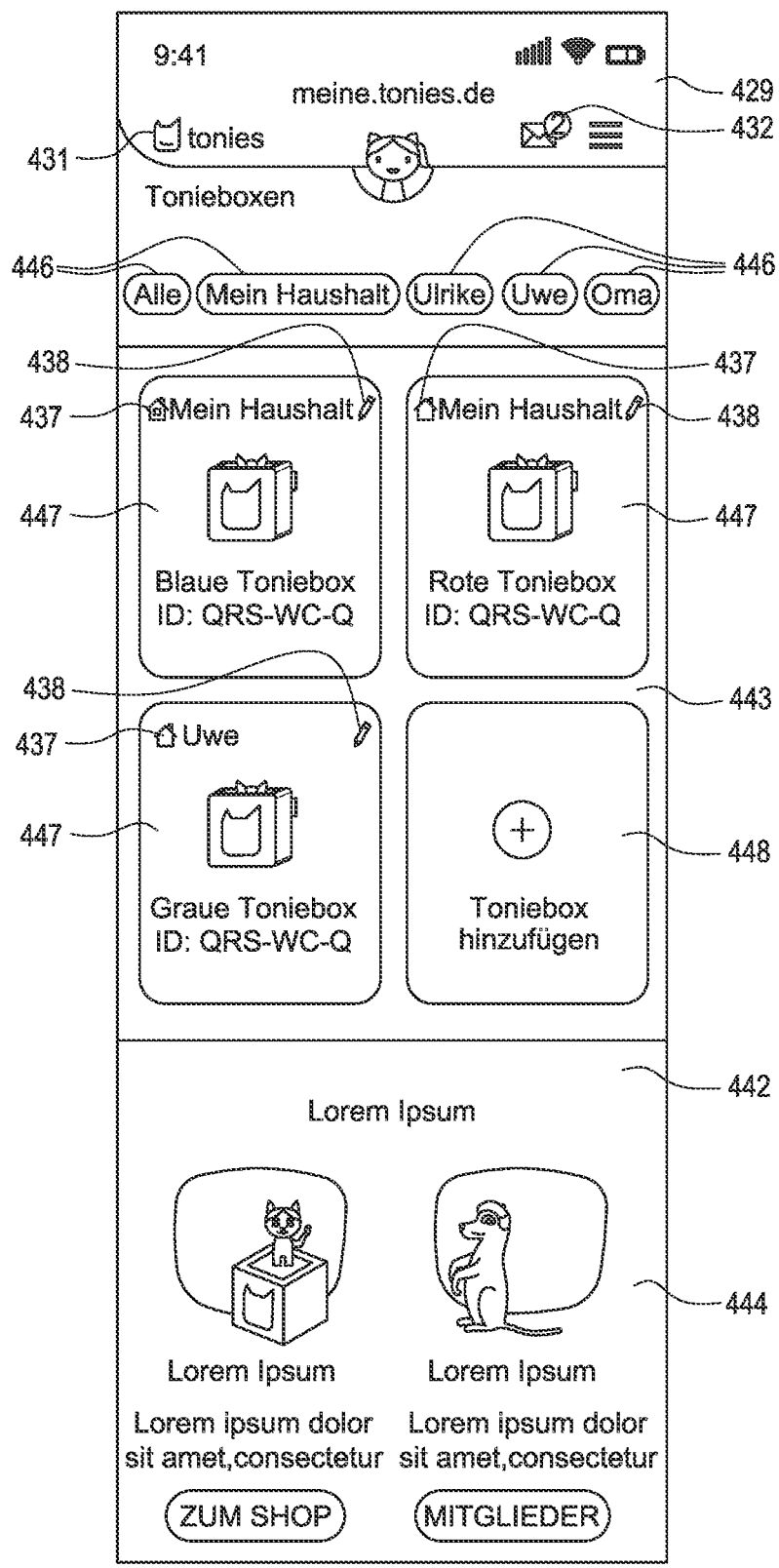
Figure 26:
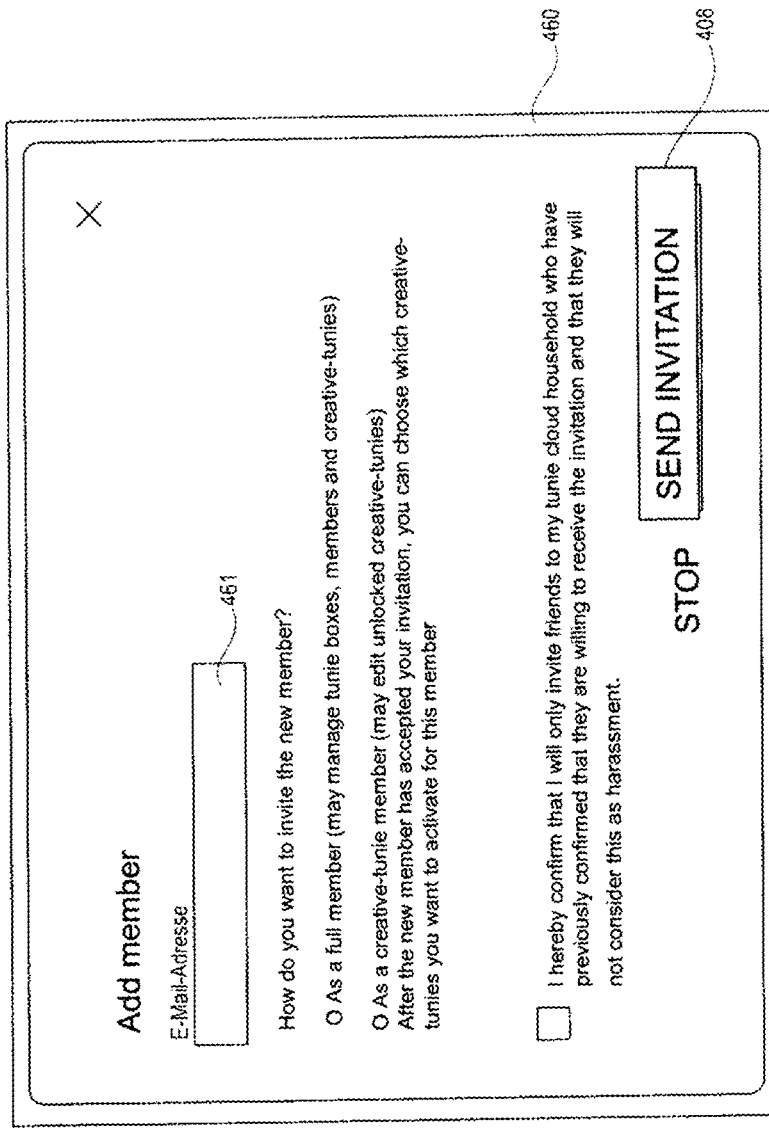

FIG. 1 is a perspective view of a playback device which can be part of the system according to an embodiment of the disclosure, FIG. 2 is a front view of the playback device according to FIG. 1 and an identification carrier, FIG. 3 is a schematic representation of a system according to an embodiment of the disclosure, FIG. 4 is a schematic representation of the playback device according to FIG. 1 with a schematic representation of the elements installed in the housing of the playback device, FIG. 5 is a schematic view of a system according to an embodiment of the disclosure with a server and a playback device and a communication/computer network, FIG. 6 is a schematic view of a system according to an embodiment of the disclosure with a server and a playback device and an external device designed as a smartphone and an external device designed as a laptop and a communication/computer network, FIG. 7 is a schematic view of the server and the user table, user group table, media table, identifier table, allocation table, authorization table stored in a memory of the server, FIG. 8 is the schematic view of FIG. 7 supplemented by an external device in the form of a smartphone and supplemented by a communication/computer network in a state of receiving a change signal, FIG. 9 is the schematic view of FIG. 8 in a further step of the program routine, FIG. 10 is the schematic view of FIG. 8 in a further step of the program routine, FIG. 11 is the schematic view of FIG. 7 supplemented by an external device in the form of a smartphone and supplemented by a communication/computer network in a state in which a library signal is emitted, FIG. 12 is the schematic view of FIG. 7 supplemented by an external device in the form of a smartphone and supplemented by a communication/computer network in a state in which an inventory signal is emitted, FIG. 13 is a schematic representation of a screen view of a GUI FIG. 14 is a schematic representation of a screen view of a GUI FIG. 15 is a schematic representation of a screen view of a GUI FIG. 16 is a schematic representation of a screen view of a GUI FIG. 17 is a schematic representation of a screen view of a GUI FIG. 18 is a schematic representation of a screen view of a GUI FIG. 19 is a schematic representation of a screen view of a GUI FIG. 20 is a schematic representation of a screen view of a GUI FIG. 21 is a schematic representation of a screen view of a GUI FIG. 22 is a schematic representation of an identifier image of a screen view of a GUI FIG. 23 is a schematic representation of an identifier image of a screen view of a GUI FIG. 24 is a schematic representation of a window of a screen view of a GUI FIG. 25 is a schematic representation of a window of a screen view of a GUI FIG. 26 is a schematic representation of a window of a screen view of a GUI

DETAILED DESCRIPTION

FIG. 1 shows a playback device 1 as it can be used as part of the system according to an embodiment of the disclosure. The playback device 1 has a speaker which is not shown in the perspective view of FIG. 1. Furthermore, the playback device 1 has a recess 3 on its upper side 2. Inside the playback device 1, below the recess 3, a sensor (not shown in detail) is arranged which can detect a property or a change in a property of this environment within the area of the recess 3, namely it can read a passive RFID transponder (see FIG. 2). Furthermore, the playback device 1 has a (not further detailed) control unit which can drive the speaker to play back audio information if the sensor detects a certain property or a certain change in a property of this environment within the area of its surroundings or if the control unit detects a certain change in the property detected by the sensor.

The playback device 1 has a first, ear-shaped control element 5 and a second, also ear-shaped control element 6. The control element 5 is larger than the control element 6. Both the control element 5 and the control element 6 can perform a tilting movement relative to the rest of the housing of the playback device 1 and can be swung back into the basic position shown in FIG. 1. Furthermore the playback device 1 has a display 7.

In FIG. 2, the playback device 1 is shown with the identification carrier 8 attached. The identification carrier 8 is designed as a figure with legs 9 and feet. Magnets (not shown in detail) are provided in the feet of the identification carrier 8 designed as a figure. These can interact with magnets or metal objects arranged directly under the bottom surface 4 of the recess 3, so that the identification carrier 8 can be detachably held on the bottom surface 4 of the recess 3.

The playback device and the identification carrier are operated as follows:

FIG. 1 shows the playback device in a basic state in which it does not reproduce any audio information in the embodiment shown here. The sensor continuously or periodically monitors the area of the recess 3 to determine whether this area has a specific property or a specific change in a property. In the embodiment shown here, the sensor monitors the area of the recess 3 to determine whether a specific RFID transponder is being brought into the area of the recess 3. In the operating status depicted in FIG. 1, this is not the case, so that the playback device 1 does not reproduce any audio information.

FIG. 2 shows the operating state in which the identification carrier 8 was set on the playback device. The identification carrier 8 is placed on the surface 4 of the recess 3 and adheres there by means of the magnets provided in the feet of the identification carrier 8. Identification carrier 8 has an RFID transponder (not shown in detail) (one identifier). As the identification carrier 8 has now been moved into the area of the sensors surroundings that is monitored by the sensor, it now has a certain characteristic that can be detected by the sensor. The sensor detects the presence of the RFID transponder in the identification carrier 8 and informs the (not further described) control unit by means of a signal. The control unit then controls the speaker to play back audio information without the need to operate any other control element.

The sensor reads an identifier from the RFID transponder of the identification carrier 8 and informs the control unit of this identifier. On the basis of an allocation table (playback device allocation table) stored in the control unit, the control unit allocates the identifier read by the sensor to a specific data record (a media file) containing specific audio information in a memory (not shown in detail) of playback device 1. The control unit then drives the speaker to play back the audio information contained in the specific record (media file) read from the memory by the control unit. This audio information is a piece of music that takes at least 10 seconds to play.

FIG. 3 shows the playback device 1 and an identification carrier 8, which can be placed in a recess 3 of the playback device 1. FIG. 1 also shows a base station 100, which has a projection 101 with a socket 102. On the (not shown) underside of the playback device 1, a recess corresponding to the projection 101 is provided with a plug projecting into the recess. When the playback device 1 with the recess provided on its underside is placed on the projection 101, the (not shown) plug is inserted into the socket 102, thereby creating an electrical connection between playback device 1 and base station 100. The base station 100 may have an electrical connection 103. A (not shown) rectifier may be provided in the base station 100 which converts the alternating current tapped with the plug of the electrical connection 103 into a direct current of the desired magnitude provided at socket 102. Instead of the electrical connection via the (not shown) plug and the socket 102, it is also conceivable that the base station 100 contains a coil for contactless, in particular inductive charging of the playback device 1 and the playback device 1 has a corresponding (not shown) coil.

The base station 100 may contain connectors or connections to other devices, such as speakers, displays or computers, for playing a program. Base station 100 may also contain communication modules, such as communication modules for a WLAN, for Bluetooth, for NFC or a mobile phone network.

FIG. 3 also shows a communication/computer network 110, a server 111 and an external operating device in the form of a smartphone 112.

The playback device 1 can communicate with the server 111 via the communication/computer network 110. Network 110 shown in FIG. 3 is shown as a cloud in order to clarify that the communication/computer network 110 can be implemented in different ways. The communication/computer network 110 can be wired alone. For example, a network cable, such as an Ethernet cable, may run from the playback device 1 to the server 111. Likewise, the symbolic representation of the cloud should represent a partially wired and partially wireless communication/computer network 110. Thus, a design is possible in which the playback device 1 communicates with a router that is connected to an Internet node via a cable using a WLAN standard. In such a configuration, the server 111 can in turn be connected by a cable to a router connected to a (different) Internet node. This allows the playback device 1 to communicate with the server 111 via the Internet. It is also possible that the communication/computer network 110 is partly or completely a mobile network. Thus a design is possible in which the playback device 1 has an identification module for identifying and logging into a mobile radio network. With the identification module, authentication and authorization can be carried out when logging in to a mobile radio network.

The server 111 can be designed as a "cloud server".

The server 111 can contain software components with which it can control and maintain a database. The software can also manage communication with the playback device 1, contain security protocols and can encrypt or decrypt the data traffic.

The smartphone 112 can communicate with the server 111 and/or the playback device 1 via the communication/computer network 110. It is preferable if the Smartphone 112 does not communicate directly with the playback device 1; this allows the playback device to be set up very easily. Embodiments are possible in which only the server 111 can communicate with the playback device 1. However, the Smartphone 112 can be used to make settings on the server 111, for example, to set a maximum volume. The server 111 can forward this setting, which has been changed by interaction with the smartphone 112, as a control intervention to the control unit of the playback device 1 via the communication/computer network 110. It is also possible to implement designs in which the smartphone 112 can communicate directly with the player 1 via the communication/computer network 110, for example, by directly controlling the player 1 and bypassing the server 111. In addition, there are also versions possible in which the smartphone communicates directly with the playback device 1, for example via Bluetooth or NFC.

FIG. 4 shows a schematic view of the elements installed in the playback device 1 in a preferred embodiment. The built-in elements are drawn with dashed lines in order to express that the spatial position shown in each case is a possible spatial position within the playback device 1, but that other spatial positions are also possible.

The playback device 1 has, as shown in FIG. 4, a sensor 120 that can detect a property or a change in a property of its environment within a range of its environment. The sensor 120 can be an RFID reader, an NFC reader, an infrared reader or an optical sensor. The identification carrier 8 can contain an active or passive RFID transponder. There are possible versions in which the identification carrier 8 contains an active RFID transponder and the sensor 120 is part of a read and write head of the identification carrier 8.

In the playback device 1 shown in FIG. 4, a magnet 121 is arranged below a support of the playback device 1 on which the identification carrier 8 is located. The magnet 121 interacts with a magnet (not shown) in the feet of the identification carrier 8 and holds the identification carrier 8 on the support of the playback device 1.

The playback device 1 has a control unit 130. The control unit has a processor 131. The control unit 130 also has a memory 132 with which the processor 131 can communicate. The memory has a non-volatile, read-only memory (ROM) 133 and a volatile or non-volatile read-write memory (RAM) 134. The playback device has a battery 135 with charging electronics. A plug 136 in a recess 137 on the bottom of the playback device 1 allows a connection to a socket 102 of a base station 100.

The control elements 5, 6 are connected to the processor 131. A speaker 138 is connected to the processor 131. A display (not shown in FIG. 4) can be connected to the processor 131. A 6.35 mm jack 206 is connected to the processor 131. A transmitting and receiving unit 139 for communication for a WLAN radio network is connected to the processor 131. The playback device has a gyroscope 140.

The program executed by the processor 131 performs a regular polling of the signals sent by the sensor 120 and the gyroscope 140. The sensor 120 is designed as an RFID reader and transmits an identifier to the processor 131 that the sensor 120 has read from an RFID transponder installed in the identification carrier 8. The processor 131 checks whether there is an entry for the identifier in a playback device allocation table stored in RAM 134. In the playback device allocation table, identifiers are assigned to information about a data record (a media file). If the processor 131 finds an entry for the ID in the playback device allocation table and thus information about a data record (a media file), it checks whether the data record (the media file) is also stored in RAM 134. If the data set (the media file) is stored in RAM 134, the processor 131 uses the data set (the media file) to control the speaker 138. The information about the media file stored in RAM 134 can be a media ID. The information can also be the location of the media file associated with the identifier in the playback device map, such as the location in RAM 134. The information can also be a pointer associated with the identifier in the playback device map, such as a URL from which the controller 130 can stream the media file to drive the speaker.

If the processor 131 determines that there is no entry associated with the identifier in the allocation table or that there is an entry associated with the identifier but does not contain an assignment (for example contains no information about a data record) or contains an update notification, the processor 131 generates a playback device request signal which the processor transmits to the server 111 via the transmitting and receiving unit 139 via a WLAN radio network. In the playback device request signal, the processor 131 communicates the identifier to the server 111 and requests a data record associated with the identifier to be downloaded into the RAM 134. The processor 131 can also use the playback device request signal to transmit a device identifier, namely its processor identifier, to the server 111 and thus identify itself to the server 111.

In response to the playback device request signal from the processor 131, the server 111 checks whether there is an entry for the identifier in an allocation table 313 stored in the server 111 (see FIG. 7). In the allocation table 313, an identifier is allocated information about a data record, namely a media ID. If the server 111 finds an entry for the ID in the allocation table 313 and thus information about a data record (a media file), the server 111 checks the entry assigned to the media ID assigned to the ID in the allocation table 313 in the media table 310. If the entry assigned to the media ID there refers to a media file stored in the server, for example a media file stored in the database server 305, the server 111 transfers this media file to playback device 1. If the entry assigned to the media ID there is a pointer, the server 111 transfers the pointer to playback device 1. The processor 131 updates the playback device allocation table in RAM 134 and assigns information about the downloaded data record or the downloaded pointer to the identifier. Processor 131 then uses the record or pointer to drive speaker 138.

FIG. 5 shows the playback device for reproducing audio information (a playback device 1). The playback device 1 can communicate with the server 111 via the communication/computer network 110. The communication/computer network 110 has a wireless communication path 300, for example communication via a WLAN. The playback device can communicate with a router 301 via the communication path 300. The router 301 is connected via a cable to an Internet node, not shown. A signal of the playback device 1 can be transmitted from the internet node (not shown) to a further internet node (not shown) via the internet shown as cloud 302. A cloud gate 303—symbolically represented as a door—is connected to this further (not shown) Internet node via a cable. The cloud gate 303 represents the entrance gate to server 111. The server 111 has a cloud gate 303, a sub-server called cloud services 304 and a database server 305.

If the playback device 1 is switched on or awoken from a sleep state, a first routine is executed in the playback device 1. As part of this first routine, the playback device 1 reads the playback device allocation table. After reading the playback device allocation table, the playback device 1 transmits the playback device allocation table, the time stored in processor 131 and the firmware version for processor 131 to the server 111 via the communication/computer network 110. The Internet address of the cloud gate 303 is stored in the playback device 1. Playback device 1 sends a signal to the cloud gate 303 via the WLAN 300 and the router 301 and via the Internet 302. A signal arriving at the cloud gate 303 is checked by the cloud gate 303 to see if it is a valid signal. For this purpose, the certificate belonging to the playback device is checked and transmitted with the signal.

After the cloud gate 303 has checked whether the signal coming from the playback device 1 is valid, the cloud gate 303 passes the signal through to the sub-server cloud services 304.

The cloud services 304 checks whether the time of the playback device 1 transmitted with the signal of the playback device 1 is correct. If it is incorrect, the cloud services 304 sends a correction signal to the playback device 1 in order to set the time. The correction signal is sent to the playback device 1 via the cloud gate 303, the Internet 302, the router 301 and the WLAN 300.

Furthermore, the cloud services 304 checks the version of the firmware of the playback device 1, which the playback device 1 also communicated with the signal. If the cloud services 304 determines that a newer firmware version is available for this specific playback device 1, the cloud services 304 pulls the file with the corresponding newer firmware from the database server 305. The cloud services 304 sends this newer firmware into the playback device 1 via the cloud gate 303, the internet 302, the router 301 and the WLAN 300.

The cloud services 304 also checks, for all identifiers communicated to it within the signal from the playback device 1, whether the time stamps of these respective identifiers also communicated to it via the signal from the playback device 1 are current.

After this start routine, both the time and the firmware as well as the playback device allocation table in the playback device 1 are brought up to date.

FIG. 6 shows that a smartphone 112 can communicate with the server 111 via the communication/computer network 110. Likewise, FIG. 6 shows that a laptop 306 can communicate with the server 111 via the communication/computer network 110.

The user can log in and identify the cloud services 304 via the smartphone 112 or the laptop 306.

FIG. 7 shows the server 111 as a rectangle. FIG. 7 shows a user table 307, which is stored in a memory of the server. The user table 307 shows an example of the two users Paul and Martin. Furthermore, user table 307 shows the password "Password 1" assigned to user Paul in the operating system of server 111 and the password "Password 2" assigned to user Martin in the operating system of server 111.

FIG. 7 also shows the user group table 309, which is stored in a memory of server 111. As FIG. 7 shows, user group table 309 contains a user group with the user group name "Household 1". The user group table 309 can be used to assign an administrator to a user group. In the example shown in FIG. 7, the user group "Household 1" is assigned user Paul as administrator. The user group "Household 1" is assigned user Martin as member 1. The user group "Household 1" consists of only two users, namely users Paul and Martin. This results from the fact that the additional field "Member 2" of the user group table 309 is empty for the user group of "Household 1". The user group table 309 can contain a number of additional columns beyond the embodiment shown in FIG. 7, which—in ascending order—create the possibility of assigning additional members to a user group. The number of columns provided can be used to determine how many users can be assigned to a user group.

FIG. 7 also shows that a media table 310 is stored on a memory of server 111. The media table 310 has a column with a media ID. In the example shown in FIG. 7, the sequence of letters and numbers "song1", "song2", "song3", "song4", "song5", "song6" is used as the media ID. However, a UID or a UUID or a GUID can also be used as a Media ID. The media table 310 contains a column "Media File". The name of a media file can be entered in this column, such as the name "song1.mp3". The "Media File" column can also contain a pointer, such as the pointer "www.database.eu/lied2.mp3". The media table 310 is used to assign a media file to the respective media ID. In the embodiment shown in FIG. 7, the media file "song1.MP3" is assigned to the media ID "song1", the media ID "song2" is assigned to the media file "www.database.eu/lied2.mp3", the media ID "song3" is assigned to the media file "song3 MP3", the media ID "song4" is assigned the media file "song4.MP3", the media ID "song5" is assigned the media file "song5.MP3" and the media ID "song6" is assigned the media file "song6.MP3.

In the embodiment shown in FIG. 7, the server 111 has a media storage 311. Media storage 311 may be database server 305. The server 111 can be designed in such a way that it understands the assignment of a concrete file name, here "song1.mp3" to a media ID (here: "song1") in the media table 310 as an indication that the media file "song1.mp3" assigned to the media ID "song1" is stored in the media storage 311 of the server 111 under the file name "song1.mp3". If the server 111 receives a request to provide the media file associated with the "song1" media ID, the server 111 can provide this specific media file using the 311 media store. The server 111 can be designed to understand the assignment of a pointer, such as "www.database.eu/lied2.mp3", in such a way that the concrete media file is not stored in a memory of the server 111 and especially not in the media memory 311. If the server 111 receives the request to provide the media file assigned to the media ID "song2", the server 111 in this embodiment will provide the pointer, for example "www.database.eu/lied2.mp3".

In the embodiment shown in FIG. 7, an identifier table 312 is stored in a memory of server 111. The identifier table 312 has one column "Identifier" and one column "User". In the column "Identifier", the identifiers 200001, 200002, 200003 and 200004 are stored in the embodiment shown in FIG. 7. In the identifier table 312, identifier 200001 is assigned to user Paul, identifier 200002 to user Paul, identifier 200003 to user Martin and identifier 200004 to the user group Household 1. In the embodiment shown in FIG. 7, the identifier is a six-digit number. However, it is also possible to use a UID, a UUID or a GUID.

In the embodiment according to FIG. 7, an allocation table 313 is stored in a memory of server 111. The allocation table 313 has one column "Identifier" and one column "Media ID". In the operating state in the embodiment shown in FIG. 7, the media ID "song1" is assigned to identifier 200001, the identifier 200002 to the media ID "song5", the identifier 200003 to the media ID "song3" and the identifier 200004 to the media ID "song2". The allocation table 313 also has a column "Media ID 2" in the form shown in FIG. 7. In the operating state of the server 111 shown in FIG. 7, whereby only the identifier 200003 in the column "Media ID 2" is assigned a media ID, namely the media ID "song4". In the embodiment shown in FIG. 7, the server 111 can be executed in such a way that when an entry is made in the column "Media ID 2", the media ID entered there (in this case the media ID "song4" for the identifier 200003) is assigned to the identifier. An entry in the column "Media ID 2" is thus hierarchically higher than an entry in the column "Media ID". The entry in the column "Media ID" can be understood as the default media ID.

In the embodiment shown in FIG. 7, an authorization table 314 is stored in a memory of the server 111. The authorization table 314 has a column "User" and a column "Media ID". In the embodiment shown in FIG. 7, in the authorization table 314, the user Paul has the media ID "song1" and "song5 5" in the in FIG. 7 shown operating state of the server 111 assigned. In this operating state, the user "Martin" is assigned the media ID "Lied3" and "Lied4". The media group "Lied2" is assigned to the user group "Household 1".

FIG. 8 shows a step of the program routine on the server according to an embodiment of the disclosure in which the user changes the allocation table 313 and assigns a first media ID to an identifier in the allocation table 313. The step of the program routine according to an embodiment of the disclosure shown in FIG. 8 is the step of receiving the change signal 315 by the server 111. The change signal 315 is a signal generated by the smartphone 112. The change signal 315 is transmitted from the smartphone 112 via the Internet 302 to the server 111 and received by it. The program routine is executed in such a way that the server 111 understands the change signal 315 as a change signal. This can either be achieved by the signal form itself, in which the signal form of the change signals are selected so that they contain the information in a header that the signal is a change signal. However, the Server 111 can also recognize the received signal as a change signal in such a way that the change signal is the signal that is sent to the Server 111 in response to a signal that the Server 111 sends out, for example, a library signal. The change signal 315 contains the information "ID=200002" and the information "Media ID=song1" in the embodiment shown in FIG. 8. This can be achieved by storing the sequence of numbers "200002" at a certain location of the change signal 315 and the sequence of characters "song1" at a second, predetermined location of the change signal 315. The server 111 can extract the information "identifier=200002" and the information "media ID=song1" from such a change signal 315 during the evaluation of the signal solely by the position within the signal, without the terms "identifier" and "media ID" having to exist within the signal itself.

In FIG. 8, the server 111 receives the change signal 315. In this operating state, the media ID "song5" is assigned to the identifier 200002 in the allocation table 313.

FIG. 9 shows a step of the program routine according to an embodiment of the disclosure, which follows the step of receiving the change signal 315 shown in FIG. 8. In the step shown in FIG. 9, the server 111 deletes the assignment of the identifier 200002 to the media ID "song5" in the assignment table 313. This is illustrated in FIG. 9 by crossing out the media ID "song5" in the line of the identifier 200002 in the identifier table 313.

FIG. 10 shows a step of the program routine which follows the step shown in FIG. 9. In the step shown in FIG. 10, the server 111 assigns the media ID "song1" to the identifier 200002 in the allocation table 313. This is done by the server writing the media ID "song 1" in the allocation table 313 in the row of the identifier 200002 in the column "Media ID".

As a result, the execution of the program routine (sequence shown in FIG. 8, FIG. 9 and FIG. 23) changes the assignment of the ID 200002 to that of a media file "song5", which can also be referred to as the second media ID, to the assignment to the media file "song1", which can also be referred to as the first media ID, whereby the first media ID (here: media ID "song1") was not assigned to the identifier 200002 before the execution of the program routine (see FIG. 7).

FIG. 11 shows a step of a library routine provided on the server 111 according to an embodiment of the disclosure. The step of the library routine shown in FIG. 11 is the step of sending the library signal 316. In an earlier (not shown) part of the library routine, a library request signal was received by server 111 and sent by the smartphone 112 to the server 111. The library request signal contained a library criterion. The library criterion was chosen so that when it is applied in the library routine, it reads all media IDs from the authorization table 314 that are assigned to the user Paul in the authorization table 312 (library criterion "User Media ID") without displaying the media IDs assigned to the User Group "Household1" in authorization table 312. The library signal 316 contains the information that user Paul is assigned the media IDs "song1" and "song5" and "song6" in the authorization table 314. This is symbolized in FIG. 11 by the fact that the table entry for the authorization table 314 assigned to user Paul is assigned to library signal 316 in FIG. 11 by means of a dotted line.

FIG. 12 shows one step of an inventory routine provided on the server 111 according to an embodiment of the disclosure. The step of the inventory routine shown in FIG. 12 is the step of sending the inventory signal 317. In an earlier (not shown) part of the inventory routine, an inventory request signal was received by server 111 and sent by the smartphone 112 to the server 111. The inventory request signal contained an inventory criterion. The inventory criterion was chosen so that when it was applied in the inventory routine of the server 111, all the identifiers stored in the servers identifier table 312 were read, which are assigned in the identifier table 312 to a particular user or user group to which the particular user belongs according to the user group table 309 of the server 111, (inventory criterion "user identification"). The inventory signal contains the information that the user Paul or a user group to which the user Paul belongs according to the user group table 309 (user group: "Household1") is assigned the identifiers 200001, 200002 and 200004 in the identifier table 312. This is symbolized in FIG. 12 by the fact that the table entry of the authorization table 312, which is assigned to user Paul and household1, is assigned to inventory signal 317 in FIG. 12 by means of a dotted line.

FIG. 13 shows a screen view 400 as it can be generated by a GUI that is part of a UI executed by a user on a smartphone 112.

As part of the screen 400, a filter button 401 is offered, which the user can operate by interacting with the touch screen of the smartphone 112. In addition, a filter button bar 402 is offered which, in the form shown in FIG. 13, has four predefined filter buttons 403, namely the predefined filter button 403 "All", the predefined filter button 403 "My", the predefined filter button 403 "Assigned" and the predefined filter button 403 "Available".

If the user activates the filter button 403 "all" by interacting with the touch screen of the smartphone 112, the user thereby creates a library request with a library criterion which, when applied in the library routine of the server, causes all media IDs stored in the media table of the server to be read (library criterion "all"). If the user activates the filter button 403 "My" by interacting with the touch screen of the smartphone 112, the user thereby generates a library request with a library criterion which, when applied in the library routine of the server, results in all media IDs being read from the servers authorization table which, when applied in the servers library routine, results in all media IDs being read that are assigned in the servers authorization table to a specific user or user group to which the specific user belongs according to the servers user group table (library criterion "user media ID"). If the user activates the filter button 403 "Assigned" by interacting with the touch screen of the smartphone 112, the user thereby generates a library query with a library criterion which, when applied in the library routine of the server, results in all media IDs being read from the servers authorization table that are assigned to a specific user or user group in the authorization table to which the particular user belongs according to the servers user group table, and which are assigned in the servers allocation table to an identifier which is assigned in the identifier table to a particular user or user group to which the particular user belongs according to the user group table (library criterion "Assigned Media ID"). If the user activates the filter button 403 "Available" by interacting with the touch screen of the smartphone 112, the user thereby generates a library query with a library criterion which, when applied in the library routine of the server, results in all media IDs being read from the servers authorization table which are assigned to a specific user or user group in the servers authorization table to which the particular user belongs according to the servers user group table, and which are not assigned in the servers allocation table to an identifier that is assigned in the identifier table to a particular user or user group to which the particular user belongs according to the user group table (library criterion "Free Media ID").

The user interface controls the smartphone 112 to send the library request signal. As in FIG. 11, the smartphone 112 and with it the user interface receives the library signal 316 in response to the transmission of the library request signal. The user is shown all media IDs contained in the library signal 316 by means of the GUI, namely in screen view 400. In the version shown in FIG. 13, the filter button 403 "all" has been pressed, which results from the fact that it is framed. In a central window 404 of screen view 400, the media IDs "song 1", "song 2", "song 3", "song 4", "song 5", "song 6" contained in library signal 316 are displayed in the form of content buttons 405, which can be operated by the user by interacting with the touch screen of the smartphone 112.

The library signal 316 transmitted according to FIG. 11 contains, in addition to the media ID ("song1", "song5", "song6") contained in the library signal, the information that these media IDs ("song1", "song5", "song6") are assigned to the user Paul in the authorization table 314 of server 111. This assignment is conveyed to the user Paul in screen view 400 by the fact that the content buttons 405 for the media IDs "Song1", "Song5", and "Song6" are marked with a check mark in contrast to the content buttons 405 for the media IDs "Song2", "Song3", "Song4".

FIG. 13 shows the screen view 400 after receiving a library signal 316 sent by server 111 in the operating situation shown in FIG. 11. In the operating situation shown in FIG. 11, the user Paul is assigned the media IDs song 1, song 5 and song 6 in the authorization table 314.

FIG. 14 shows a screen view 407 as it can be generated by a GUI that is part of a UI executed by a user on a smartphone 112. The user gets to screen 407 by pressing a content button 405 in screen 400.

In the screen view 407, the selected media ID is shown as the media image 415. Furthermore, the screen view 407 can contain information about a series to which this media ID belongs and about the playing time, the type of audio content ("radio play"), a summary of the content, information about author and a title list. The screen view 407 shown in FIG. 14 has the action button 408.

FIG. 15 shows a screen view 409 as can be generated by a GUI that is part of a UI that is executed by a user on a smartphone 112. By pressing the action button 408 in the screen view 407 (see FIG. 14) the user arrives at the screen view 409 (see FIG. 15). In the screen view 409, the selected media ID is shown as the media image 415.

After pressing the action button 408 in the screen view 407, the user interface executes a UI inventory routine and generates the inventory request signal. To generate the screen view 409 shown in FIG. 15, the UI inventory routine generated an inventory request with an inventory criterion which, when used in the inventory routine of a server, results in all identifiers stored in the server's identifier table being read, which are assigned in the identifier table to the user Paul or a user group to which the user Paul belongs (household1).

The user interface controls the smartphone 112 to send an inventory request signal. As shown in FIG. 12, the smartphone 112 and the user interface receive the inventory signal 317 in response to the transmission of the inventory request signal. All identifiers contained in the inventory signal 317 are shown to the user via the GUI, namely in screen 409. In a central window 411 of screen 409, the identifiers 200001, 200002, 200004 contained in the inventory signal 317 are displayed in the form of identifier screens 412, which can be operated by the user by interacting with the touch screen of the smartphone 112.

The screen view 409 contains scroll buttons 410. By pressing the scroll buttons 410, the user can scroll through the series of identification screens 412 displayed in the central window 411. In the background, the user interface remembers which ID picture 412 is arranged in the selection frame 413 of the central window 411, or remembers, in the background, the identifier assigned to the identifier image 412 that is displayed in the selection frame 413.

The screen view 409 has an action button 414. If the user presses the action button 414, the user interface generates the change signal 315. The user interface writes the identifier of the identifier image 412 into the change signal 315, that was in the selection frame 413 at the time the action button 414 was pressed. Furthermore, the user interface writes in the change signal 315 the media ID assigned to the media image 415 that the GUI has displayed in the screen view 409. After the user interface has generated the change signal 315 in this way, the user interface causes the smartphone 112 to send the change signal 315. The change signal 315 is received by the server 111 and leads to the execution of a program routine as described in connection with FIGS. 8, 9, 10. In this case, the media ID "song6" would be assigned to the identifier 200002.

FIG. 16 shows the screen view 400 of FIG. 13 after receiving a library signal that was generated in an operating state of the server 111 in which the user ID Paul had not yet been assigned the media ID "song 6" in the authorization table 314. You can see in FIG. 16 that the content button 405 for the media ID "Lied6" has no checkmark.

FIG. 17 shows the screen view 407 of FIG. 14 after pressing the content button 405 for the media ID "song6" in FIG. 16. This can be seen from the fact that the media image 415 is shown without a check mark in screen view 407.

Since the GUI was informed via the library signal 316 that the media ID "song6" has not yet been assigned to user Paul in authorization table 314, the GUI constructs the action button 408 differently. Pressing the action button 408 in the form shown in FIG. 17 is a first step to generate an enable signal, namely the generation of a start signal for a transfer routine, namely a start signal for a PayPal® account, with which the enable signal can be generated.

The GUI can be executed in such a way that the user is then guided back to the screen as shown in FIG. 16. If the screen view is updated according to FIG. 16 and the media ID "song6" has been assigned to the user in the authorization table, the user will see screen view 400 in the variant shown in FIG. 13 (with a checkmark in the content button 405).

FIG. 18 shows a screen view 416 as can be generated by a GUI that is part of a UI that is executed by a user on a smartphone 112. The screen view 416 can be generated by the UI after going through a start routine and in particular after the user has logged on.

Screen view 416 has seven windows 417, 418, 419, 420, 421, 422 and 423. The UI can determine the content for these windows 417, 418, 419, 420, 421, 422 and 423 as part of the start routine by running through various routines.

The purpose of window 417 is to display the identifiers of a specific type to the user, namely the account type, assigned to the user in the identifier table. In the embodiment shown in FIG. 18, the user is "Ulrike". In the embodiment shown in FIG. 18, the user Ulrike has not yet been assigned an identifier of the identifier type "Account Type" in the identifier table 312. To determine the contents to be displayed in window 417, the UI inventory routine is executed as part of the UI start routine. The UI automatically generates an inventory request with an inventory criterion as part of the UI start routine. This inventory criterion is selected in such a way that when the UI is used in the inventory routine of a server, all identifiers stored in the servers identifier table are read, which are assigned in the identifier table to a specific user or user group to which the specific user belongs according to the servers user group table, and which are assigned the identifier type "Account Type" in the identifier table. In the execution example shown in FIG. 18, in response to the inventory request signal thus generated, the UI receives the inventory signal from the server, informing the UI that the user "Ulrike" is not assigned an identifier of the identifier type "Account Type" in the identifier table 312. The GUI can then display a default text in window 417, for example "Oh no, you don't have any songs yet!"

The window 419 is used to show the user the identifiers of a certain type, namely the creative type, assigned to the user in the identifier table. In the embodiment shown in FIG. 18, the user is "Ulrike". In the embodiment shown in FIG. 18, the user Ulrike already has three IDs of the ID type "Creative Type" in ID table 312 assigned to her. In order to determine the contents to be displayed in window 419, the UI inventory routine is executed as part of the UI start routine. The UI automatically generates an inventory request with an inventory criterion as part of the UI start routine. This inventory criterion is selected in such a way that when the UI is used in the inventory routine of a server, all identifiers stored in the servers identification table are read, which are assigned in the identifier table to a specific user or user group to which the specific user belongs according to the servers user group table, and which are assigned the identifier type "creative type" in the identifier table. In the embodiment shown in FIG. 18, in response to the inventory request signal thus generated, the UI receives the inventory signal from the server, which tells the UI the 3 identifiers assigned to the user "Ulrike". These are displayed by the GUI in window 419. FIG. 18 also shows that in the GUI it is possible to use a placeholder and a picture instead of the identifier itself, i.e. instead of a UID, UUID or GUID possibly intended as identifier. This makes it easier for the user to display the identifiers. In the background, however, the UI remembers the identifier assigned to the respective image or the respective placeholder.

In window 419, the identifiers assigned to the user in the identifier table 312 are displayed with the "creative type" identifier type in the form of identifier images 412.

The purpose of window 418 is to show the user media IDs that are not yet assigned to the user in the authorization table, but which the user could assign to one of his/her IDs—for example because they belong to the same series. To determine the contents to be displayed in window 418, the UI library routine is executed as part of the UI start routine. During the UI start routine, the UI automatically generates a library query with a library criterion that is selected so that when it is used in the library routine of the server:

All identifiers are first determined in the servers identification table that are assigned to the user or a user group to which the user belongs according to the servers user group table, and from these identifiers, it is determined to which of these identifiers an identifier type is sent that indicates the assignment of this identifier to a specific series, so that all series to which the user is assigned identifiers in the servers identification table are determined, then all the media IDs stored in the media table of the server are read, to which membership in the server's media table is assigned to one of the series determined in this manner, then from the media IDs determined in this manner, which are determined and which are not assigned in the server's authorization table to the specific user or a user group to which the specific user belongs according to the user group table of the server.

The library request is sent as a library request signal. In the special embodiment shown in FIG. 18, in response to the library request signal generated in this manner, the UI receives the library signal from the server with the media ID for "song1", "song3", "song4", which represents the UI in the window 418 of the GUI.

The media IDs communicated to the UI with the library signal 316 are shown in the window 418 as content buttons 405. By interacting with the GUI, namely by pressing one of the content buttons 405, the user can get to the screen view 407. Since, due to the library criterion selected for this purpose, only the media ID that has not yet been assigned to the user Ulrike in authorization table 314 is shown in window 418, pressing one of the content buttons 405 in window 418 takes the user to screen view 407 in the version shown in FIG. 17.

The window 420 is used to provide the user with those device identifiers which are assigned to the user in the user table or which are assigned in a user group table to a user group to which the user belongs. In order to determine the contents to be displayed in window 420, the UI inventory routine is conducted as part of the UI start routine. The UI automatically generates an inventory request with an inventory criterion as part of the UI start routine, which is selected so that when it is used in the servers inventory routine, all device identifiers stored in the user table or user group table are read, which are in the user table for a specific user or assigned to a user group to which the specific user belongs according to the user group table ("user device identifiers"

inventory criterion). The inventory request is sent as an inventory request signal. In the example embodiment shown in FIG. 18, the UI receives the inventory signal with a device identifier from the server in response to the inventory request signal generated in this way. FIG. 18 also shows that it is possible in the GUI to use a placeholder and an image instead of the device identifier itself, or in other words, instead of a UID, UUID or GUID which may be provided as the identifier. This makes it easier for the user to display the device IDs. In the background, however, the UI remembers the device identifier assigned to the respective image or the respective placeholder.

Window 421 allows the user to start a UI user maintenance routine.

Windows 422 and 423 can be used to convey further information to the user or to send the user to other screen views of the GUI or even send the user to another user interface, for example a shop.

Each of windows 417, 418, 419, 420, 421, 422, and 423 have action buttons 408. By pressing one of the action buttons 408, the user can go from the screen view 416 to other screen views within the GUI or can also be sent to another program, for example a GUI for a shop.

Pressing the action button 408 of the window 418 ("find more") can, for example, direct the user to the screen view 400 according to FIG. 13.

FIG. 19 shows screen view 424 as it can be generated by a GUI that is part of a UI that is executed by a user on a laptop. By using the same reference numbers between FIG. 18 and FIG. 19, it is made clear that although screen view 416 and screen view 424 differ with regard to the spatial arrangement of windows 417, 418, 419, 420, 421, 422, 423 and with regard to the size of the respective windows 417, 418, 419, 420, 421, 422, 423, the windows display the same content.

FIG. 20 shows a screen view 425 as can be generated by a GUI that is part of a UI that is executed by a user on a smartphone 112. The user can access the screen view 425 according to FIG. 20, for example, if the user activates one of the identifier images 412 in the window 419 of screen view 416 of FIG. 18.

The selected identifier is shown in the screen view 425 as the identifier image 412. In an information window 426, further information about the identifier of the identifier image 412 can be displayed. If, for example, the identifier of the identifier image 412 is an identifier of the "content type" identifier type and thereby the identifier type of a specific series, for example "Benjamin Blümchen", information about the series can be displayed in the information window 426.

The screen view 425 also has a window 427 and filter buttons 428, which has three predefined filter buttons 428 as shown in FIG. 20, namely the predefined filter button 428 "New Content", the predefined filter button 428 "My Content" and the predefined filter button 428 "Details".

If the user activates the filter button 428 "New Content" by interacting with the touchscreen of the smartphone 112, the user thus generates a library query with a library criterion that is selected such that it is used in the library routine of the server and:

it is first determined in the identifier table of the server which series the identifier type of the identifier shown in FIG. 20 as selected, is assigned in the servers identifier table, then all media IDs stored in the media table of the server are read, which are assigned to the series in the server's media table, then the media IDs determined in this way are then used to determine those that are not assigned to the specific user or a user group to which the specific user belongs according to the servers user group table.

If the user activates the filter button 428 "My Content" by interacting with the touchscreen of the smartphone 112, the user is thus generating a library query with a library criterion that is selected such that when it is used in the library routine of the server:

it is first determined in the identifier table of the server which series the identifier type of the identifier shown in FIG. 20 as selected, is assigned in the servers identifier table, then all media IDs stored in the media table of the server are read, which are assigned to the series in the server's media table, then the media IDs determined in this way are then used to determine those that are not assigned to the specific user or a user group to which the specific user belongs according to the servers user group table.

If the user activates the filter button 428 "Details" by interacting with the touchscreen of the smartphone 112, the GUI generates a screen view in which further details about the identifier of the identifier images 412 are given, such as information about the content of the media ID to which the identifier is currently assigned, or the content of the media file that is assigned to the media ID to which the identifier is currently assigned.

If the user presses one of the content buttons 405, the user can, for example, get to the screen view 407. Since, in the embodiment shown in FIG. 20, media IDs are shown in the window 427 which have not yet been assigned to the user in the authorization table 314, the user reaches the screen view 407 in the version of FIG. 17 by pressing the content button 405.

Screen view 425 also provides a scroll button 410. This allows the user to switch between different identifiers.

The GUI can generate a frame for the screen views it generates, or for parts of the screen views it generates, or a header 429 and a footer 430 which are the same for all screen views generated by the GUI or for parts of the screen views generated by the GUI. The header 429 and the footer 430 of the GUI for a smartphone can be different from a GUI for a laptop.

The header 429 can, for example, have a home button 431, which the user can use to jump to screen view 423 or 424. Furthermore, the header 429 may have an inbox button 432. By pressing the Inbox button 432, the user gets to a view in which information/messages are displayed.

FIG. 21 shows a screen view 432 that can be generated by a GUI that is part of a UI that is executed by a user of a smartphone 112. FIG. 21 shows the screen view 432, which a user can access if the user presses the action button 408 in the window 419 in the screen view 416 according to FIG. 18. Screen view 432 has windows 433, 434, 435. Furthermore, the screen view 433 has filter buttons 436. If the user activates the filter button 436 "All" by interacting with the touchscreen of the smartphone 112, the user generates an inventory request with the inventory criterion selected in such a way that, when applied in the inventory routine of the server, all identifiers stored in the server's identification table are read, which are assigned in the identification table to a specific user or user group to which the specific user belongs according to the server's user group table and to which the specific "creative type" identification type is assigned in the identification table.

In window 433, the user is shown the identifiers contained in the inventory signal sent to the UI in response to sending the inventory request signal with the corresponding inventory criterion of filter button 436 in the form of the identifier images 412. In addition, a supplementary screen 436 gives the user the option to start a routine to assign another identifier in the server's identifier table.

The windows 434 and 435 enable the GUI to offer the user further interaction options.

In the embodiment shown in identifier images 412, as selected in the embodiment shown in FIG. 21, the user is given user group information 437 within the identifier image. The user group information 437 can indicate to which user group the identifier is assigned in the servers identification table. In the display of user group information 437, it is possible to provide information to the user indicating the allocation of the identifier in the identifier table to a user group for which the current user is the administrator. Such a user group information 437 can be called "My Household" as depicted in the embodiment shown in FIG. 21. User group information 437 can contain the name of a user group for which the current user is not the administrator in the servers identification table; in the embodiment shown in FIG. 21, this is "Ulrike".

The identifier images 412 in the embodiment of FIG. 21 can also contain a change symbol 438.

FIG. 22 shows a further possible representation of an identifier image 412. In the embodiment shown in FIG. 22, the identifier image 412 has no user group information 437, but does show the change symbol 438. Furthermore, an assignment button 439 is provided in the embodiment of the identifier image 412 according to FIG. 22. By pressing the assignment button 439, the user can trigger a UI lock routine or a UI unlock routine.

FIG. 23 shows the view of a window 440, which can be part of a screen view (not shown in more detail), which the user can access if the user presses the change symbol 438. In window 440, the user is shown the identifier that the user selected. Furthermore, an assignment button 439 is provided to the user as a sliding button. The assignment button 439, designed as a slider, can take the position shown in FIG. 23 or take the position shown in FIG. 24 through the user's interaction with the GUI. When the slider of the assignment button 439 is moved from the position shown in FIG. 23 to the position shown in FIG. 24, the user can trigger a UI locking routine. When changing the position of the assignment button 439, which is designed as a slider, from the position shown in FIG. 24 to the position shown in FIG. 23, the user can trigger a UI unlock routine.

The window 440 in FIG. 23 and FIG. 24 has an action button 408. By pressing the action button 408, the user can trigger a routine by means of which the user groups in the server are changed and the allocation of the identifier shown in window 440 to the user group shown in FIG. 440 as the household symbol 441 is deleted.

The window 440 also has a scroll button 410. In a preferred embodiment, the scroll button 410 is used to scroll through the identifiers shown in window 433. In an alternative embodiment, the scroll button 410 can be used to jump back to the screen view 432 according to FIG. 21.

FIG. 25 shows a screen view 442 as can be generated by a GUI that is part of a UI that is executed by a user of a smartphone 112. FIG. 25 shows the screen view 442, which a user can access if the user presses the action button 408 in the window 420 in the screen view 416 according to FIG. 18. Screen view 442 has windows 443, 444. Furthermore, the screen view 443 has filter buttons 446. If the user activates the filter button 446 "All" by interacting with the touchscreen of the smartphone 112, the user thus generates an inventory request with the inventory criterion selected in such a way that when applied in the inventory routine of the server, all device identifiers stored in the user table and the user group table are read, which are assigned in the user table and the user group table to a specific user or user group to which the specific user belongs according to the user group table of the server.

In window 443, the user is shown, in the form of playback device images 447, the identifiers that were communicated in the inventory signal that the UI received in response to sending the inventory request signal with the corresponding inventory criterion of the filter button 446. Furthermore, a supplementary screen 448 gives the user the option to start a routine to assign another device identifier in the user table or user group table of the server.

Window 444 of the GUI gives the user additional interaction options.

In the form of the playback device images 447, as selected in the version shown with FIG. 25, the user is given user group information 437 within the playback device image. The user group information 437 can indicate to which user group the device identifier in the user group table of the server is assigned. In the display of user group information 437, it is possible to show the user the allocation of the device identifier in the user group table to a user group for which the current user is the administrator. This user group information 437 can be called "My Household" as depicted in the embodiment shown in FIG. 25. For a user group for which the current user is not listed as administrator in the server's user group table, the user group information 437 can contain the name of the user group; in the embodiment shown in FIG. 25, this is "Ulrike".

The playback device images 447 in the embodiment of FIG. 21 can also contain a change symbol 438.

FIG. 26 shows a window 460 that can be displayed to the user by means of the GUI when the user presses the action button 408 in window 421. The window 460 has an input window 461, in which the user can enter an email address. By pressing the action button 408 "Send Invitation", the user can start a UI user maintenance routine.

The invention claimed is:

1. A non-transitory, computer-readable medium storing instructions adapted to be executed by one or more computer processors of a server to perform a method for providing media files for download by a playback device remote from the server, comprising:
    creating at least a first user and a second user for a same playback device in an operating system;
    storing a media table in a memory in which at least a first media ID is assigned to a first media file, and a second media ID is assigned to a second media file;
    storing an authorization table, wherein in the authorization table the first media ID and the second media ID are assigned to a user group comprising the at least first user and the second user;
    storing an identifier table in a memory in which a first and a second identifier, each of the identifiers capable of assignment to an identification carrier for the same playback device, are assigned to one of the first and the second user respectively;
    storing an allocation table in a memory, wherein in the allocation table:
        the first media ID and the second media ID are assignable to one of the identifiers for the same playback device; and
        the first media ID is not initially assigned to the first identifier for the same playback device;
    executing a program routine on the server configured to:
        allow the first user for the same playback device to, in communicating with the server independent of the same playback device, change the allocation table and assign the first media ID to the first identifier for the same playback device in the allocation table;
        allow the second user for the same playback device to, in communicating with the server independent of the same playback device, change the allocation table and assign the second media ID to the second identifier for the same playback device in the allocation table;
    whereby, responsive to receipt by the server from the playback device of a signal indicative of detection by the same playback device of an identification carrier assigned to the first identifier for the same playback device, the first media file is downloaded to the same playback device; and
    whereby, responsive to receipt by the server from the same playback device of a signal indicative of detection by the same playback device of an identification carrier assigned to the second identifier for the same playback device, the second media file is downloaded to the same playback device.

2. The non-transitory computer-readable medium A according to claim 1, further storing instructions adapted to be executed by one or more computer processors of a server to trigger the program routine in response to receipt of a change signal, and wherein the program routine performs the step of evaluating the change signal in order to determine whether the allocation table is to be changed.

3. The non-transitory computer-readable medium according to claim 1,
    wherein in the authorization table
        a user is assigned media IDs; and/or
        a media ID is assigned to users.

4. The non-transitory computer-readable medium according to claim 3, further storing instructions adapted to be executed by one or more computer processors of a server to perform a method for:
    executing a library routine on the server to cause transmission of a library signal, the library signal including one or more media IDs, wherein the library routine reads at least one media ID, which corresponds to a library criterion, from the media table; and/or
    reads at least one media ID from the authorization table which is assigned to the user in the authorization table and which corresponds to a library criterion.

5. The non-transitory computer-readable medium according to claim 4, wherein the library routine reads at least one media ID from the authorization table which is assigned to the user in the authorization table and which corresponds to a library criterion.

6. The non-transitory computer-readable medium according to claim 4, wherein the library criterion is selected such that when used in the library routine:
    all media IDs stored in the media table are read; and/or
    all media IDs stored in the media table are read, to which metadata of a select category are assigned in the media table; and/or
    all media IDs are read from the authorization table which are assigned in the authorization table to a particular user or a user group to which the particular user belongs according to a user group table; and/or all media IDs stored in the media table which are not assigned in the authorization table to a specific user or user group to which the specific user belongs according to the user group table are read; and/or all media IDs are read from the authorization table that belong, in the authorization table, to a particular user or user group to which the particular user belongs according to the user group table, and which are assigned in the allocation table to an identifier which is assigned in the identifier table to a specific user or a user group to which the specific user belongs according to the user group table; and/or all media IDs are read from the authorization table that belong, in the authorization table, to a particular user or user group to which the particular user belongs according to the user group table, and which are not assigned in the allocation table to an identifier which is assigned in the identifier table to a particular user or a user group to which the particular user belongs according to the user group table.

7. The non-transitory computer-readable medium according to claim 4, wherein the library criterion is selected such that when used in the library routine, all media IDs stored in the media table which are not assigned in the authorization table to a specific user or user group to which the specific user belongs according to the user group table are read.

8. The non-transitory computer-readable medium according to claim 4, wherein the library criterion is selected such that when used in the library routine, all media IDs are read from the authorization table that belong, in the authorization table, to a particular user or user group to which the particular user belongs according to the user group table, and which are assigned in the allocation table to an identifier which is assigned in the identifier table to a specific user or a user group to which the specific user belongs according to the user group table.

9. The non-transitory computer-readable medium according to claim 4, wherein the library criterion is selected such that when used in the library routine, all media IDs are read from the authorization table which are assigned in the authorization table to a particular user or a user group to which the particular user belongs according to a user group table; and all media IDs stored in the media table which are not assigned in the authorization table to a specific user or user group to which the specific user belongs according to the user group table are read.

10. A non-transitory, computer-readable medium storing instructions adapted to be executed by one or more computer processors of a server to perform a method for rendering a user interface for interacting with a server for providing media files for downloading by a playback device remote from the server, the server including an operating system for creating at least a first user and a second user for a same playback device; a media table stored in a memory in which at least a first media ID is assigned to a first media file, and a second media ID is assigned to a second media file; an authorization table stored in a memory in which the first media ID and the second media ID are assigned to a user group comprising the at least first user and the second user; an identifier table stored in a memory in which a first and a second identifier, each of the identifiers capable of assignment to an identification carrier for the same playback device, are assigned to one of the first and the second user respectively; and an allocation table stored in a memory in which the first media ID and second media ID are assignable to one of the identifiers for the same playback device; an authorization table containing assignments of media IDs with users or user groups;

wherein the user interface includes a UI change routine which transmits a change signal to the server for changing content of the allocation table, the change signal containing: a) a media ID; or b) a media ID and an identifier; and wherein the server further includes a program routine configured to (1) allow the first user for the same playback device to, in communicating with the server independent of the same playback device cause the server to, in response to receipt of the change signal, change the allocation table and assign at least the first media ID to the first identifier for the same playback device in the allocation table; and (2) allow the second user for the same playback device to, in communicating with the server independent of the same playback device, cause the server to, in response to receipt of the change signal, change the allocation table and assign the second media ID to the second identifier for the same playback device in the allocation table; whereby, responsive to receipt by the server from the same playback device of a signal indicative of detection by the playback device of an identification carrier assigned to the first identifier for the same playback device, the first media file is downloaded to the same playback device; and whereby, responsive to receipt by the server from the same playback device of a signal indicative of detection by the same playback device of an identification carrier assigned to the second identifier for the same playback device, the second media file is downloaded to the same playback device.

11. The non-transitory computer-readable medium according to claim 10, further storing instructions adapted to be executed by one or more computer processors of a server to perform a UI library routine configured to receive a library signal, wherein the library signal includes one or more media IDs, and the media ID included in the change signal is included in the library signal.

12. The non-transitory computer-readable medium according to claim 11, wherein the UI library routine is operative to generate and transmit a library request signal containing a library criterion for use in a library routine of the server, the library criterion having:

a first criterion such that when used in the library routine of the server, all media IDs stored in the media table of the server are read;

a second criterion such that when used in the library routine of the server, all media IDs stored in the media table of the server are read, to which certain metadata are assigned in the media table;

a third criterion such that when used in the library routine of the server, all media IDs are read from the authorization table of the server that are assigned to a specific user or user group in the authorization table, to which the specific user belongs according to a user group table of the server, are assigned;

a fourth criterion such that when used in the library routine of the server, all media IDs stored in the media table of the server are read, which are not in the authorization table of the server are assigned to a specific user or a user group to which the specific user belongs according to the user group table of the server;

a fifth criterion such that when used in the library routine of the server, all media IDs are read from the authorization table that belong, in the authorization table, to a particular user or user group to which the particular user belongs according to the user group table, and which are assigned in the allocation table to an identifier which is assigned in the identification table to a specific user or a user group to which the specific user belongs according to the user group table;

a sixth criterion such that when used in the library routine of the server, all media IDs are read from the authorization table that belong, in the authorization table, to a particular user or user group to which the particular user belongs according to the user group table, and which are not assigned in the allocation table to an identifier which is assigned in the identification table to a particular user or a user group to which the particular user belongs according to the user group table.

13. The non-transitory computer-readable medium according to claim 11, wherein the UI library routine is operative to generate and transmit a library request signal containing a library criterion for use in a library routine of the server, such that when used in the library routine of the server, all media IDs are read from the authorization table that belong, in the authorization table, to a particular user or user group to which the particular user belongs according to a user group table, and which are assigned in the allocation table to an identifier which is assigned in the identification table to a specific user or a user group to which the specific user belongs according to the user group table.

14. A system comprising:
a server for providing media files for download by a playback device remote from the server;
a user interface and an external device on which the user interface is executed, the user interface communicatively coupled with the server;
the playback device;
an identification carrier removably attachable to a portion of the playback device; wherein the identification carrier has an identifier readable by a reading device; and
wherein the server has an operating system in which at least a first user and a second user are created for a same playback device; and a media table stored in a memory in which at least a first media ID is assigned to a first media file, and a second media ID is assigned to a second media file; an authorization table stored in a memory in which the first media ID and the second media ID are assigned to a user group comprising the at least first user and the second user; an identifier table stored in a memory in which a first and a second identifier, each of the identifiers capable of assignment to the identification carrier for the same playback device, are assigned to one of the first and the second user respectively; an allocation table stored in a memory, wherein in the allocation table, the first media ID and the second media ID are assignable to one of the identifiers for the same playback device, and the first media ID is not initially assigned to the first identifier; and
wherein a program routine on the server is configured to (1) allow the first user for the same playback device to, in communicating with the server independent of the same playback device, change the allocation table and assign the first media ID to the first identifier for the same playback device in the allocation table; and (2) allow the second user for the same playback device to, in communicating with the server independent of the same playback device, change the allocation table and assign the second media ID to the second identifier for the same playback device in the allocation table;

whereby, responsive to receipt by the server from the same playback device of a signal indicative of detection by the playback device of an identification carrier assigned to the first identifier for the same playback device, the first media file is downloaded to the same playback device; and whereby, responsive to receipt by the server from the same playback device of a signal indicative of detection by the same playback device of an identification carrier assigned to the second identifier for the same playback device, the second media file is downloaded to the same playback device.

15. A system according to claim 14, wherein the playback device includes:
a speaker or a speaker connection,
a sensor configured to determine a property or a change in a property of this environment within a region of its environment,
a control unit comprising a processor, RAM memory, ROM memory, and an operating system, the control unit configured to control the speaker or the speaker connection for playing music or a spoken story, when the sensor detects, within the region of its environment, a certain property or a certain change of a property of said environment, or when the control unit detects a certain change of the property detected by the sensor.

16. A system according to claim 15, wherein the user interface includes a UI change routine which transmits a change signal to the server for changing content of the allocation table, the change signal containing: a) a media ID; or b) a media ID and a corresponding identifier; and wherein the server further includes a program routine which, in response to receipt of the change signal, changes the allocation table and assigns at least the first media ID to the corresponding identifier in the allocation table.

17. A method for providing by a server a media file for download by a playback device remote from the server, the server containing an operating system in which at least a first user and a second user is created for a same playback device, comprising:
storing a media table in a memory, in which at least a first media ID is assigned to a first media file and a second media ID is assigned to a second media file,
storing an authorization table, wherein in the authorization table the first media ID and the second media ID are assigned to a user group comprising the at least first user and the second user,
storing an identifier table in a memory, in which a first and a second identifier, each of the identifiers assignable to an identification carrier for the same playback device, are assigned to one of the first and the second user respectively,
storing an allocation table in a memory, wherein in the allocation table:
i. the first media ID and the second media ID are assignable to one of the identifiers for the same playback device, and
ii. the first media ID initially is not assigned to the first identifier for the same playback device; and
executing a program routine on the server configured to (1) allow the first user for the same playback device to, in communicating with the server independent of the same playback device, change the allocation table and assign the first media ID to the first identifier for the same playback device in the allocation table; and (2) allow the second user for the same playback device to, in communicating with the server independent of the same playback device, change the allocation table and assign the second media ID to the second identifier for the same playback device in the allocation table;

whereby, responsive to receipt by the server from the playback device of a signal indicative of detection by the same playback device of an identification carrier assigned to the first identifier for the same playback device, the first media file is downloaded to the same playback device; and whereby, responsive to receipt by the server from the same playback device of a signal indicative of detection by the same playback device of an identification carrier assigned to the second identifier for the same playback device, the second media file is downloaded to the same playback device.

18. The method according to claim 17, further comprising providing a user interface for interacting with the server and executing via the user interface a UI change routine to initiate sending of a change signal for changing content of the allocation table, wherein the change signal contains: (a) a media ID; or (b) a media ID and a corresponding identifier.

19. The method of claim 18, further comprising:

receiving by the server the change signal and responsive thereto, executing a program routine with which the user changes the allocation table and assigns the first media ID in the allocation table to the corresponding identifier.

20. The method according to claim 19, further comprising:

sending out from the server a library signal including one or more media IDs, executing a UI library routine in the user interface which includes receiving the library signal sent by the server, generating and sending the change signal in the UI change routine, one of the media IDs contained in the library signal being contained in the change signal.

* * * * *